(12) United States Patent
Bao et al.

(10) Patent No.: US 11,909,050 B2
(45) Date of Patent: Feb. 20, 2024

(54) ION-CONDUCTIVE ORGANIC NETWORKS FOR BATTERY APPLICATIONS

(71) Applicant: The Board of Trustees of the Leland Stanford Junior University, Stanford, CA (US)

(72) Inventors: Zhenan Bao, Stanford, CA (US); Zhiao Yu, Stanford, CA (US); Dawei Feng, Stanford, CA (US); Min Ah Lee, Stanford, CA (US); Yi Cui, Stanford, CA (US); Allen Pei, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 393 days.

(21) Appl. No.: 17/280,649

(22) PCT Filed: Oct. 2, 2019

(86) PCT No.: PCT/US2019/054298
§ 371 (c)(1),
(2) Date: Mar. 26, 2021

(87) PCT Pub. No.: WO2020/072650
PCT Pub. Date: Apr. 9, 2020

(65) Prior Publication Data
US 2022/0045332 A1 Feb. 10, 2022

Related U.S. Application Data

(60) Provisional application No. 62/740,785, filed on Oct. 3, 2018.

(51) Int. Cl.
*H01M 4/00* (2006.01)
*H01M 4/66* (2006.01)
(Continued)

(52) U.S. Cl.
CPC .......... *H01M 4/667* (2013.01); *H01M 4/134* (2013.01); *H01M 10/0565* (2013.01)

(58) Field of Classification Search
CPC ..... H01M 4/06; H01M 4/134; H01M 10/0565
See application file for complete search history.

(56) References Cited

U.S. PATENT DOCUMENTS

2006/0189776 A1    8/2006  Angell et al.
2008/0274393 A1*  11/2008  Markoski ............... H01B 1/122
                                                                429/448

FOREIGN PATENT DOCUMENTS

JP    2012-221754 A      11/2012
KR    10-2008-0030929 A   4/2008
WO    WO-03/043102 A2     5/2003

OTHER PUBLICATIONS

International Search Report and Written Opinion issued in PCT Application No. PCT/US2019/054298 dated Jan. 20, 2020, 9 pages.

(Continued)

*Primary Examiner* — Cynthia H Kelly
*Assistant Examiner* — Monique M Wills
(74) *Attorney, Agent, or Firm* — Foley & Lardner LLP

(57) ABSTRACT

An anode includes: (1) a current collector; and (2) an interfacial layer disposed over the current collector. The interfacial layer includes an ion-conductive organic network including anionic coordination units, organic linkers bonded through the anionic coordination units, and counterions dispersed in the ion-conductive organic network.

20 Claims, 63 Drawing Sheets

(51) Int. Cl.
*H01M 4/134* (2010.01)
*H01M 10/0565* (2010.01)

(56) References Cited

OTHER PUBLICATIONS

Wang et al., "Review on modeling of the anode solid electrolyte interphase (SEI) for lithium-ion batteries", npj Computational Materials, Mar. 26, 2018, vol. 4, Article No. 15, pp. 1-26.
International Preliminary Report on Patentability on PCT PCT/US2019/054298 dated Apr. 15, 2021.

* cited by examiner i) LiBH$_4$, LiAlH$_4$
ii) LiOEt and CoCl$_2$, ZnCl$_2$, NiCl$_2$, CuCl$_2$, FeCl$_2$, etc.

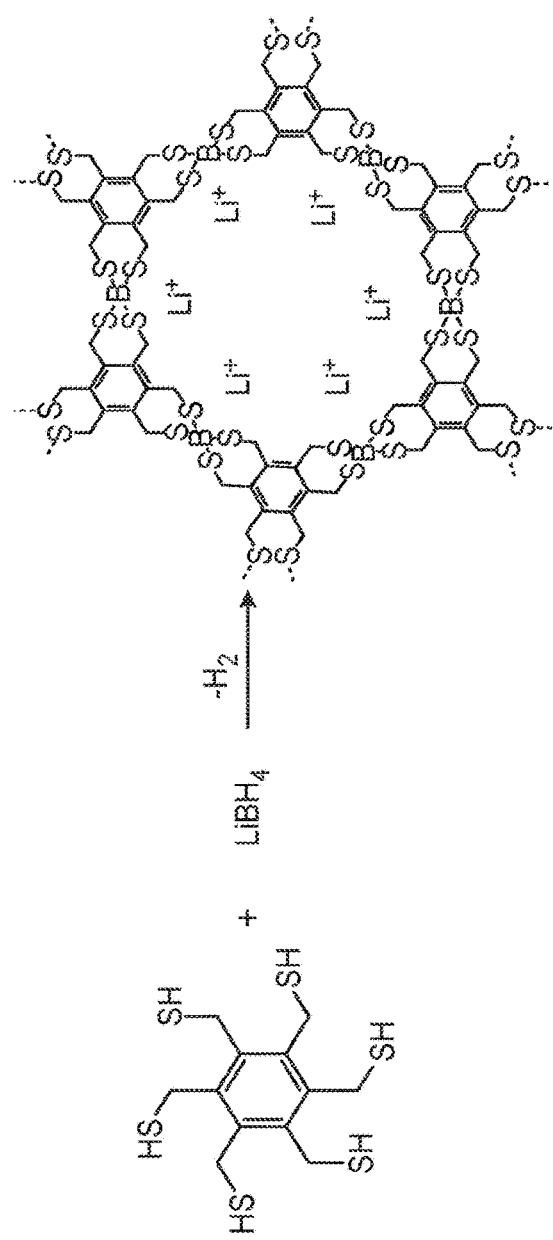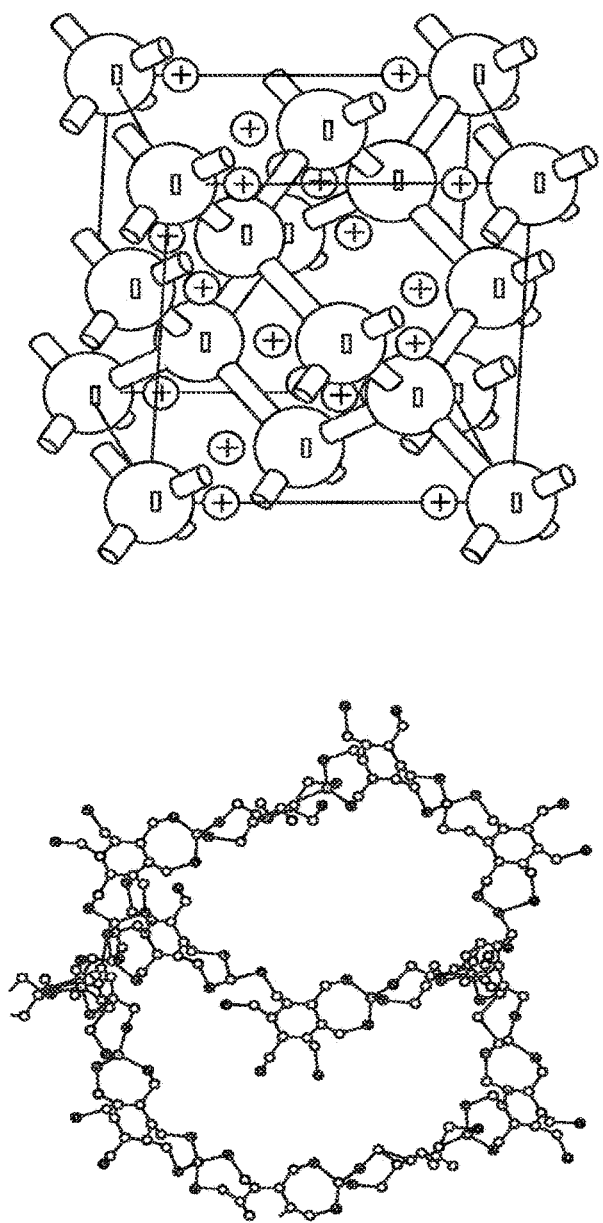
FIG. 7

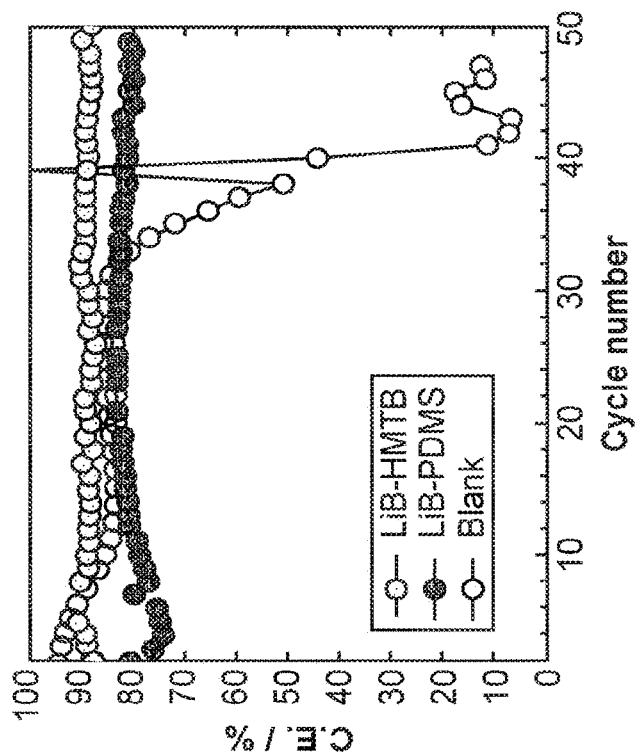
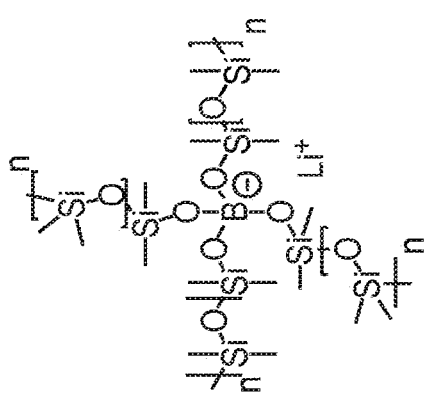
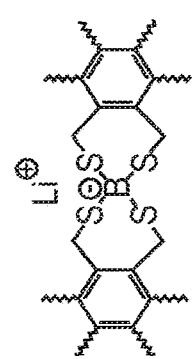
FIG. 8A
FIG. 8B

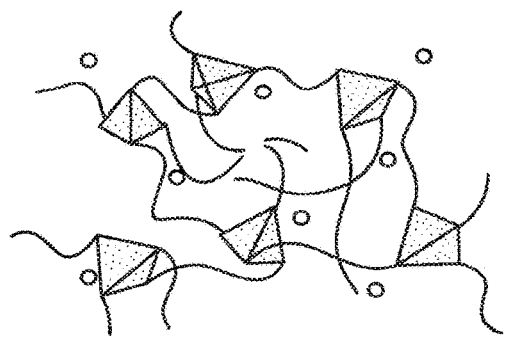
FIG. 12A
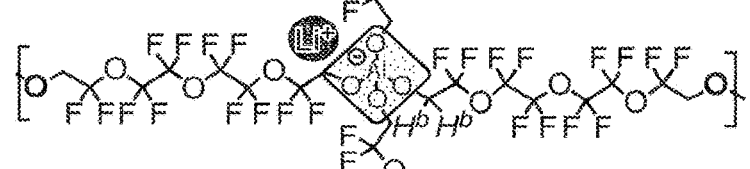
FIG. 12B
FIG. 12C
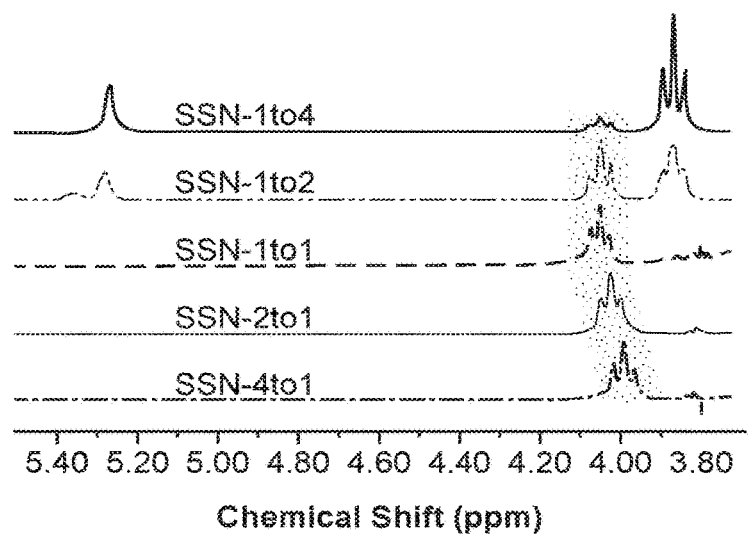
FIG. 12D
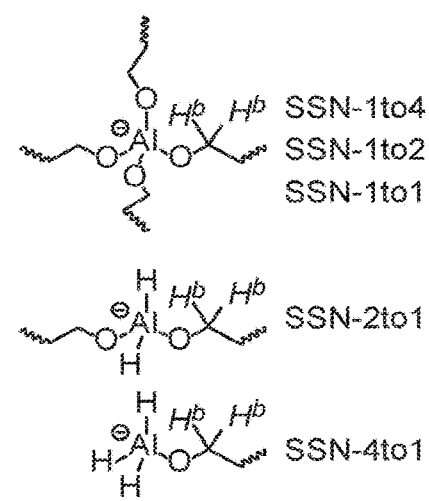
FIG. 12E

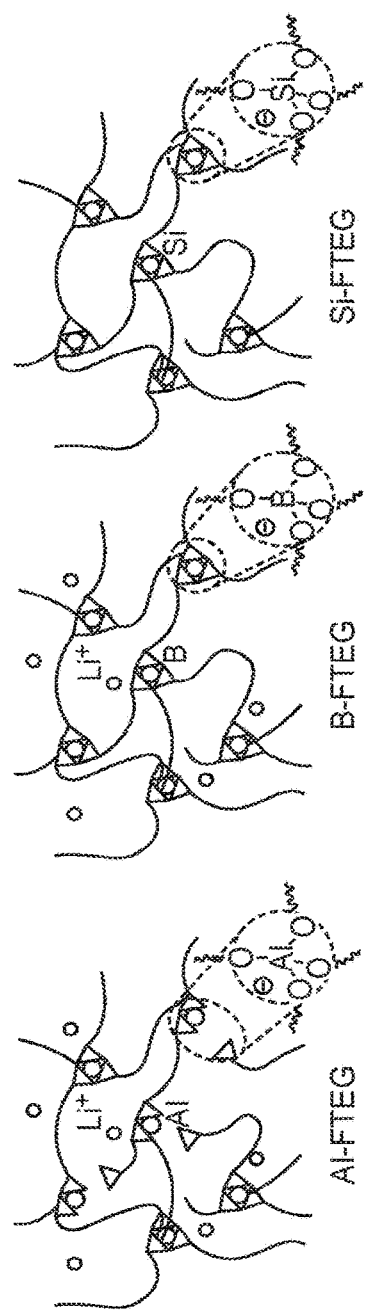
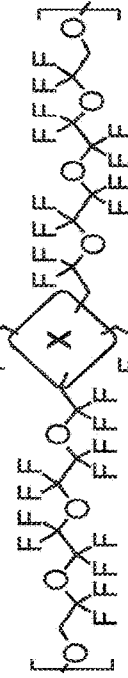
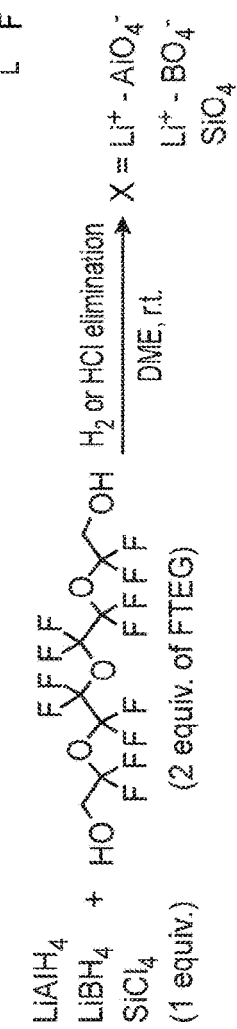
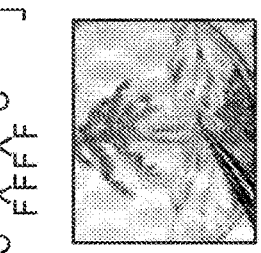
FIG. 16A, FIG. 16B, FIG. 16C, FIG. 16D, FIG. 16E, FIG. 16F, FIG. 16G

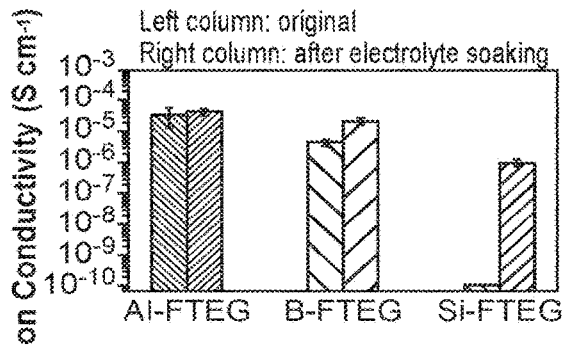
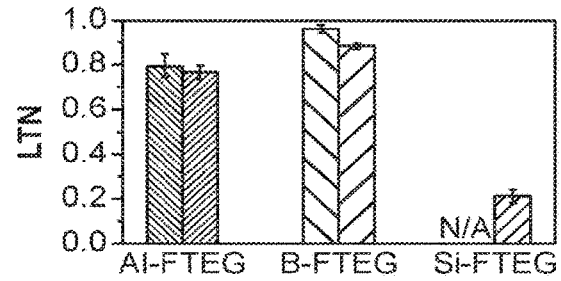
FIG. 18A  FIG. 18B
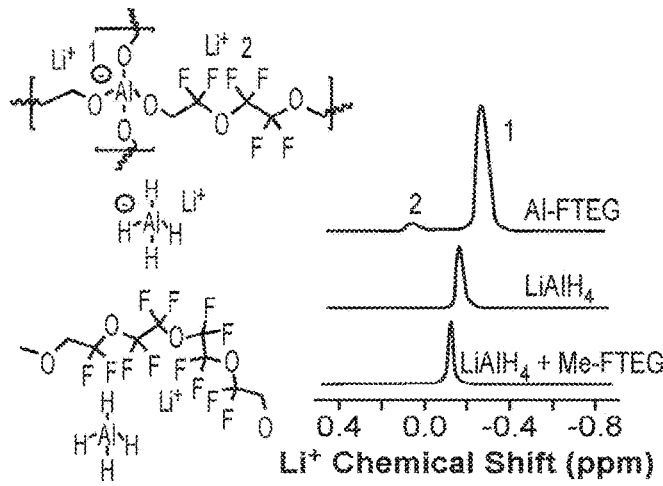
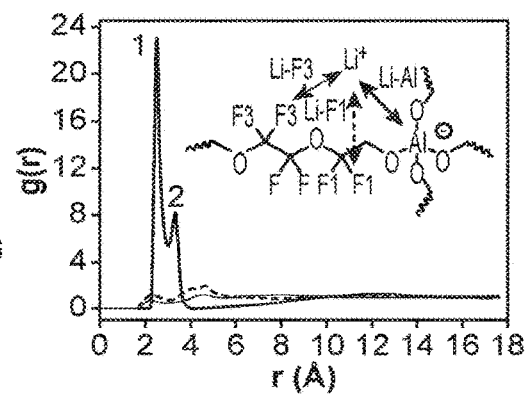
FIG. 18C  FIG. 18E
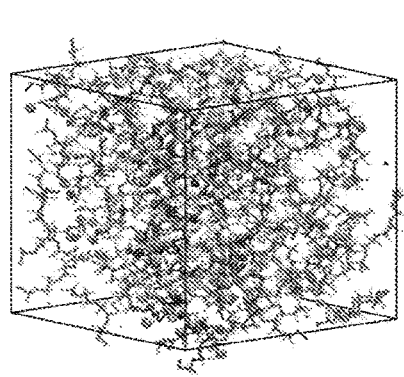
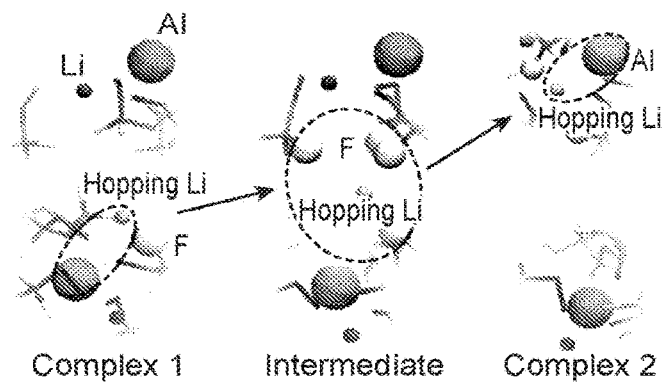
FIG. 18D  FIG. 18F

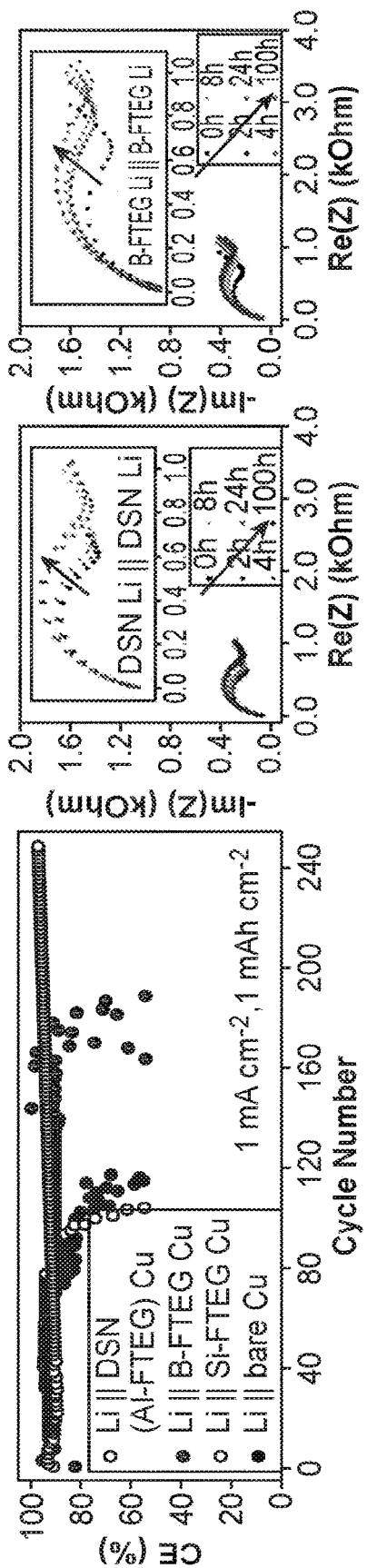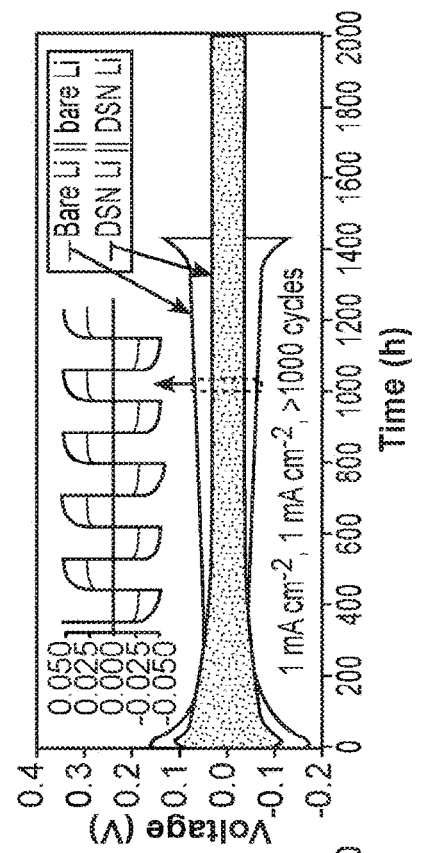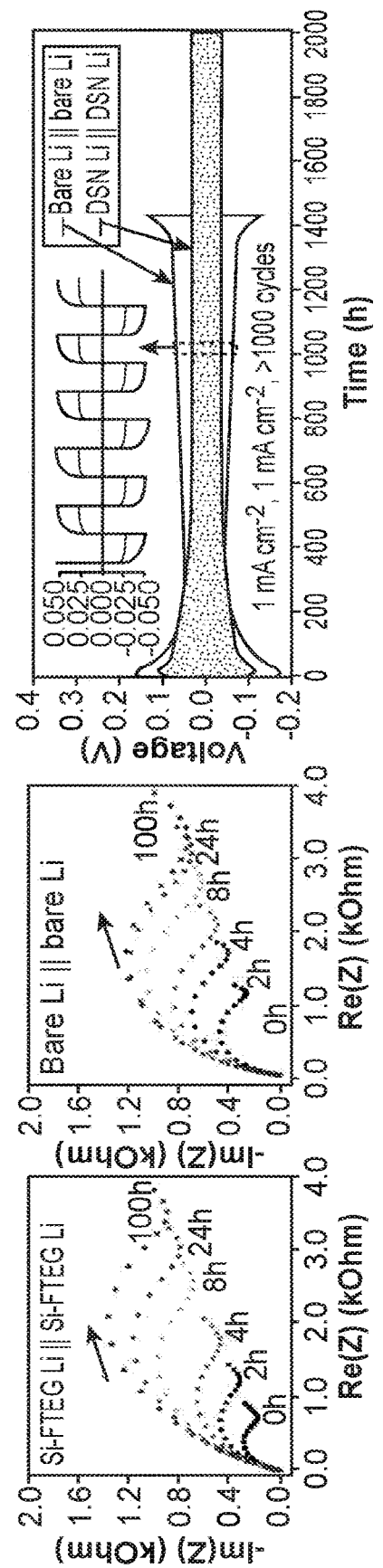
FIG. 19A, FIG. 19B, FIG. 19C, FIG. 19D, FIG. 19E, FIG. 19F

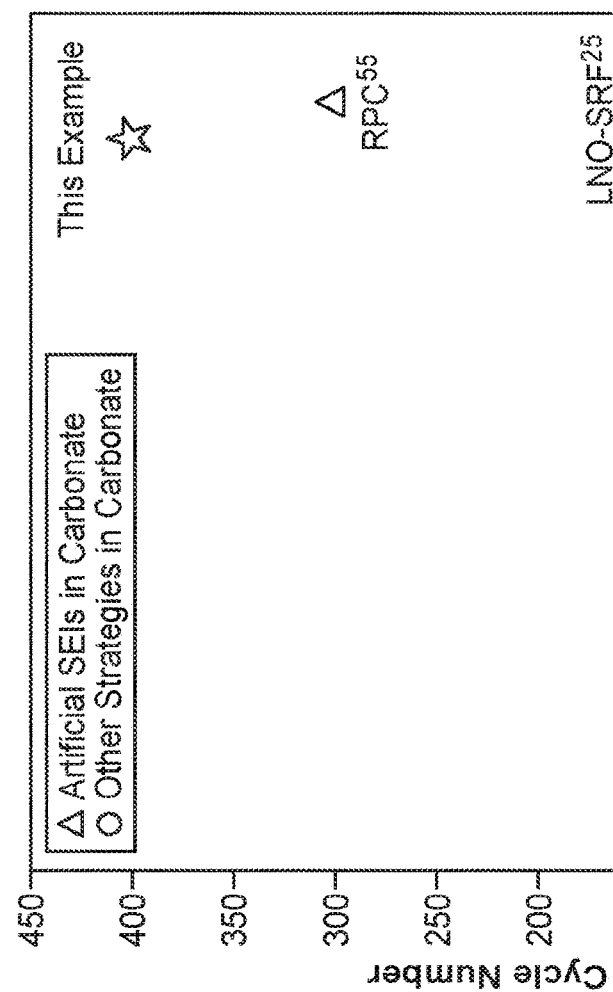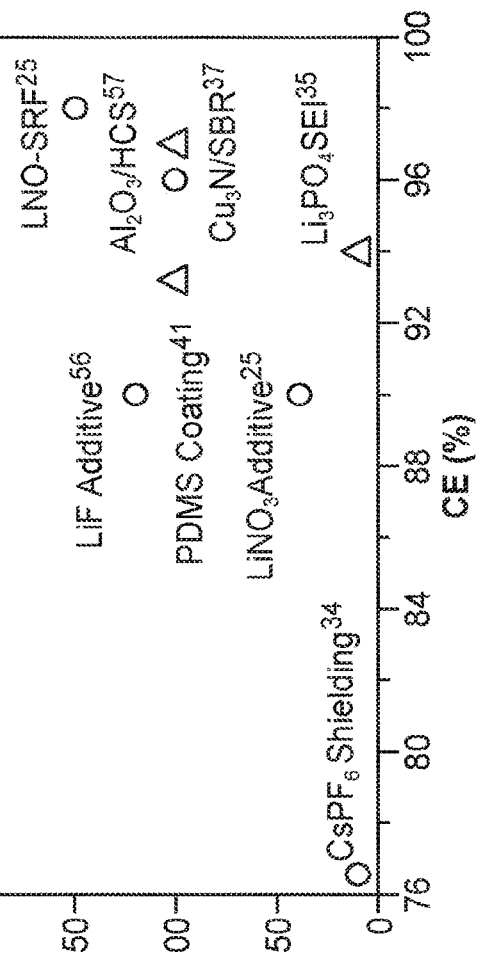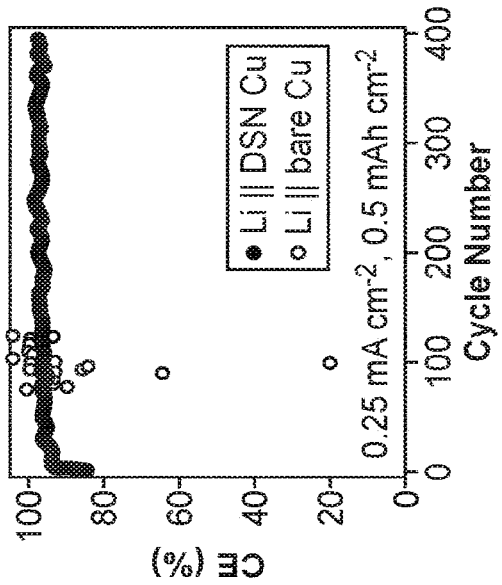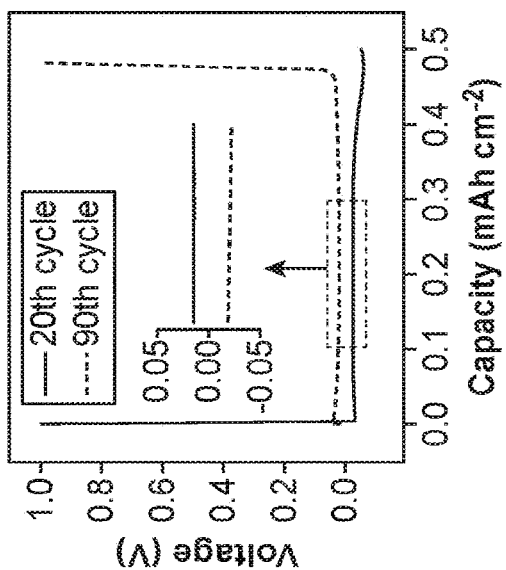
FIG. 21A  FIG. 21B  FIG. 21C

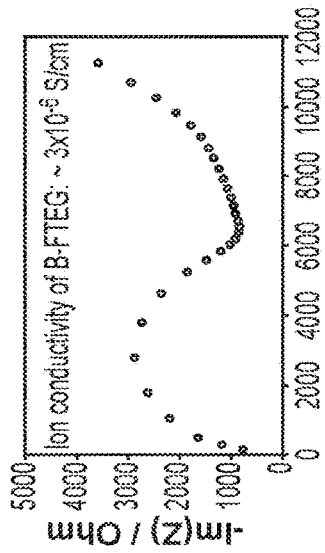
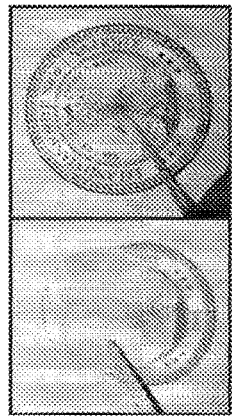
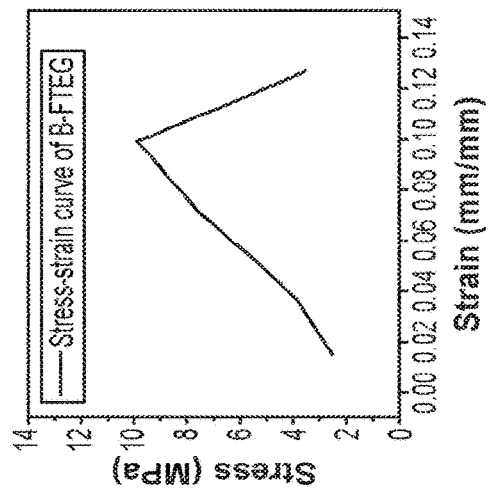
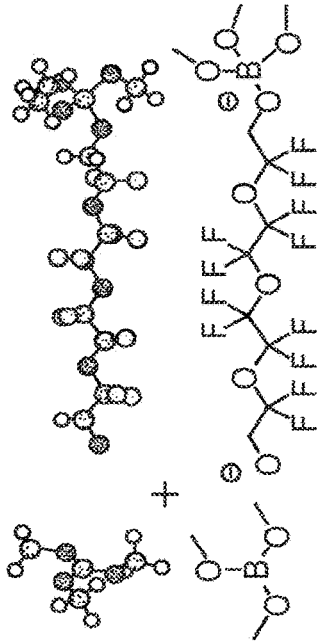
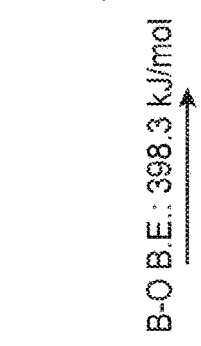
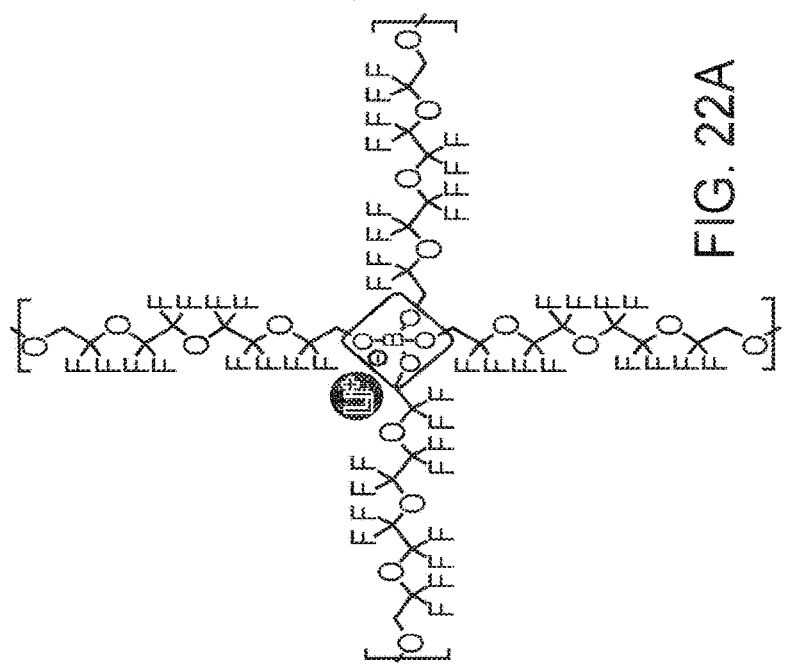
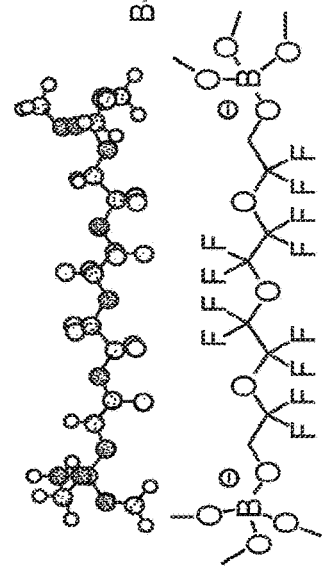
FIG. 22A  FIG. 22B  FIG. 22C  FIG. 22D  FIG. 22E

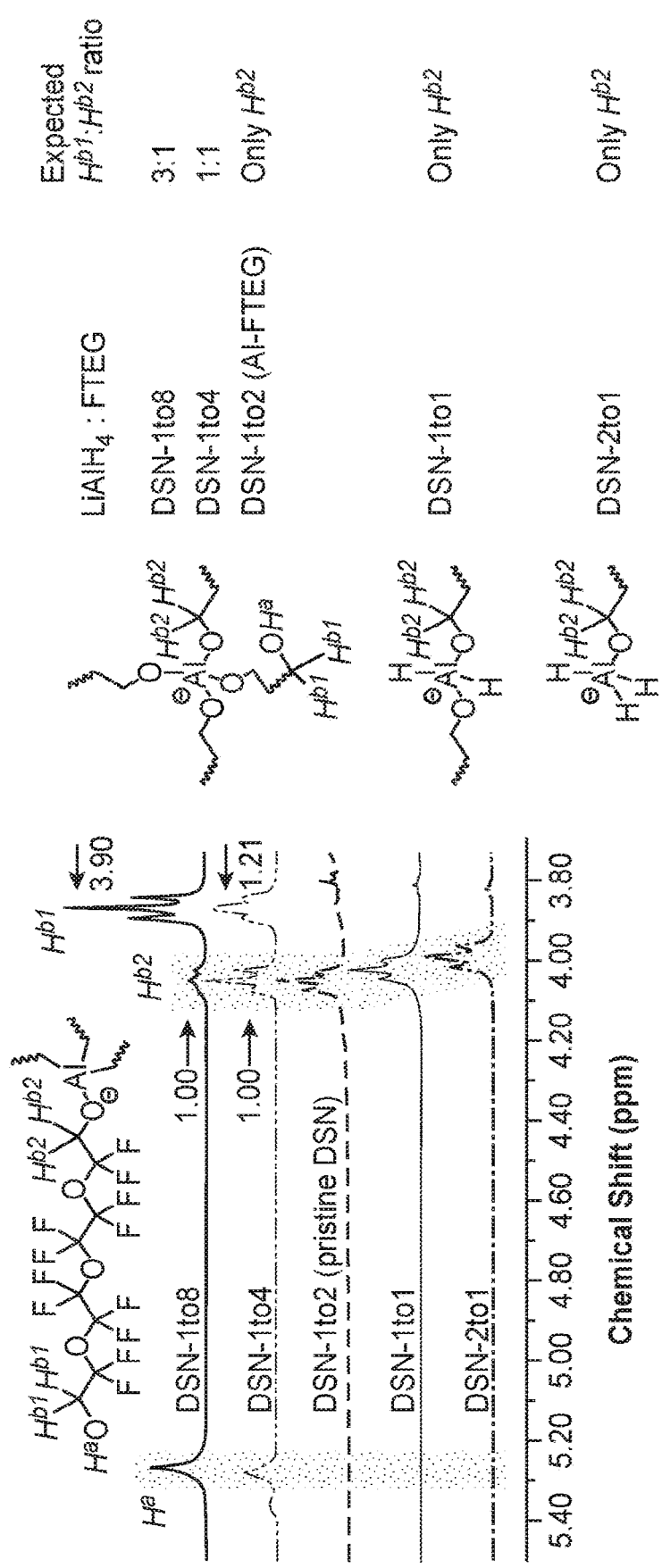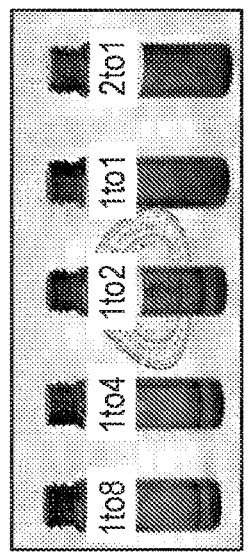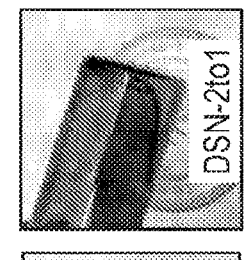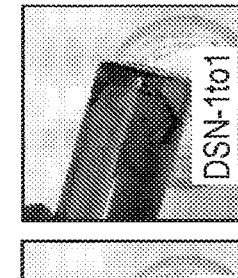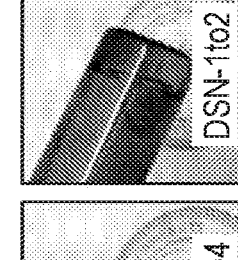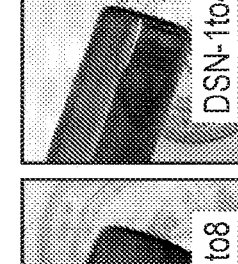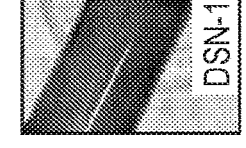
FIG. 25A  FIG. 25B  FIG. 25C  FIG. 25D  FIG. 25E  FIG. 25F  FIG. 25G  FIG. 25H

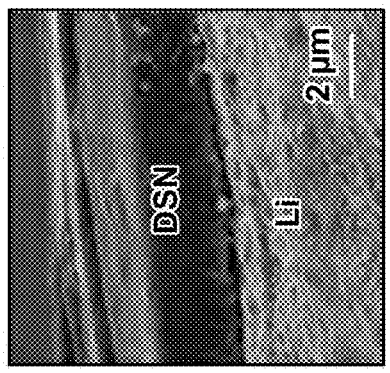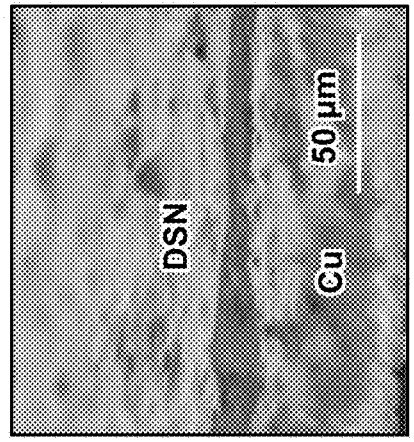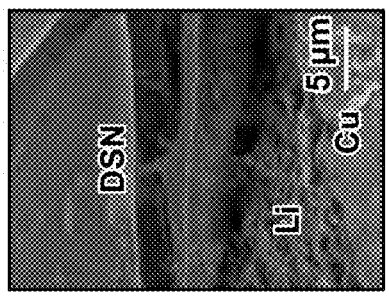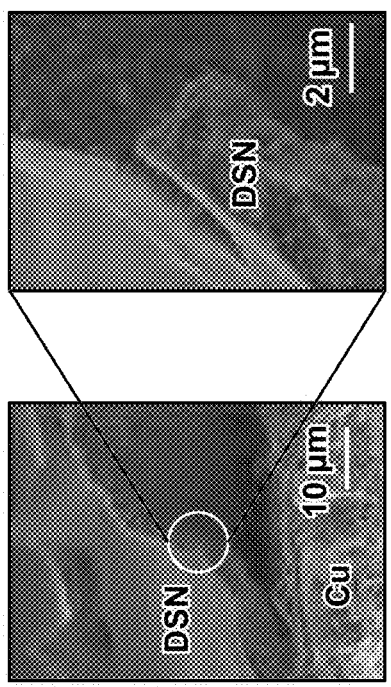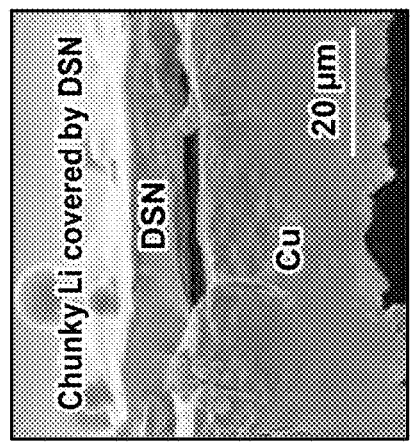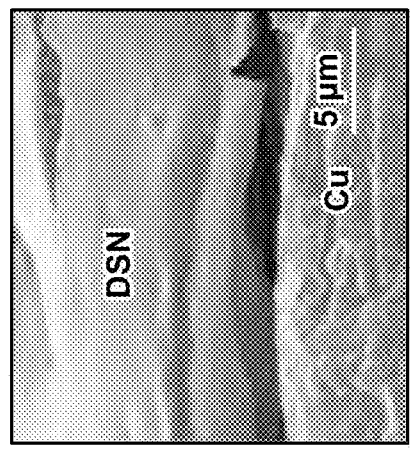
FIG. 28A  FIG. 28B  FIG. 28C  FIG. 28D  FIG. 28E  FIG. 28F  FIG. 28G

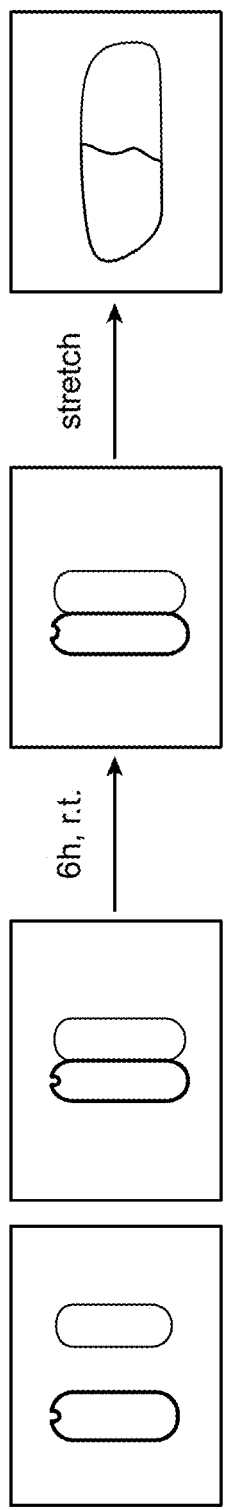
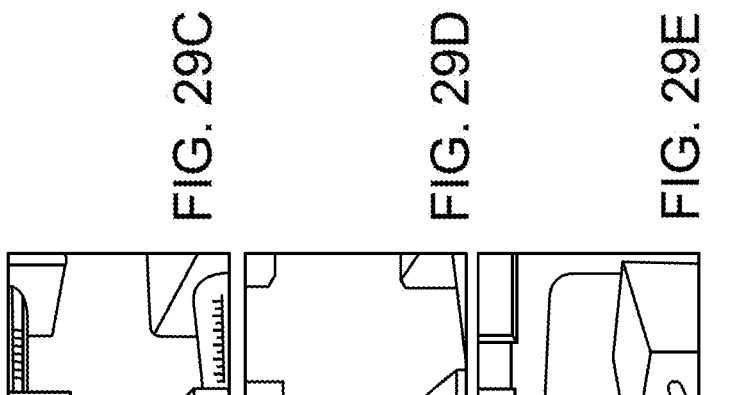
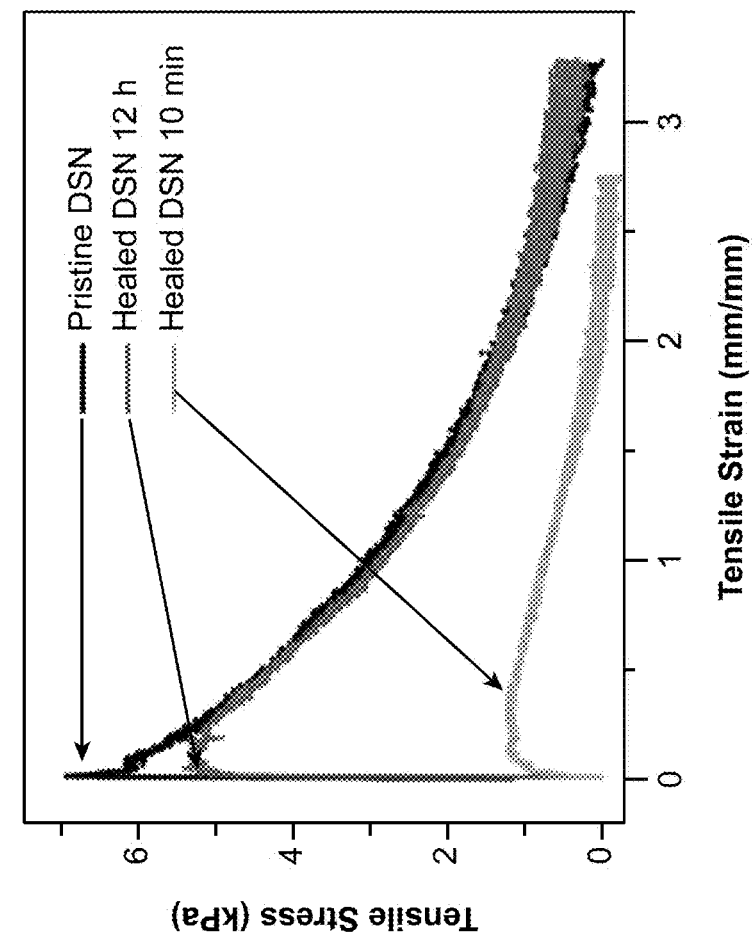
FIG. 29A
FIG. 29B
FIG. 29C
FIG. 29D
FIG. 29E

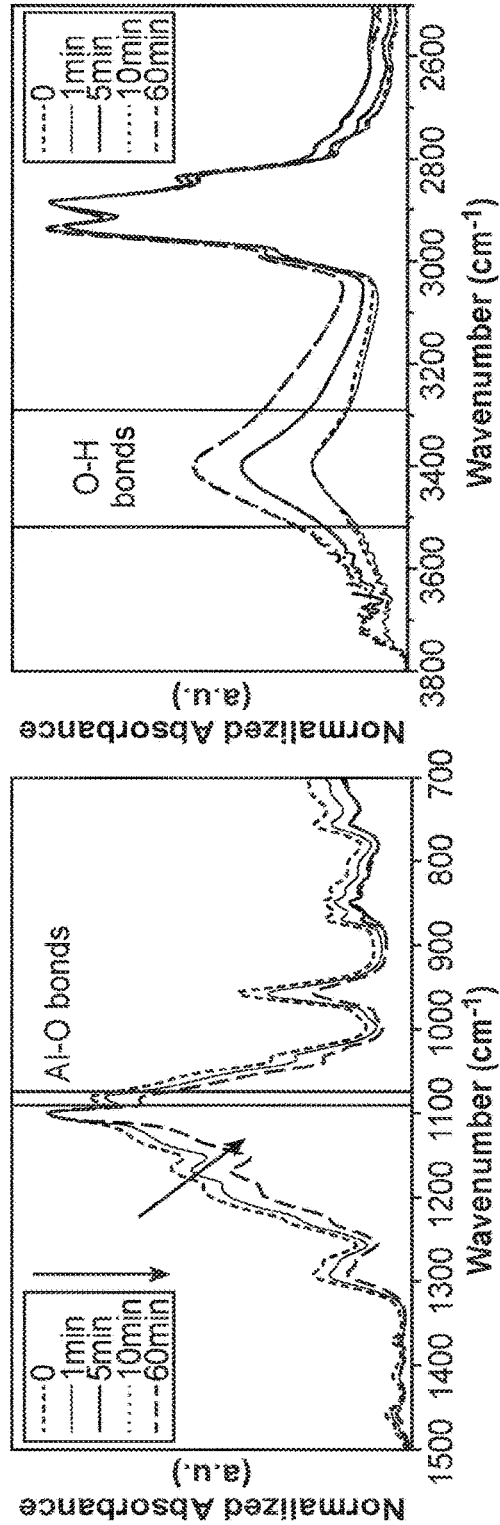
FIG. 31A
FIG. 31B
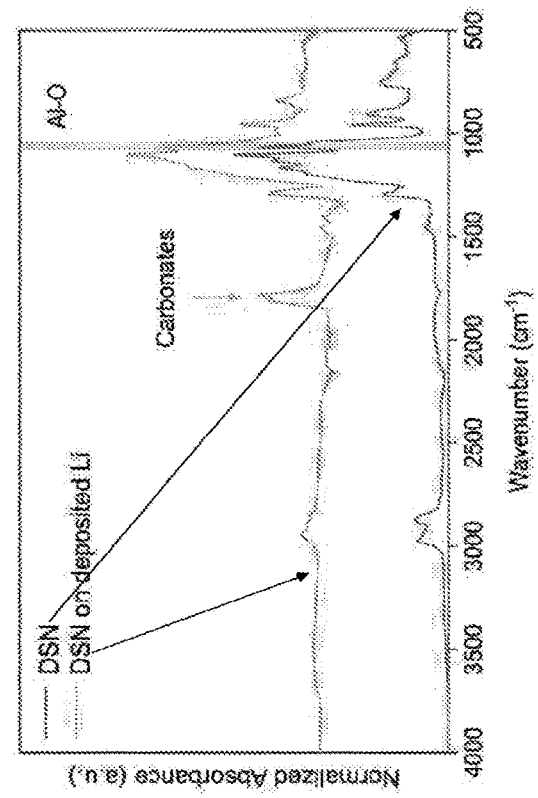
FIG. 32

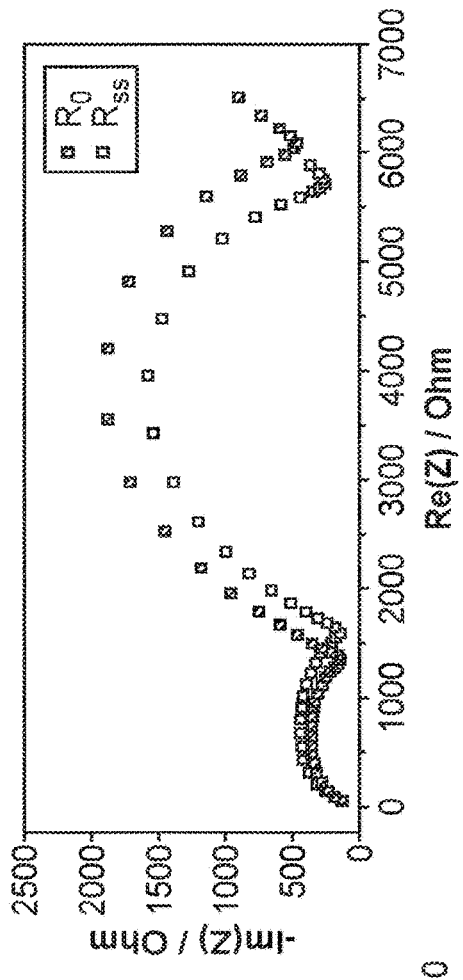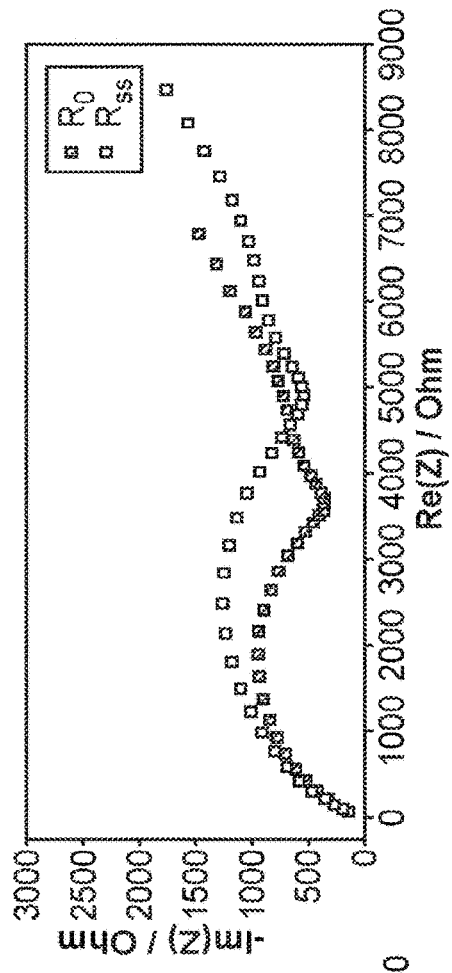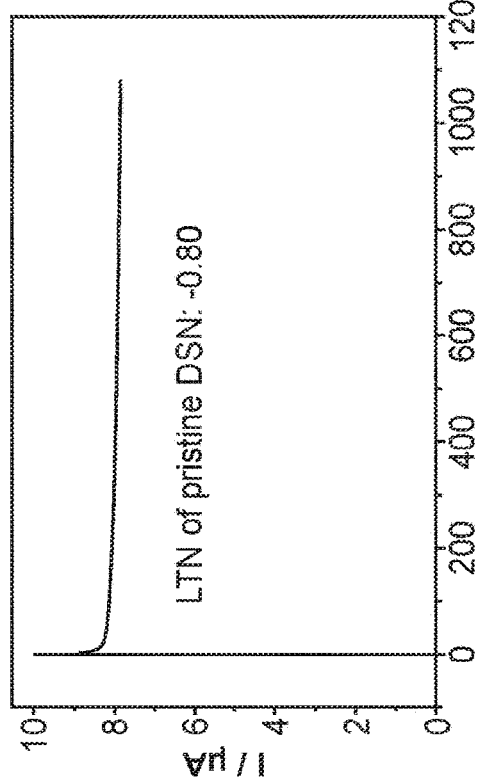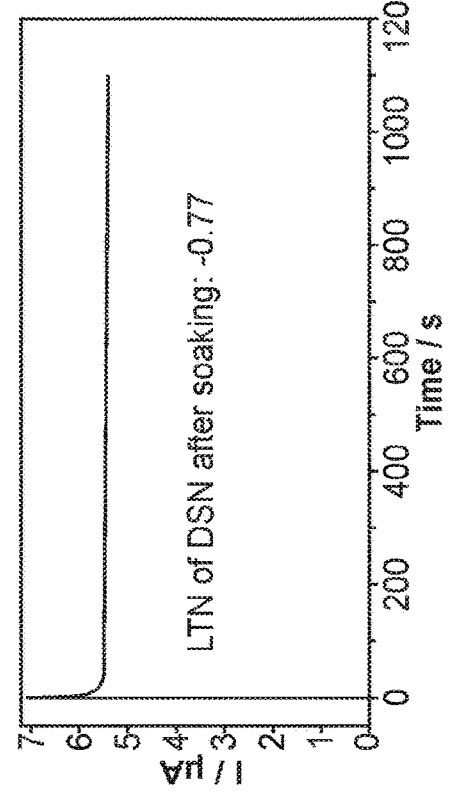
FIG. 33A
FIG. 33B
FIG. 33C
FIG. 33D

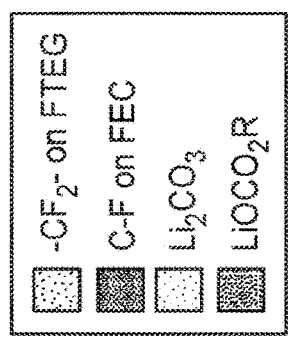
FIG. 38A
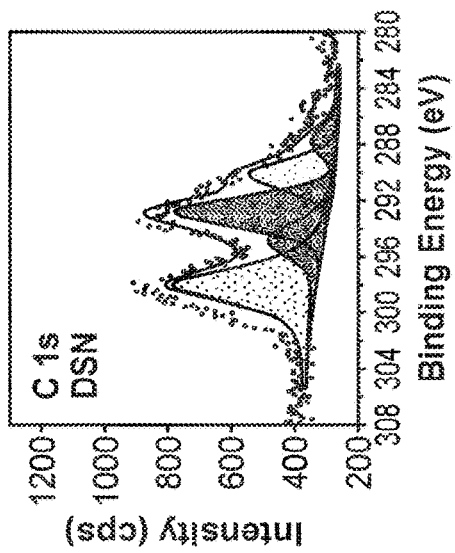
FIG. 38B
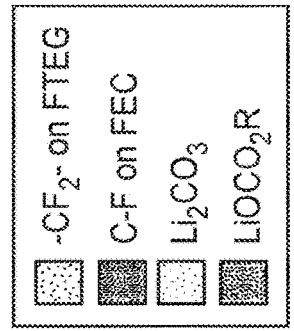
FIG. 38C
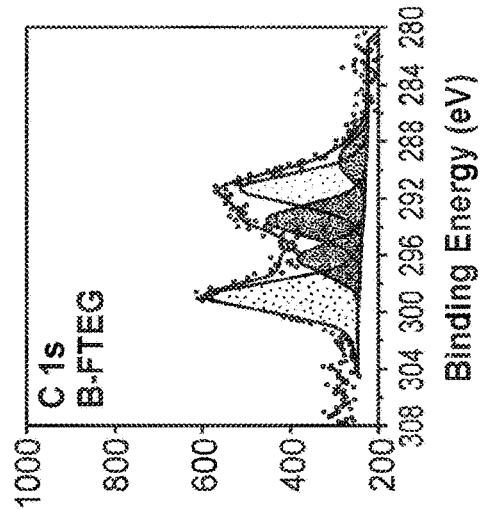
FIG. 38D
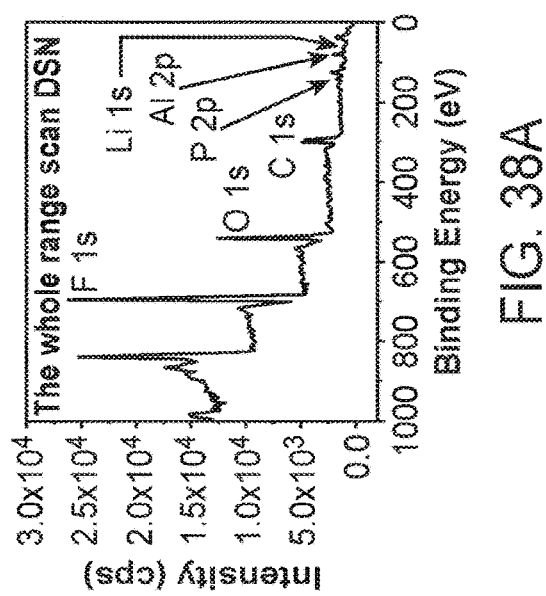
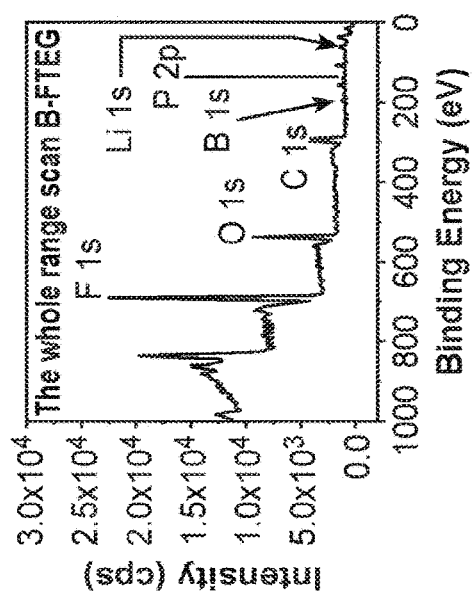

DSN
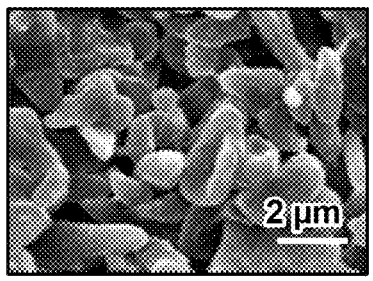 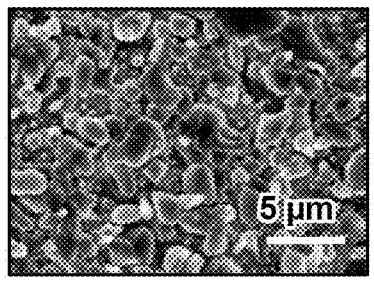 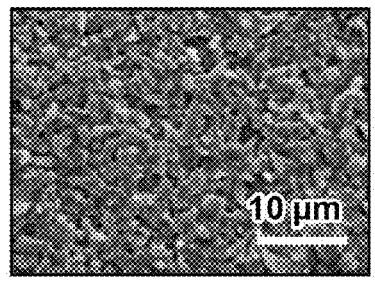
FIG. 40A  FIG. 40B  FIG. 40C
B-FTEG
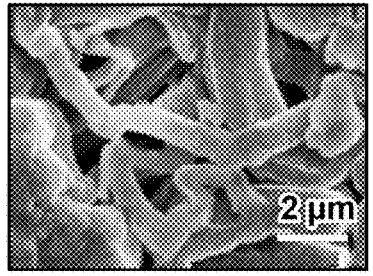 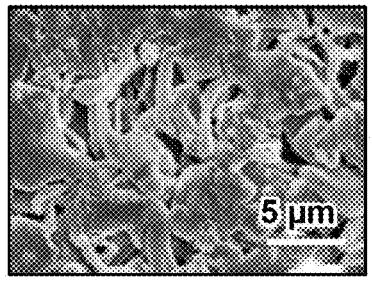 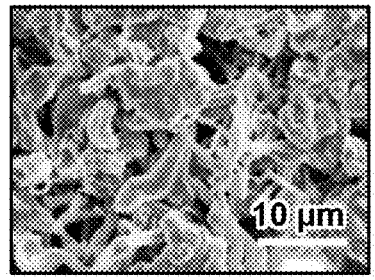
FIG. 40D  FIG. 40E  FIG. 40F
Si-FTEG
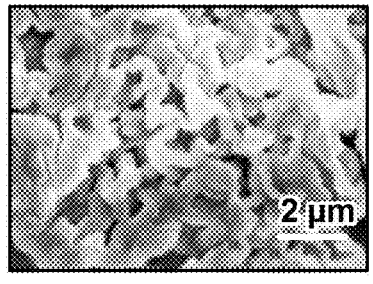 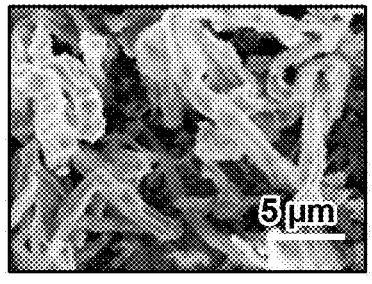 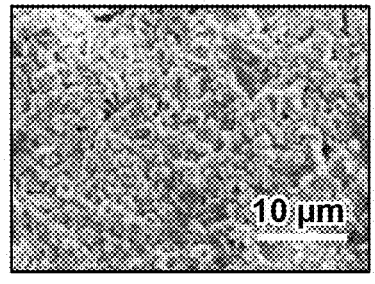
FIG. 40G  FIG. 40H  FIG. 40I
Bare Cu
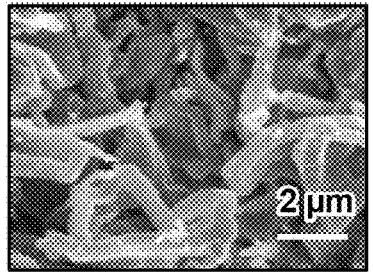 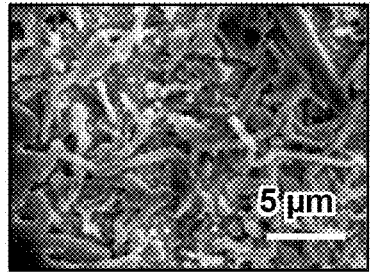 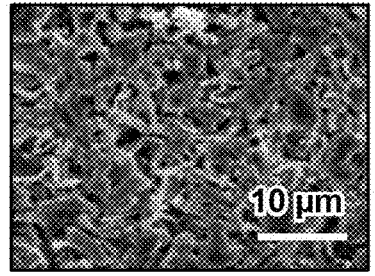
FIG. 40J  FIG. 40K  FIG. 40L

DSN
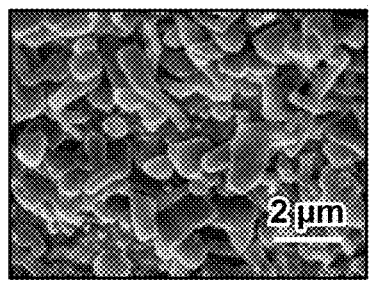 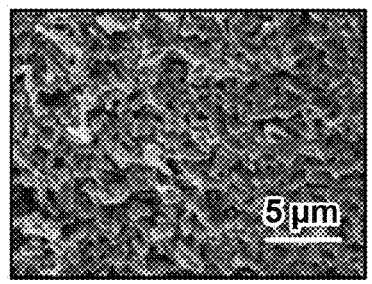 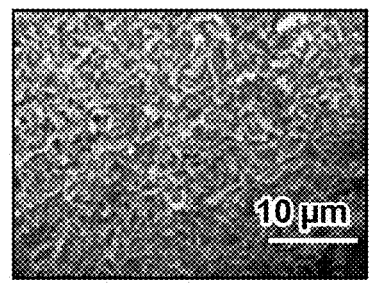
FIG. 41A     FIG. 41B     FIG. 41C
B-FTEG
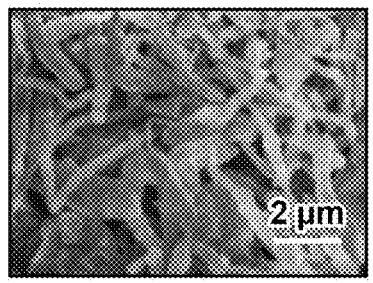 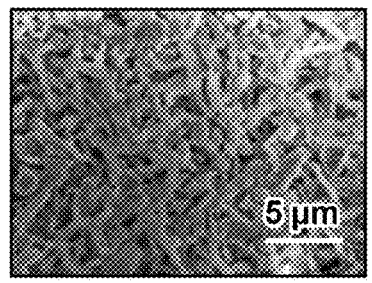 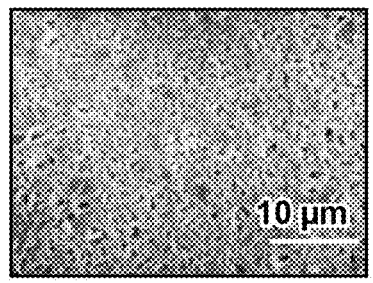
FIG. 41D     FIG. 41E     FIG. 41F
Si-FTEG
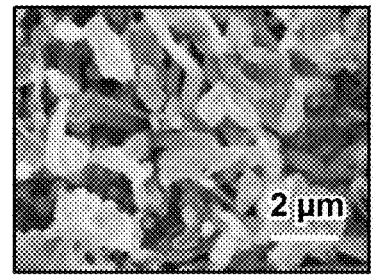 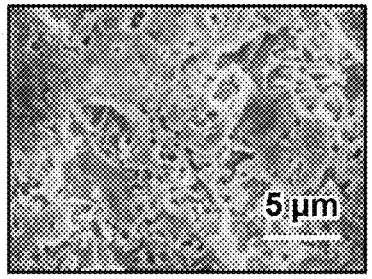 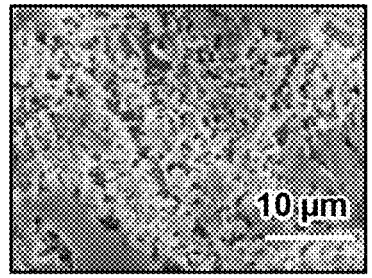
FIG. 41G     FIG. 41H     FIG. 41I
Bare Cu
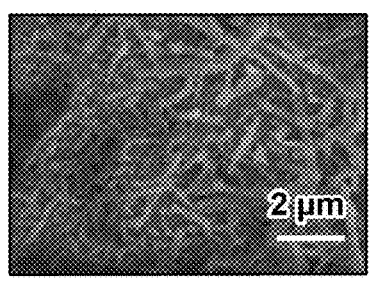 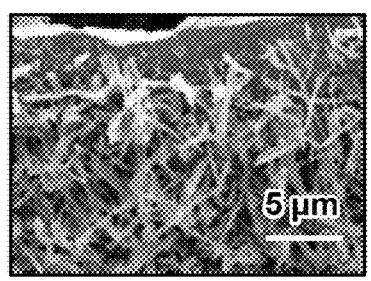 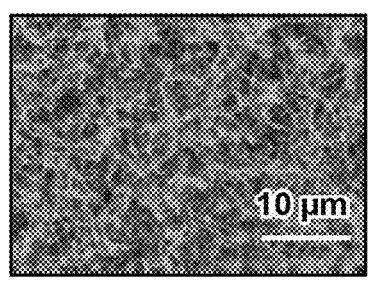
FIG. 41J     FIG. 41K     FIG. 41L

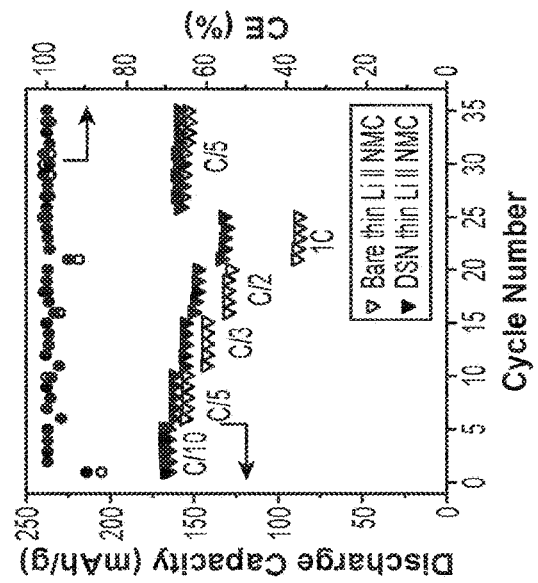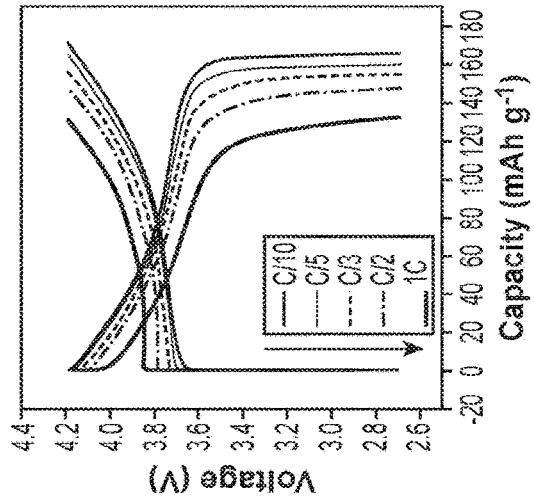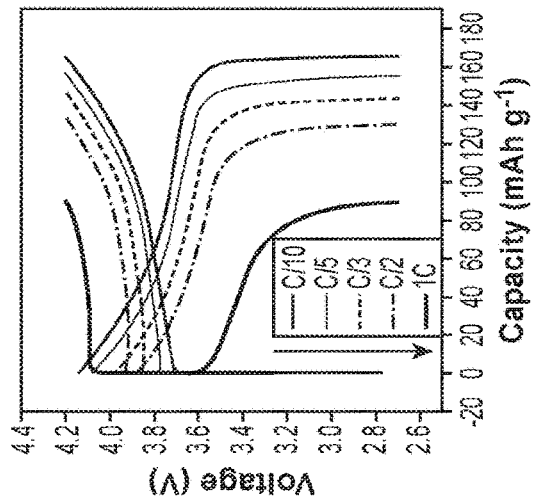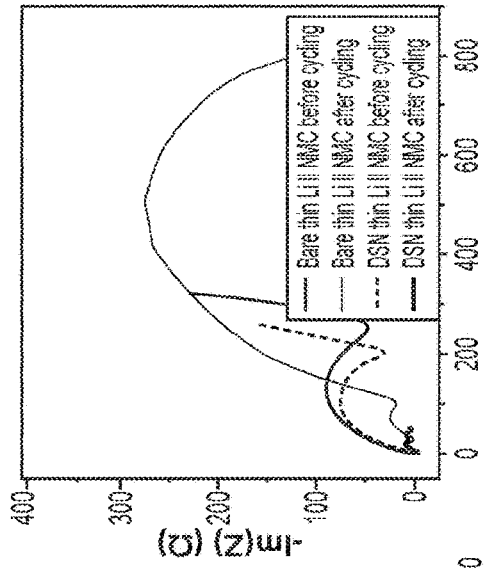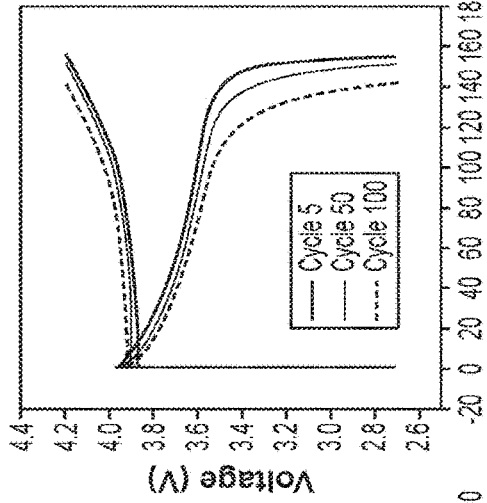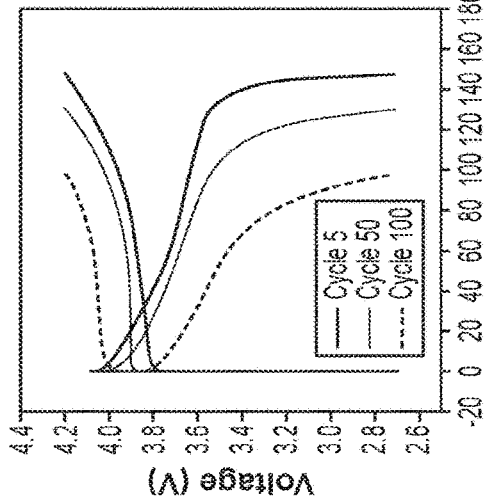
FIG. 45A  FIG. 45B  FIG. 45C
FIG. 46A  FIG. 46B  FIG. 46C

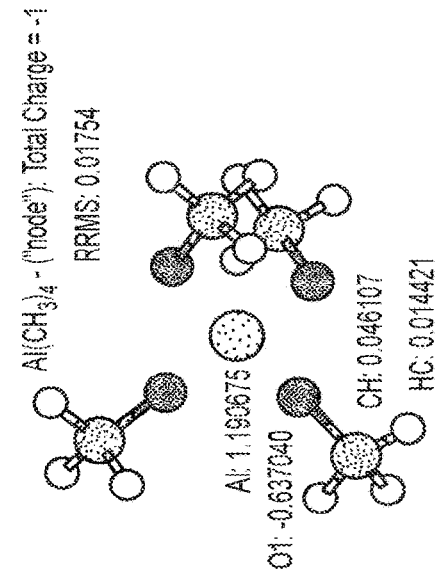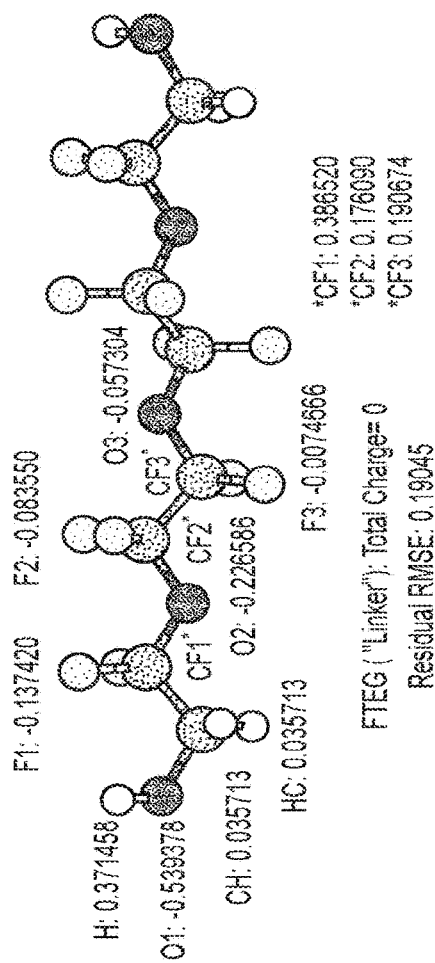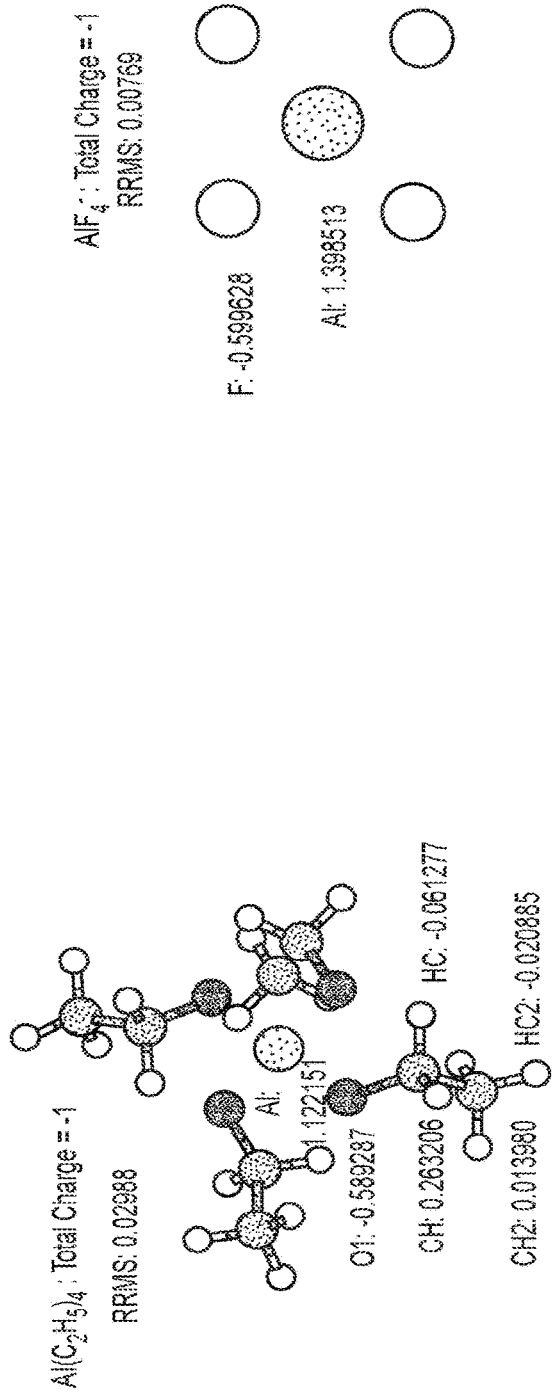

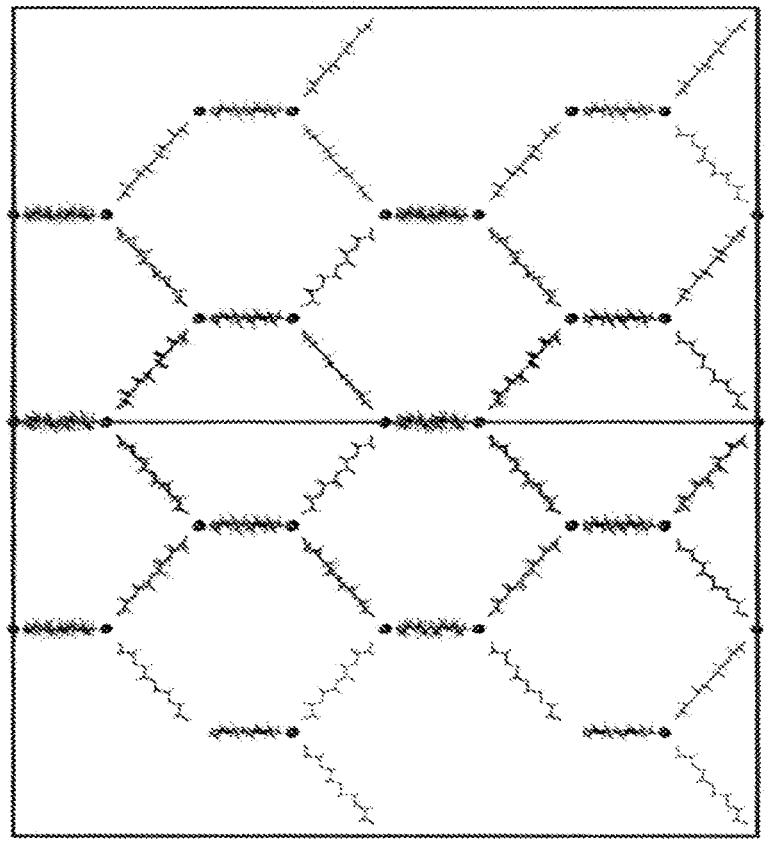
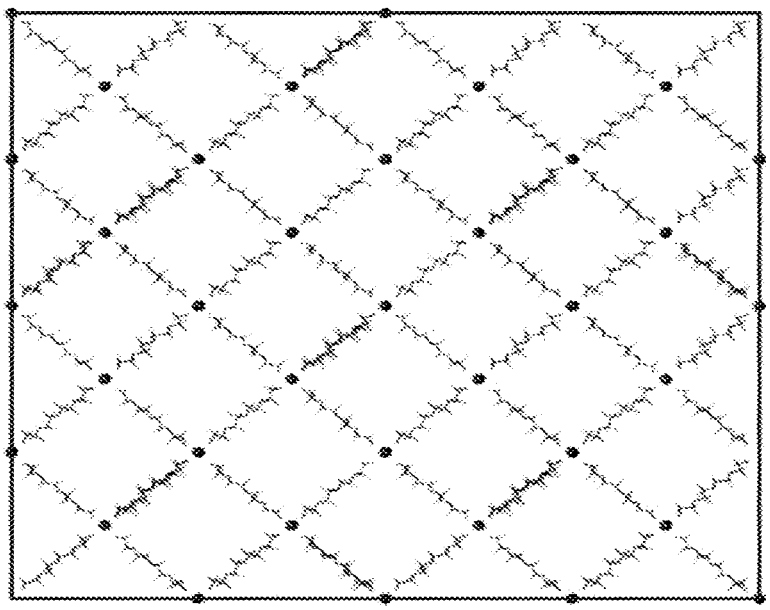
FIG. 51

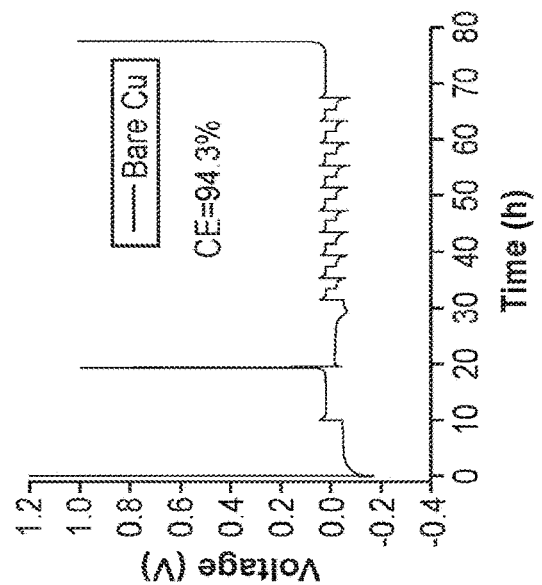
FIG. 53A
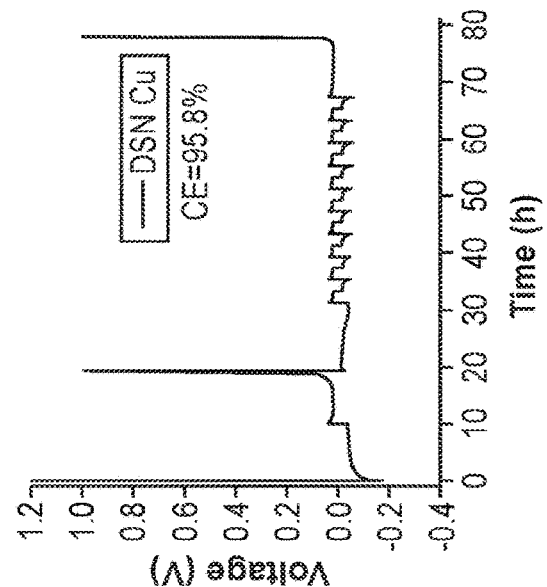
FIG. 53B
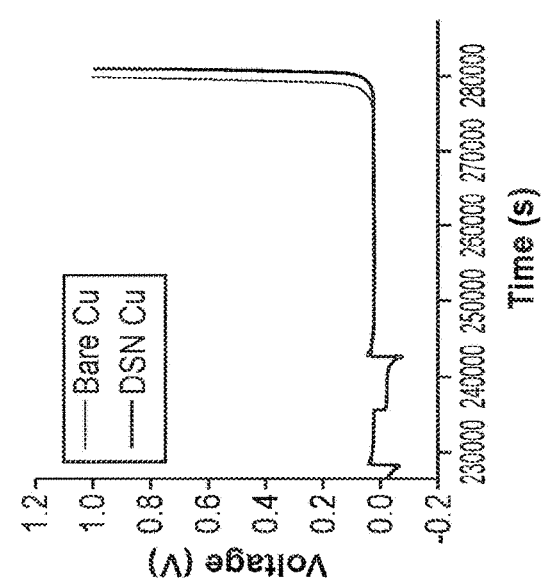
FIG. 53C
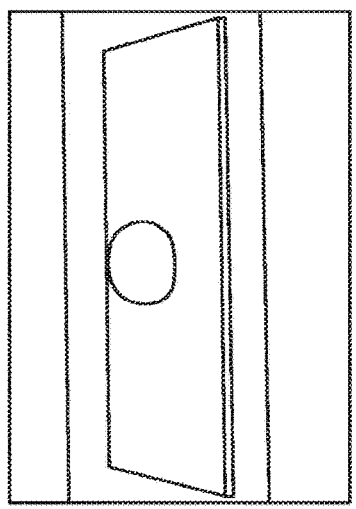
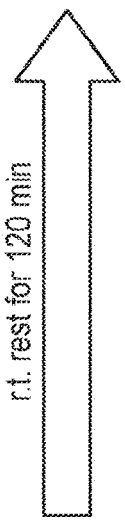
FIG. 54
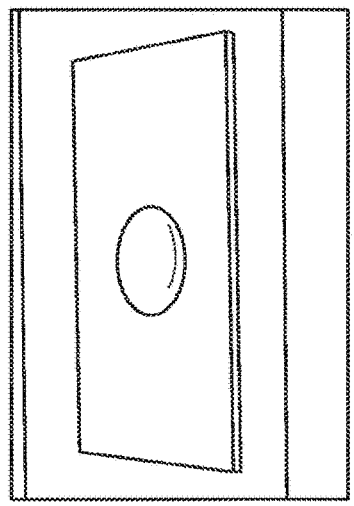

ION-CONDUCTIVE ORGANIC NETWORKS FOR BATTERY APPLICATIONS

CROSS-REFERENCE TO RELATED APPLICATIONS

This application is a National Stage Entry of PCT/US2019/054298, filed Oct. 2, 2019, which claims the benefit of and priority to U.S. Provisional Application No. 62/740,785, filed Oct. 3, 2018, the contents of which are incorporated herein by reference in their entirety.

STATEMENT REGARDING FEDERALLY SPONSORED RESEARCH OR DEVELOPMENT

This invention was made with Government support under contract DE-AC02-76SF00515 awarded by the U.S. Department of Energy. The Government has certain rights in the invention.

TECHNICAL FIELD

This disclosure generally relates to ion-conductive organic networks and their use in batteries.

BACKGROUND

To allow the mass adoption of electric vehicles, two key challenges of battery technology should be addressed: increasing the energy density and reducing the cost. A lithium-ion battery (LIB) is a promising energy storage candidate to power these electrical vehicles. Although LIBs have been successful for portable electronic devices, they have not yet met the criteria for ubiquitous utilization in electrical vehicles.

A typical LIB is based on the combination of a carbon anode (e.g., graphite) and a lithium metal oxide or phosphate cathode (e.g., $LiCoO_2$, $LiMn_2O_4$, or $LiFePO_4$). The relatively low capacities of these electrodes (e.g., about 370 mAh/g for graphite and about 140-170 mAh/g for lithium metal oxides or phosphates) constrain the total specific energy of a battery. To allow mass market electric vehicle applications, much higher specific energy/energy density (e.g., about 3-5 times) is desired. Improving the energy density of LIBs involves exploiting improved materials for battery anodes and cathodes, such as silicon and sulfur. Specifically, if silicon is used to replace graphite anodes, the theoretical specific capacity is about ten times higher. However, these electrode materials can experience extreme, unavoidable expansion and contraction during lithiation and delithiation processes. These volumetric changes can lead to rapid morphology deterioration of the electrode materials (e.g., cracks, electrical isolation or particles, pulverization, and so forth), which can dramatically reduce the battery lifetime to a few charge-discharge cycles. Tremendous efforts have been made to address these material challenges by nano-sizing active electrode materials, including nanoparticles, nanowires, porous structures, nanotubes, hollow particles, yolk-shell particles, thin films and composite nanostructures. However, the improvement of the materials is still not enough to satisfy criteria for electric vehicles. Furthermore, nanostructured materials make it more challenging to achieve robust electronic connections between nano-sized constituents. Even more importantly, nanostructures generally involve complex and expensive synthesis and fabrication processes. Therefore, cost and cycling stability thus remain significant barriers for alternative high energy density LIB materials applied in transportation applications.

In addition to LIBs, high energy density batteries such as lithium-sulfur (Li—S) and Li-air batteries have the potential of increasing the energy density by about 5-10 times at relatively low cost. A Li metal anode, the "holy grail" of battery technology, is a key component to allow the successful application of these battery chemistries. Li metal has the highest specific capacity of about 3860 mAh/g of Li and the lowest potential for maximizing a cell voltage. Pairing a Li metal anode with low cost S cathodes can produce batteries with a theoretical specific energy of about 6 times that of other battery technologies (and about 3 times potentially practically achievable). Pairing a Li metal anode with an air cathode can potentially produce even higher energy densities. However, the problems of dendritic and mossy Li formation can cause poor safety and low Coulombic efficiency during charge/discharge. Attempts to address these problems include tuning liquid electrolytes additives, and utilizing solid ceramic and polymer electrolytes. These attempts have resulted in modest improvement.

It is against this background that a need arose to develop embodiments of this disclosure.

SUMMARY

In some embodiments, an anode includes: (1) a current collector; and (2) an interfacial layer disposed over the current collector, wherein the interfacial layer includes an ion-conductive organic network including anionic coordination units, organic linkers bonded through the anionic coordination units, and counterions dispersed in the ion-conductive organic network.

In some embodiments of the anode, each of the anionic coordination units includes a metal cation.

In some embodiments of the anode, each of the anionic coordination units further includes multiple non-metal anions bonded to the metal cation.

In some embodiments of the anode, the anionic coordination units include multiple sub-populations of anionic coordination units, and the multiple sub-populations of anionic coordination units include respective and different metal cations.

In some embodiments of the anode, the counterions include lithium cations, sodium cations, calcium cations, or magnesium cations.

In some embodiments of the anode, a concentration of the counterions is at least about 0.1% by weight relative to a total weight of the ion-conductive organic network.

In some embodiments of the anode, a concentration of the counterions is at least about 1% by weight relative to a total weight of the ion-conductive organic network.

In some embodiments of the anode, the anode further includes an anode material disposed between the current collector and the interfacial layer.

In some embodiments of the anode, the anode material is lithium metal, sodium metal, calcium metal, or magnesium metal.

In some embodiments of the anode, each of the organic linkers includes a cyclic hydrocarbon moiety.

In some embodiments of the anode, the cyclic hydrocarbon moiety is saturated or unsaturated.

In some embodiments of the anode, each of the organic linkers is a linear chain.

In some embodiments of the anode, the linear chain is a polyalkylene oxide chain, a fluorinated polyalkylene oxide chain, a hydrocarbon chain, a fluorinated hydrocarbon chain, a polysiloxane chain, a polybutyldiene chain, or a polyisoprene chain.

In some embodiments of the anode, the interfacial layer has an ionic conductivity of at least about $10^{-6}$ S/cm.

In some embodiments of the anode, the interfacial layer has a lithium transference number of at least about 0.5.

In some embodiments of the anode, the interfacial layer includes multiple sub-layers, and at least one of the sub-layers includes the ion-conductive organic network. In some embodiments, at least another of the sub-layers includes a material different from the ion-conductive organic network.

In additional embodiments, a battery includes: (1) the anode of any one of the foregoing embodiments; (2) a cathode; and (3) an electrolyte disposed between the anode and the cathode.

In further embodiments, a battery includes: (1) an anode; (2) a cathode; and (3) a solid electrolyte disposed between the anode and the cathode, wherein the solid electrolyte includes an ion-conductive organic network including anionic coordination units and organic linkers bonded through the anionic coordination units.

In some embodiments of the battery, each of the anionic coordination units includes a metal cation and a plurality of non-metal anions bonded to the metal cation.

In some embodiments of the battery, the ion-conductive organic network further includes counterions dispersed in the ion-conductive organic network.

In some embodiments of the battery, the counterions include lithium cations, sodium cations, calcium cations, or magnesium cations.

In some embodiments of the battery, a concentration of the counterions is at least about 0.1% by weight relative to a total weight of the ion-conductive organic network.

In some embodiments of the battery, each of the organic linkers includes a cyclic hydrocarbon moiety.

In some embodiments of the battery, the cyclic hydrocarbon moiety is saturated or unsaturated.

In some embodiments of the battery, each of the organic linkers is a linear chain.

In some embodiments of the battery, the linear chain is a polyalkylene oxide chain, a fluorinated polyalkylene oxide chain, a hydrocarbon chain, a fluorinated hydrocarbon chain, a polysiloxane chain, a polybutyldiene chain, or a polyisoprene chain.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

FIG. 7. Chemical structure of hard ION formed by reaction between HMTB and $LiBH_4$.

FIG. 8. a) Chemical structures of example IONs, LiB-HMTB and LiB-PDMS; b) Coulombic efficiencies of Li||Cu cells with LiB-HMTB (hard ION) and LiB-PDMS (soft ION) coatings compared to that of a blank cell (all the cells include about 1 M $LiPF_6$ in ethylene carbonate (EC)/diethyl carbonate (DEC) as electrolyte, without additives).

FIG. 12. a) Schematic (spheres: $Li^+$ counterions; tetrahedrals: anionic coordination units; chains: soft ligands); and b) detailed chemical structure of LiAl-FTEG. c) Digital images of free-standing LiAl-FTEG film (left) and as-synthesized about 300 mg/mL viscous LiAl-FTEG/DME solution (right). d) The $^1$H-NMR spectra of LiAl-FTEG formed from different molar ratios between $LiAlH_4$ and FTEG. The LiAl-FTEG-1to1 is set as a reference with substantially all hydroxyl groups on FTEG reacted, which is the product of the reaction between about 0.5 equivalence of $LiAlH_4$ and about 1.0 equivalence of FTEG. Therefore, the LiAl-FTEG-1to4, LiAl-FTEG-1to2, LiAl-FTEG-2to1, and LiAl-FTEG-4to1 correspond to about 0.125, about 0.25, about 1.0, and about 2.0 equivalences of $LiAlH_4$, respectively. e) Al(III) coordination center environments of LiAl-FTEG-1to4, LiAl-FTEG-1to2, LiAl-FTEG-1to1, LiAl-FTEG-2to1, and LiAl-FTEG-4to1.

FIG. 16. Material Design and Chemical Structures of a dynamic single-ion-conductive network (DSN) and Derivatives. (A-C) Conceptual sketch of Al-FTEG (DSN) (A), B-FTEG (B), and Si-FTEG (C). Spheres, Li+ ions; spheres, Al atoms; spheres, B atoms; spheres, Si atoms; tetrahedra, anion centers; chains, soft ligands. (D) The reaction to synthesize DSN derivatives. (E) Detailed chemical structure of DSN derivatives. (F and G) Photo of an as-synthesized viscous DSN/DME solution (F) and a free-standing DSN film (G).

FIG. 18. Electrochemical Characterization of DSN Derivatives and MD Simulation. (A and B) Ion conductivity (A) and Li transference number (LTN) measurement (B) of the DSN derivatives. For each material, left column is the original value without any addition of salt or electrolyte, while right column is the value after soaking in electrolyte. Soaking was done in about 1 M LiPF$_6$ in EC/DEC (v:v=about 1:1) with about 10 wt. % FEC additive for about 24 h. Error bars represent standard deviation of measurements from at least three samples. (C) The $^7$Li-NMR spectra of DSN, LiAlH$_4$, and LiAlH$_4$ plus Me-FTEG, respectively. (D) Visualization of the equilibrated DSN system: Li$^+$ ions, Al centers, F atoms, C atoms, and O atoms. For clarity, all H atoms are omitted and FTEG chains are shown in stick format. (E) Radial distribution functions at equilibrium: Li—Al, Li—F1, and Li—F3. (F) Li$^+$ ion transport pathway. The hopping Li$^+$ ion is shown along with other Li$^+$ ions. F atoms within about 3 Å of the hopping Li are emphasized with spheres. For clarity, FTEG chains are faded.

FIG. 22. a) Detailed chemical structure of B-FTEG. b) Stress-strain curve of B-FTEG free-standing film. Strain rate: about 10 mm/min. c) Pictures of B-FTEG free-standing film. d) Nyquist plot of the B-FTEG material measured in SS||SS symmetric cell. The conductivity is about 3×10$^{-6}$ S/cm. e) DFT calculation of B(OR)$_4^-$ coordination bonding energy (B.E.) at the B3LYP/6-31G+(d,p) level. Note: The stress-strain curve showed B-FTEG is a brittle material with breaking point at about 10% strain. DFT gave a coordination bonding energy for B-FTEG (about 398.3 kJ/mol).

FIG. 25. a) $^1$H-NMR spectra of DSNs procured from different molar ratios between LiAlH$_4$ and FTEG. b) Expected Al(III) center environments of DSN-1to8, DSN-1to4, DSN-1to2, DSN-1to1, and DSN-2to1. c-h) Pictures of DSN-1to8, DSN-1to4, DSN-1to2, DSN-1to1, and DSN-2to1. Note: The suffixes after "DSN" represent different molar ratios between the equivalence of LiAlH$_4$ and that of FTEG. The pristine DSN is set as DSN-1to2 which is the product of the reaction between about 0.5 equivalence of LiAlH$_4$ and about 1.0 equivalence of FTEG, with all —OH groups consumed. Therefore, DSN-1to8, DSN-1to4, DSN-1to1, and DSN-2to1 correspond to about 0.125, about 0.25, about 1.0, and about 2.0 equivalences of LiAlH$_4$, respectively. Two evidences confirm the completion of the reaction between hydride and —OH group. First, for DSN-1to8 and DSN-1to4, the ratios of peak integral (highlighted as red numbers and arrows in FIG. 25a) between Al—O—CH$_2$— (H$^{b2}$) and H—O—CH$_2$— (H$^{b1}$) are about 1.00:3.90 and about 1.00:1.21, respectively. They are close to their corresponding expected integral ratios (FIG. 25b), indicating all the hydrides on Al(III) are fully reacted with —OH. Additionally, the peak of —O—H (H$^a$) totally disappeared for DSN-1to2, DSN-1to1, and DSN-2to1. Second, the Al—O—CH$_2$— chemical shift stays constant from DSN-1to8 to DSN-1to2, while it shifts upfield from DSN-1to1 to DSN-2to1. The Al—O—CH$_2$-peak would not shift unless the chemical environment were different for DSN-1to2, DSN-1to1, and DSN-2to1. From DSN-1to8 to DSN-1to2, —OH group is in excess (or exact equivalence) compared to hydride; thus when just Al(III) center is tetra-alkoxyl coordinated (Al(OR)$_4^-$) can this peak stay unchanged. This indicates that all the hydrides are reacted when —OH is in excess or equivalence. Conversely, when LiAlH$_4$ is an excess, the possible products will contain hydride groups on Al(III), which will better shield the protons on adjacent carbons due to low electronegativity and better electron-donating ability of hydride, resulting in upfield-shifted peak.

FIG. 28. a-d) Cross section SEM of about 0.5 mAh cm$^{-2}$ Li deposition under the protection of DSN after 5 cycles of stripping/deposition. e-g) Cross section SEM of the DSN coating after 50 cycles of Li stripping/deposition. Note: The DSN layer covers deposited Li well and remains nearly intact after long-term cycling except showing signs of peeling off for cross-section SEM. For FIG. 28f, observation is made of the chunky Li deposits covered by DSN coating layer after 50 cycles.

FIG. 29. a) Picture of self-healing test of DSN. b) Stress-strain curves of pristine DSN, DSN healed at room temperature (r.t.) for about 12 h, and DSN healed for about 10 min. Strain rate: about 10 mm/min. c-e) Pictures after stretching test of pristine DSN (c), DSN healed for about 12 h (d), and DSN healed for about 10 min (e). Note: The two individually stained DSN materials are stuck together and then stretched after resting at room temperature for about 6 h. The combined DSN did not break at the middle (FIG. 29a). The stress-strain curve of pristine DSN and about 12 h healed DSN show similar profile while the DSN healed for about 10 minutes shows a much lower yielding point and breakage along a propagating notch in the adhesion region when stretching.

FIG. 31. The FTIR spectra of DSN over time when exposed to humidity. Zoomed-in plot from about 1500 cm$^{-1}$ to about 700 cm$^{-1}$ (a) and from about 3800 cm$^{-1}$ to about 2500 cm$^{-1}$ (b). Note: Within about 10-minute exposure to humidity, the Al—O vibration continuously decreased while O—H vibration increased, indicating hydrolysis of Al—O bonding to some degree. After about 10-minute exposure, the hydrolysis almost stopped since the FTIR curves for about 10 min and about 60 min seemed the same.

FIG. 32. FTIR spectra of DSN on Cu and DSN on Cu with about 1 mAh cm$^{-2}$ Li deposition. Note: Compared with the pristine DSN, the thin DSN layer after Li deposition is almost identical, despite the C=O vibration of carbonate electrolyte.

FIG. 33. a,c) The lithium transference number (LTN) measurement of the pristine DSN material (a) and the DSN after electrolyte soaking (c) in Li∥Li symmetric cell. Constant voltage applied: about 100 mV. b,d) Nyquist plot of the pristine DSN (b) and the DSN after electrolyte soaking (d) before and after polarization. Note: The electrolyte used for soaking is about 1 M LiPF$_6$ in EC/DEC (v:v=about 1:1) with about 10 wt. % FEC additive, the same as used for all battery tests. Before measurement, addition is made of about 5 wt. % diglyme to wet the DSN film to get lower resistance. The measured LTN is about 0.80 for the pristine DSN and about 0.77 for DSN after electrolyte soaking. Negligible decrease in LTN was observed after soaking.

FIG. 40. Top view SEM of deposited about 1 mAh $cm^{-2}$ Li under coating layers or on bare Cu. a, b, c) With DSN protection at different scale bars. d, e, f) With B-FTEG protection at different scale bars. g, h, i) With Si-FTEG protection at different scale bars. j, k, l) Without DSN protection (deposited on bare Cu) at different scale bars. The electrolyte used for deposition is about 1 M $LiPF_6$ in EC/DEC (v:v=about 1:1) with about 10 wt. % FEC additive. Note: For about 1 mAh $cm^{-2}$, relative larger Li deposits can be observed for DSN and B-FTEG coating, while needle or thin-coil like Li dendrites can be obtained under Si-FTEG coating or on bare Cu.

FIG. 41. Top view SEM of deposited about 0.1 mAh $cm^{-2}$ Li under coating layers or on bare Cu. a, b, c) With DSN protection at different scale bars. d, e, f) With B-FTEG protection at different scale bars. g, h, i) With Si-FTEG protection at different scale bars. j, k, l) Without DSN protection (deposited on bare Cu) at different scale bars. The electrolyte used for deposition is about 1 M $LiPF_6$ in EC/DEC (v:v=about 1:1) with about 10 wt. % FEC additive. Note: For about 0.1 mAh $cm^{-2}$, it can be regarded as the initial stage of Li deposition. Relative larger Li deposits can be observed for DSN coating, while needle or thin-coil like Li dendrites can be obtained under B-FTEG, Si-FTEG coating, or on bare Cu.

FIG. 44. Comparison of contact angle of the electrolyte (about 1 M $LiPF_6$ in EC/DEC (v:v=about 1:1) with about 10 wt. % FEC additive) on DSN coated Li (a) and bare Li (b). c, d) Top-view SEM of DSN coated Li. e, f) Energy dispersive X-ray spectroscopy (EDS) of DSN coated Li. Scheme: C; O; F; and Al. Note: The contact angle of about 75 μL of the electrolyte on DSN coated Li is larger than that on bare Li, indicating that DSN has been modified onto Li surface. Since Li is readily oxidized in atmosphere, the exact contact angle values were not measured. For DSN coated Li, the SEM images (FIGS. 42$c$ and $d$) show severe charging effect, indicating the appearance of non-conductive polymer. The EDS images (FIGS. 42$e$ and $f$) show uniform distribution of C, O, F, and Al elements, which proves the uniform coating of DSN on Li surface.

FIG. 45. Charge/discharge profile at various rates from about C/10 to about 1 C. Voltage traces of bare Li||NMC full cell (a) and DSN Li||NMC one (b). c) Rate capability of bare Li||NMC and DSN Li||NMC full cells.

FIG. 46. Charge/discharge profile of different cycle numbers for long term cycling. Voltage traces of a) bare Li||NMC full cell and b) DSN Li||NMC one. c) Impedance of bare Li||NMC and DSN Li||NMC full cells before and after long term cycling. Note: This significant difference in rate capability and cyclability arises from the dramatic differences in impedance for the two types of full cells. The impedance of DSN coated Li||NMC full cell is smaller before and after long-term cycling than that of bare Li one.

FIG. 48. Force field atom names and partial charges for a) FTEG oligomer ("linker"), b) aluminate "node", c) large aluminate node, and d) tetrafluoroaluminate. Structures (a) and (b) were used to generate the force field parameters specified in Table 3, whereas (c) and (d) were used to validate the use of the AMBER parameterization procedure.

FIG. 51. Snapshots of initial configuration for the network with periodic tetrahedral topology (n=128 FTEG oligomers) oriented a) orthogonal to x-y plane and b) rotated 45° from (a) about y-axis. These topologies were discarded in favor of dynamically generated ones (see Section 4.2). Aluminum atoms shown as circles and FTEG linkers shown as lines.

FIG. 53. Coulombic efficiency of a) bare Cu electrode and b) DSN modified Cu electrode. The former is determined to be about 94.3% while the latter to be about 95.8%. c) Zoomed-in comparison of final stripping step. Note: The average CE is calculated by dividing the total stripping capacity by the total deposition capacity after the formation cycle. Measurement of Coulombic efficiency using standard protocol: (1) perform one initial formation cycle with Li deposition of about 5 mAh cm$^{-2}$ on Cu under about 0.5 mA cm$^{-2}$ current density and stripping to about 1 V; (2) deposit about 5 mAh cm$^{-2}$ Li on Cu under about 0.5 mA cm$^{-2}$ as Li reservoir; (3) repeatedly strip/deposit Li with about 1 mAh cm$^{-2}$ under about 0.5 mA cm$^{-2}$ for 10 cycles; and (4) strip all Li to about 1 V.

FIG. 54. Rest of bulk DSN material at room temperature, showing the flowability of DSN material.

DESCRIPTION

Proposed Concept

A stable interface at a Li metal anode is desired to ensure uniform lithium deposition. A solid electrolyte interphase (SEI) layer on a surface of lithium metal provides a lithium ion conducting pathway for lithium metal deposition. However, a composition of the SEI layer is highly non-uniform and brittle as it is composed of a mixture of organic and inorganic compounds. A variation in local current density and a large volumetric change of lithium deposition results in cracking of the SEI layer and subsequent dendritic growth. In embodiments of this disclosure, a class of ion-conducting organic networks (IONs) is proposed as a protective interfacial layer to provide high capacity and highly stable Li metal anodes.

For batteries to achieve reasonable charging capabilities, high current densities of about 3 mA/cm$^{-2}$ and above are desired. Such high current cycling can place greater strain on an interfacial stability of a Li metal anode. Preventing the cracking of an SEI layer demands an improved approach. Here some embodiments propose ion-conducting organic networks (IONs) as stable artificial SEI layers to protect a Li metal anode. An ION is designed to be a Li ion conductor and stable versus Li metal. An ION-containing interfacial layer can conformably coat a lithium metal surface by virtue of its synthetic versatility, and its material property can be further tailored through engineering its structure at a molecular level. Further, an ION is readily processed, and can be spin-coated, drop-casted, or even roll-to-roll pressed to form an interfacial layer. The high stability, high processability, and high Li ion conductivity of an ION can render an artificial SEI layer to have highly uniform lithium ion conduction and reduce the creation of "hot spots," where lithium ion flux is dramatically increased due to the formation of pinholes.

Molecular Design

Figure 1A:
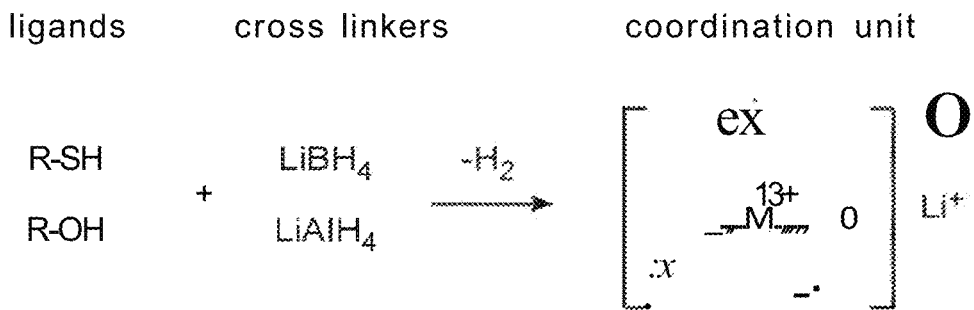
FIG. 1. a) Proposed synthetic scheme for ion-conductive organic networks (IONs); b) Proposed examples of organic ligand-containing precursors to form networks for IONs (precursors of hard ligands: trimethylthiolbenzene (TMTB) and hexamethylthiolbenzene (HMTB); precursors of soft ligands: 1H,1H,11H,11H-perfluoro-3,6,9-trioxaundecane-1,11-diol (FTEG), tetraethylene glycol (TEG), polyethylene glycol (PEG) or hydroxyl-terminated polyethylene oxide (PEO) with n≥2, polypropylene glycol (PEG) or hydroxyl-terminated polypropylene oxide (PPO) with n≥2, and hydroxyl-terminated polydimethylsiloxane (PDMS) with n≥2); c) Schematic structure of an ION.
Figure 1B:
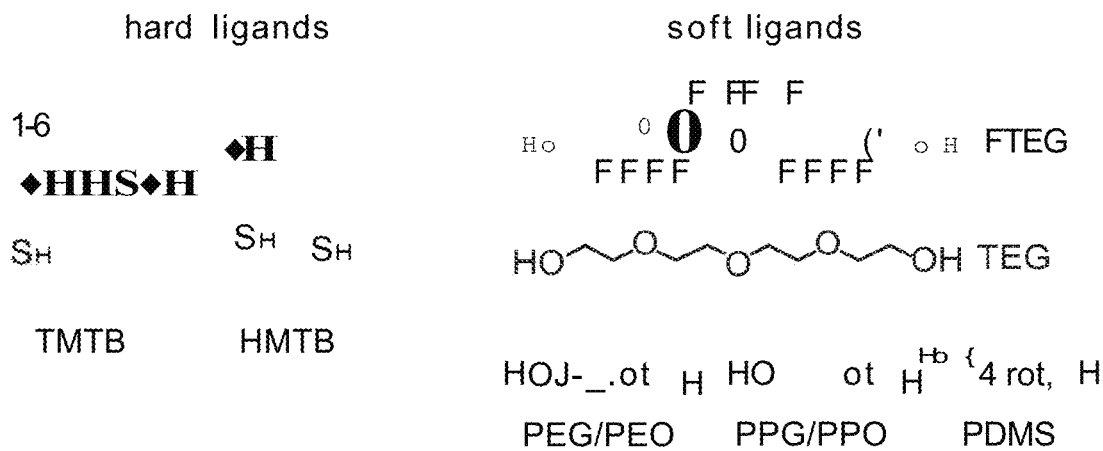

To form a substantially single-ion conductive network structure of an ION of some embodiments, a condensation reaction between metal hydrides (as cross linkers) and organic ligand (or organic linker)-containing precursors is proposed (FIG. 1a). For some embodiments of this reaction, two types of ligands are proposed, hard (or rigid) ligands and soft (or flexible) ligands, and two types of coordination centers are proposed, boron (B) and aluminum (Al) (FIGS. 1a and 1b). The proposed reaction is streamlined and clean, producing $H_2$ as a sole byproduct.

Figure 1C:
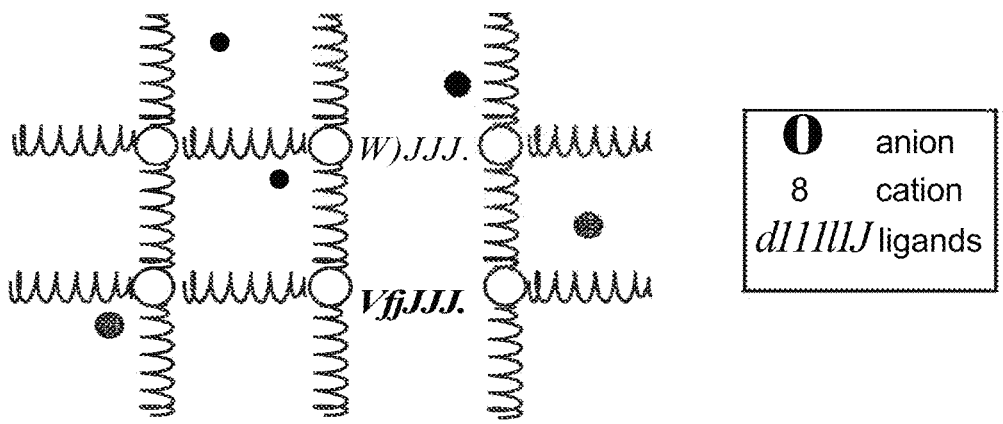
Figure 1:
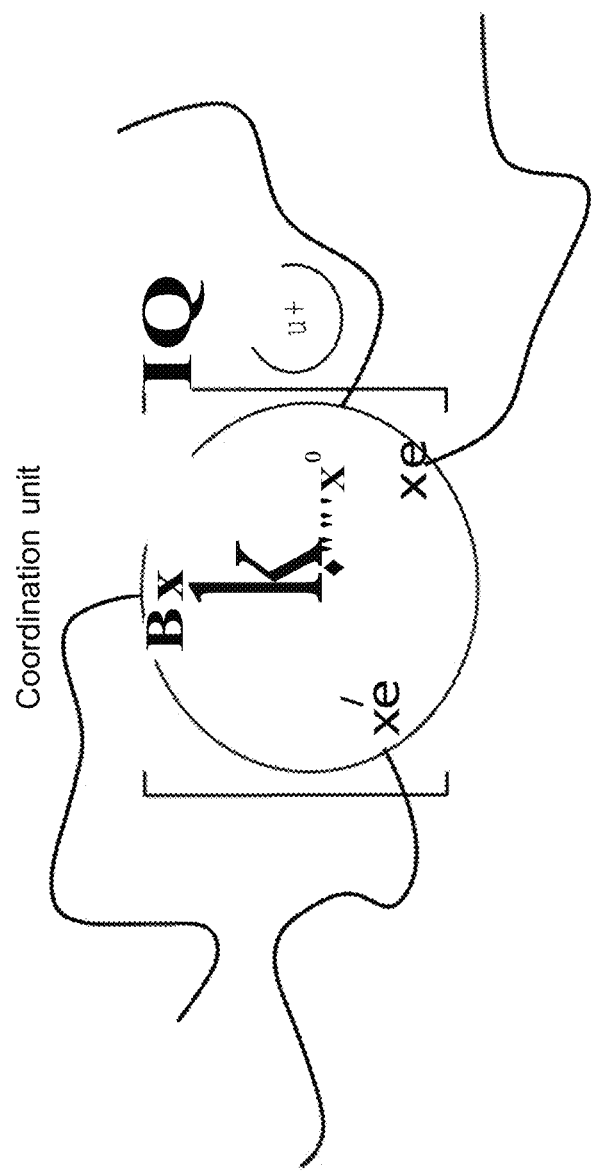

FIG. 1c is a schematic illustration of a structure of an ION of some embodiments. The ION includes multiple anionic coordination units and multiple organic ligands or (organic linkers) bonded through the anionic coordination units.

The organic ligands can be hard organic ligands that are relatively rigid, such as including cyclic hydrocarbon moieties, which may be saturated or unsaturated, soft organic ligands in the form of linear chains that are relatively flexible, such as polyalkylene oxide chains or polysiloxane chains, or a hybrid of such hard and soft organic ligands.

Referring to FIG. 1c, each anionic coordination unit includes a metal cation $M^{m+}$, where M is a metalloid (e.g., B), a post-transition metal (e.g., Al or zinc (Zn)), a transition metal (e.g., cobalt (Co), nickel (Ni), copper (Cu), or iron (Fe)), or another metal, and m is an integer that is 1 or greater than 1, such as 2 or 3. Each anionic coordination unit further includes multiple non-metal anions $X^-$ bonded to the metal cation $M^{m+}$ through metal coordination bonds, where X is oxygen (O), sulfur (S), or another non-metal. As shown in FIG. 1c, the anionic coordination unit is a four-coordinate complex, with the four non-metal anions $X^-$ bonded to the metal cation $M^{m+}$ in a tetrahedral geometry, with an overall negative charge of magnitude (4−m), such as −1 or −2, and with four organic ligands covalently bonded to respective ones of the four non-metal anions $X^-$.

It is further contemplated that multiple sub-populations or groups of coordination units can be included in the ION of some embodiments, where each sub-population of coordination units includes a respective and different metal. For example, two or more different metals can be selected from Al, B, and silicon (Si) to tune properties desired for the ION, such as for a protective, interfacial layer or coating. For example, the ION can include coordination units based on $Al^{3+}$ cross-linking center, and $B^{3+}$ cross-linking center. Both of these coordination units can impart single-ion conductivity yet can impart significantly different mechanical properties. During the synthesis of the ION, the molar ratio between $Al^{3+}$ and $B^{3+}$ cross-linking centers can be tuned. Such a chemically mixed double cross-linking network is different from a physical mixing of two materials, and such a double cross-linking network can provide high tunability of properties.

The ION further includes counterions dispersed in a bonded network of the anionic coordination units and the organic ligands. The counterions include lithium cations (or $Li^+$) that are mobile within the bonded network. Transport of lithium cations can occur via a hopping mechanism between adjacent anionic coordination units, where a higher density (or concentration) of the anionic coordination units can promote faster transport of lithium cations and higher lithium ion conductivity. A molecular structure of the organic ligands, such as in terms of size or in term of rigidity or flexibility, can be selected to tune an average spacing between adjacent anionic coordination units to promote higher lithium ion conductivity. In some embodiments, a high concentration of the anionic coordination units in the ION can be reflected by a high concentration of lithium cations as counterions in the ION (in view of charge balance to yield an overall charge neutral material), where a concentration of lithium ions can be at least about 0.1% by weight relative to a total weight of the ION, such as at least about 0.3% by weight, at least about 0.5% by weight, at least about 0.8% by weight, at least about 1% by weight, at least about 2% by weight, at least about 3% by weight, or at least about 4% by weight, and up to about 5% by weight or greater, or up to about 7% by weight or greater. Other counterions are contemplated, such as sodium cations, calcium cations, or magnesium cations.

The resulting ION can exhibit various desirable properties, including a high lithium ion conductivity and a high lithium transference number. In some embodiments, an ionic conductivity of the ION is at least about $10^{-7}$ S/cm at room temperature (25° C.), such as at least about $3 \times 10^{-7}$ S/cm, at least about $5 \times 10^{-7}$ S/cm, at least about $8 \times 10^{-7}$ S/cm, at least about $10^{-6}$ S/cm, at least about $3 \times 10^{-6}$ S/cm, at least about $5 \times 10^{-6}$ S/cm, at least about $8 \times 10^{-6}$ S/cm, at least about $10^{-5}$ S/cm, at least about $3 \times 10^{-5}$ S/cm, at least about $5 \times 10^{-5}$ S/cm, or at least about $8 \times 10^{-5}$ S/cm, and up to about $10^{-4}$ S/cm or greater, or up to about $10^{-3}$ S/cm or greater. Further, transport of lithium cations contributes a high fraction of the ionic conductivity, namely the ionic conductivity is selective for lithium cations, as reflected in a lithium transference number of at least about 0.4 at room temperature, such as at least about 0.5, at least about 0.6, at least about 0.7, or at least about 0.8, and up to about 0.9 or greater, or up to about 0.95 or greater.

Figure 2:
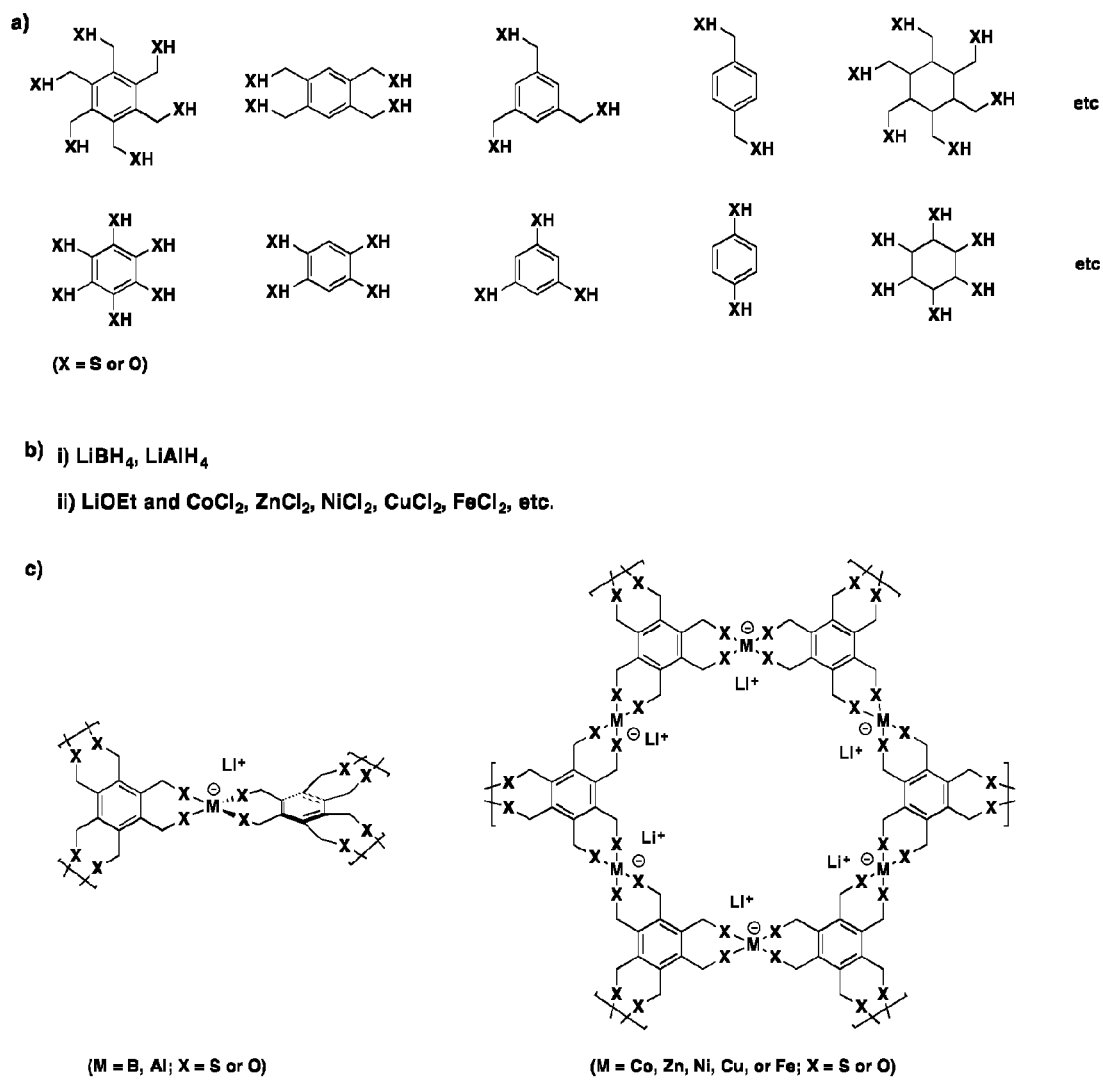
FIG. 2. a) Examples of hard organic ligand-containing precursors; b) examples of metal-containing precursors; c) example of a molecular structure of a resulting ION.

FIG. 2 shows further examples of hard organic ligand-containing precursors (FIG. 2a), metal-containing precursors (FIG. 2b), and a molecular structure of a resulting ION (FIG. 2c).

Referring to FIG. 2a, examples of hard organic ligand-containing precursors include cyclic hydrocarbons, which can be unsaturated, such as in the form of arenes that are bi-substituted, tri-substituted, tetra-substituted, hexa-substituted, or otherwise multi-substituted with —XH or -L-XH, where X is O or S, and L is a linker moiety, such as selected from alkylenes or other hydrocarbon moieties. Cyclic hydrocarbons also can be saturated, such as in the form of cycloalkanes that are bi-substituted, tri-substituted, tetra-substituted, hexa-substituted, or otherwise multi-substituted with —XH or -L-XH, where X is O or S, and L is a linker moiety, such as selected from alkylenes or other hydrocarbon moieties. Other unsaturated hydrocarbons are encompassed within examples of hard organic ligand-containing precursors, such as alkenes and alkynes.

Referring to FIG. 2b, examples of metal-containing precursors include metal hydrides, such as lithium aluminum hydride and lithium boron hydride. Additional examples of metal-containing precursors include a combination of a lithium organocomplex, such as ethoxylithium or another alkoxylithium, and a metal halide, such as cobalt chloride, zinc chloride, nickel chloride, copper chloride, or iron chloride.

Reaction between a hard organic ligand-containing precursor and a metal-containing precursor results in an ION including anionic coordination units and hard organic ligands bonded through the anionic coordination units, an example of which is shown in FIG. 2c. The organic ligands can include cyclic hydrocarbon moieties resulting from the reaction, which can be unsaturated, such as bivalent, trivalent, tetravalent, hexavalent, or otherwise multivalent forms of arenes, or can be saturated, such as bivalent, trivalent, tetravalent, hexavalent, or otherwise multivalent forms of cycloalkanes.

Figure 3A:
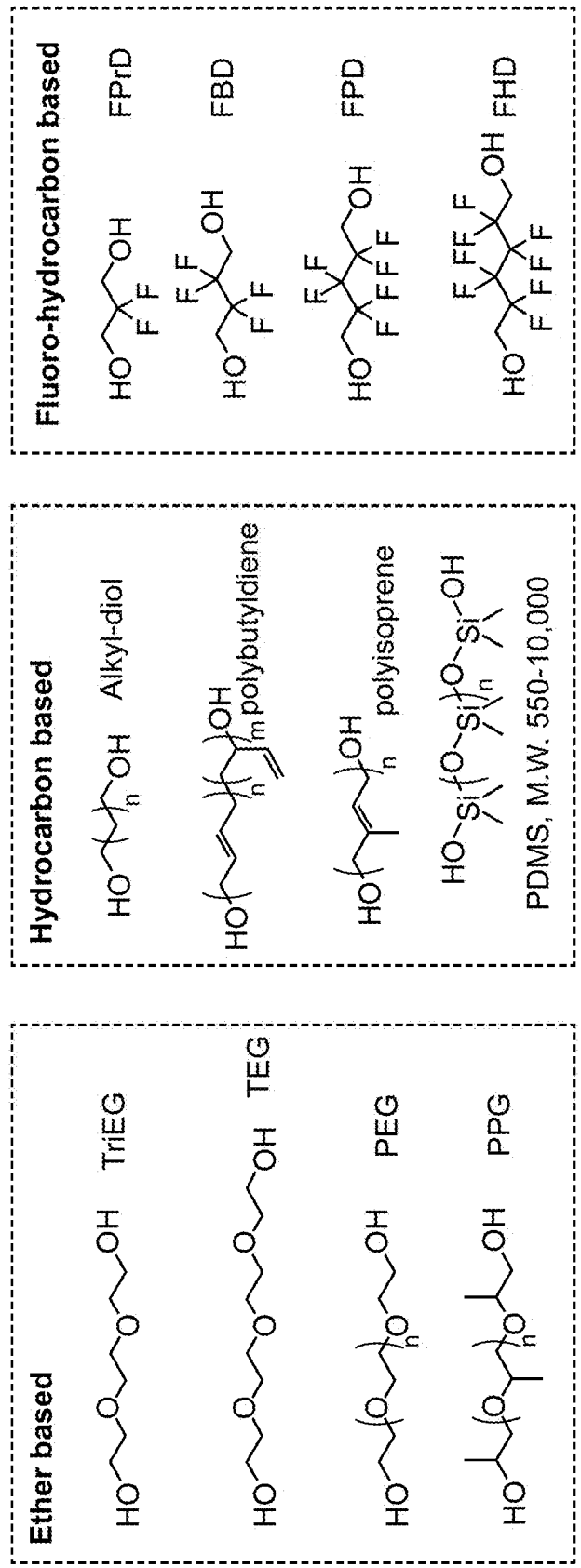
FIG. 3. a) Examples of soft organic ligand-containing precursors; b) examples of metal-containing precursors; c) example of a molecular structure of a resulting ION.
Figure 3A:
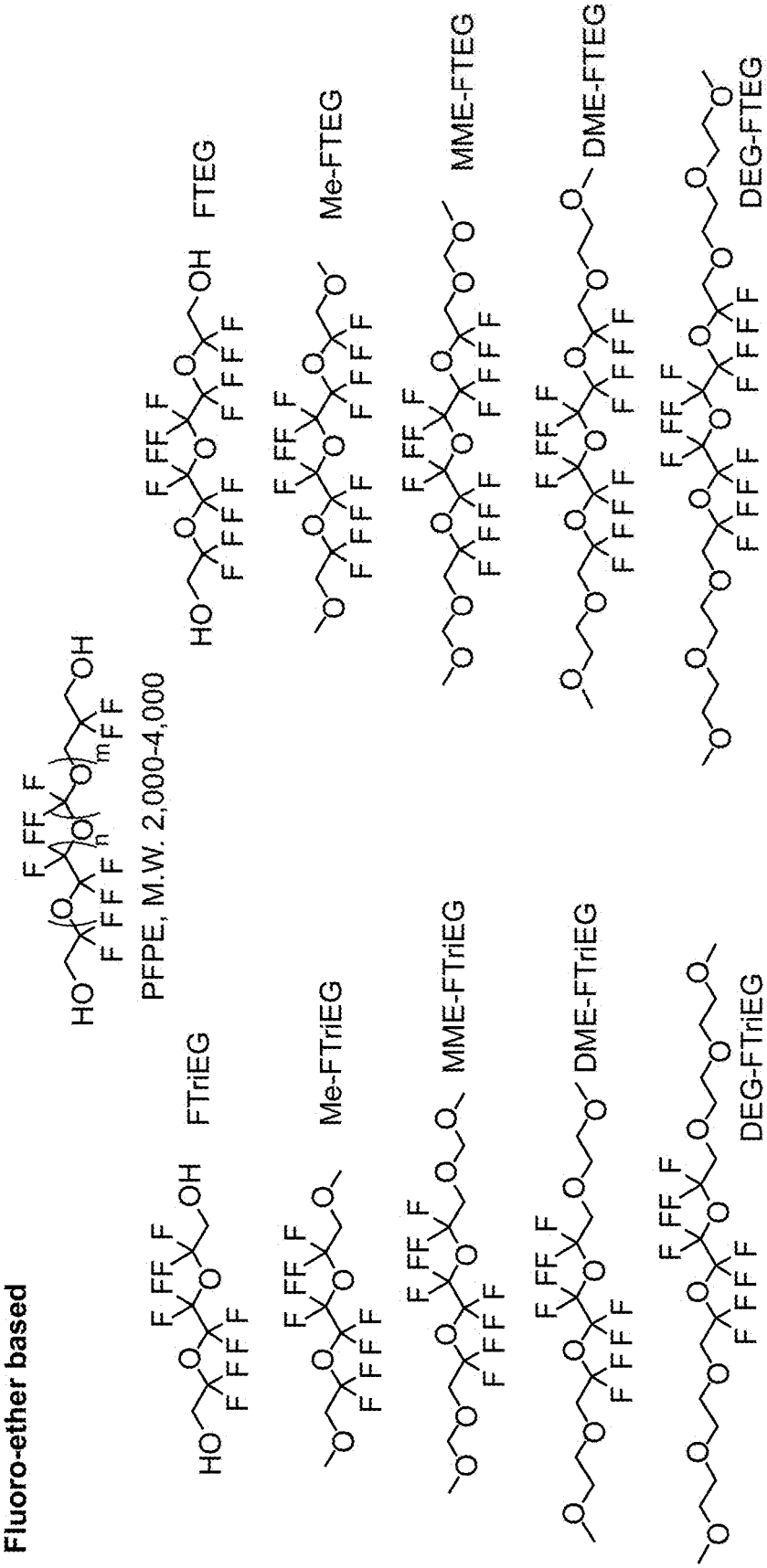
Figures 3B, 3C:
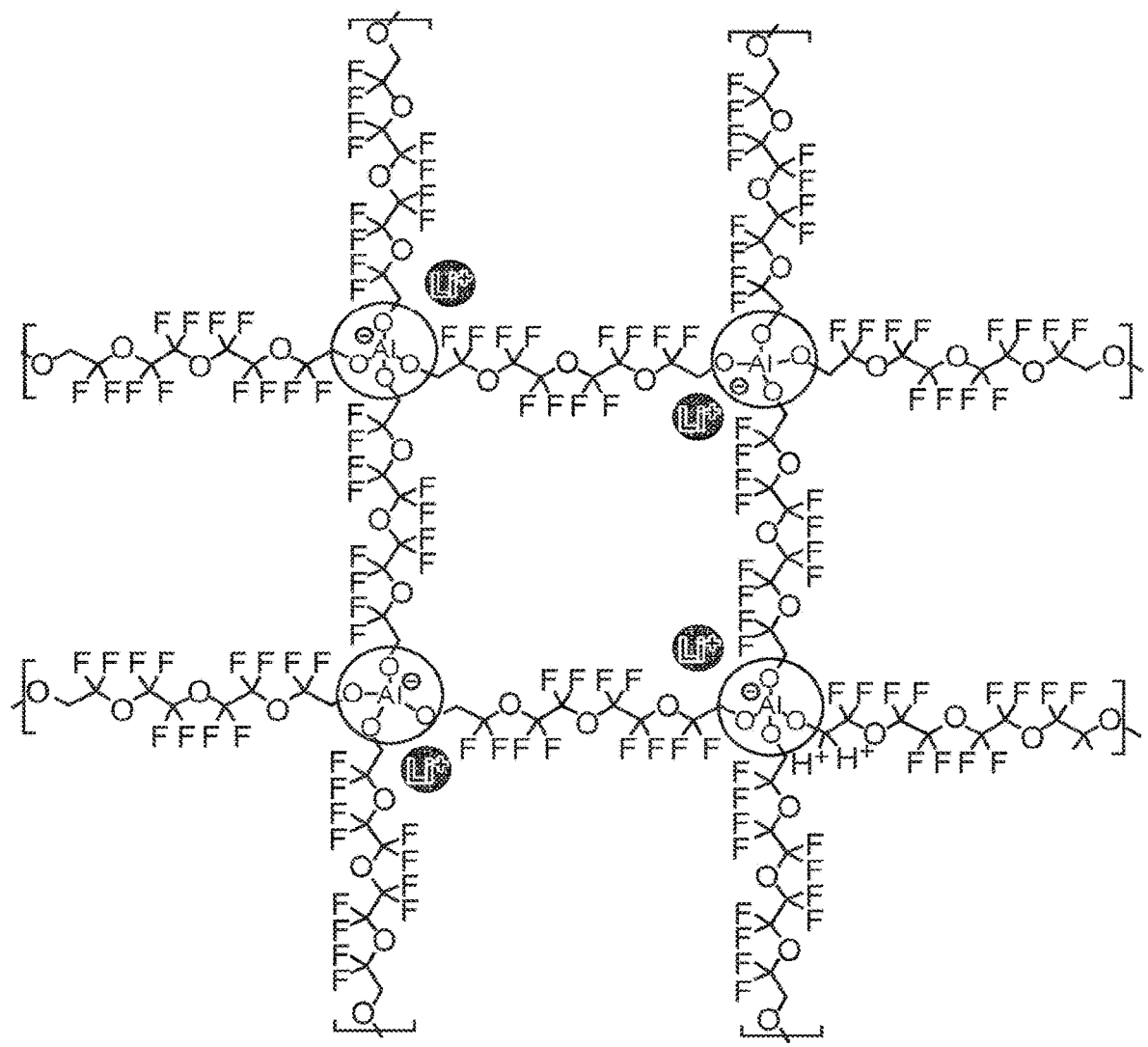
Figure 3:
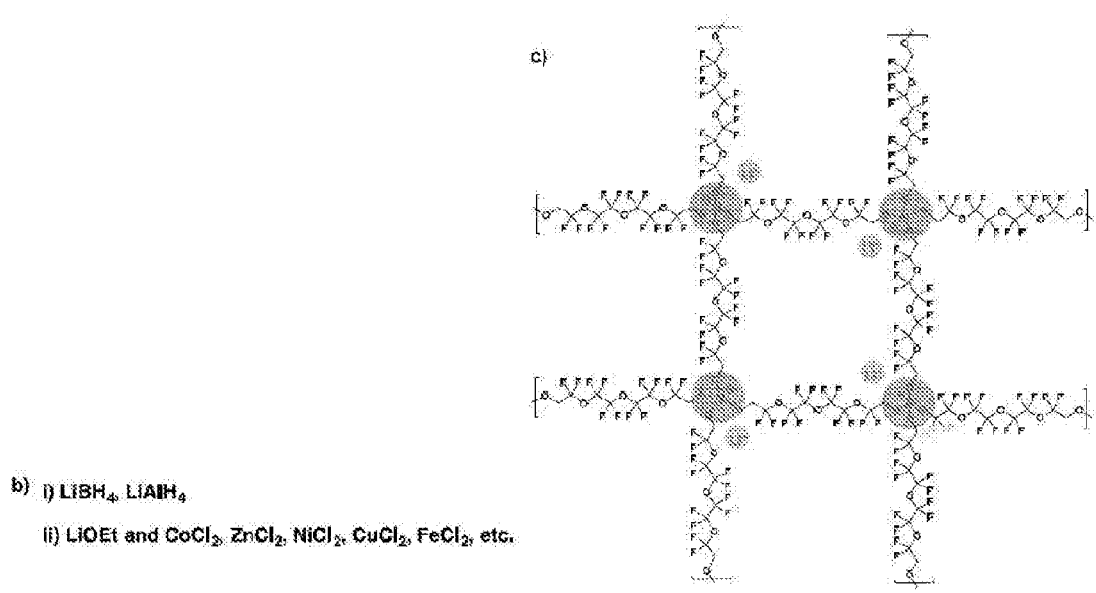

FIG. 3 shows further examples of soft organic ligand-containing precursors (FIG. 3a), metal-containing precursors (FIG. 3b), and a molecular structure of a resulting ION (FIG. 3c).

Referring to FIG. 3a, examples of soft organic ligand-containing precursors include linear chains, such as ether-based precursors in the form of hydroxyl-terminated polyalkylene oxide chains of the form of HO-A-(O-A-)$_n$O-A-OH, where n is an integer that is 0 or greater, 1 or greater, 2 or greater, or 3 or greater, and up to 5 or greater or up to 10 or greater, and A is an alkylene, such as methylene, ethylene or propylene, and where each polyalkylene oxide chain can be mono-substituted or multi-substituted with one or more substituent groups. Examples of soft organic ligand-containing precursors also include hydrocarbon-based precursors in the form of hydroxyl-terminated hydrocarbon chains, where each hydrocarbon chain can be saturated or unsaturated and can be mono-substituted or multi-substituted with one or more substituent groups, such as (i) alkyl-diols in the form of HO-A-(A-)$_n$A-OH, where n is an integer that is 0 or greater, 1 or greater, 2 or greater, or 3 or greater, and up to 5 or greater or up to 10 or greater, and A is an alkylene, such as methylene, ethylene or propylene, (ii) hydroxyl-terminated polybutyldiene chains, (iii) hydroxyl-terminated polyisoprene chains, and (iv) hydroxyl-terminated polyisobutene chains. Examples of soft organic ligand-containing precursors also include fluoro-hydrocarbon-based precursors in the form of hydroxyl-terminated fluorinated hydrocarbon chains, where each hydrocarbon chain can be saturated or unsaturated and can be mono-substituted or multi-substituted with one or more fluoro groups, such as fluorinated alkyl-diols in the form of HO-A-(A'-)$_n$A-OH, where n is an integer that is 1 or greater, 2 or greater, or 3 or greater, and up to 5 or greater or up to 10 or greater, and A and A' each is an alkylene, such as methylene, ethylene or propylene, A and A' can be same alkylene or can be different alkylenes, A is unsubstituted, and A' is mono-substituted or multi-substituted with one or more fluoro groups. Examples of soft organic ligand-containing precursors also include fluoro-ether-based precursors in the form of hydroxyl-terminated fluorinated polyalkylene oxide chains of the form of (i) HO-A-(O-A'-)$_n$O-A-OH, where n is an integer that is 1 or greater, 2 or greater, or 3 or greater, and up to 5 or greater or up to 10 or greater, and A and A' each is an alkylene, such as methylene, ethylene or propylene, A and A' can be same alkylene or can be different alkylenes, A is unsubstituted or mono-substituted or multi-substituted with one or more fluoro groups, and A' is mono-substituted or multi-substituted with one or more fluoro groups, and (ii) HO-A-(O-A'-)$_n$O-(A''-O—)$_m$A-OH, where n is an integer that is 1 or greater, 2 or greater, or 3 or greater, and up to 5 or greater or up to 10 or greater, m is an integer that is 1 or greater, 2 or greater, or 3 or greater, and up to 5 or greater or up to 10 or greater, and A, A', and A'' each is an alkylene, such as methylene, ethylene or propylene, A and A' can be same alkylene or can be different alkylenes, A' and A'' are different alkylenes, A is unsubstituted or mono-substituted or multi-substituted with one or more fluoro groups, A' is mono-substituted or multi-substituted with one or more fluoro groups, and A'' is mono-substituted or multi-substituted with one or more fluoro groups. Examples of soft organic ligand-containing precursors also include hydroxyl-terminated fluorinated polyalkylene oxide chains specified in (i) and (ii) above, where one or both terminal hydroxyl groups are replaced with alkoxy groups or polyalkylene oxide chains. Linear chains also can include hydroxyl-terminated polysiloxane chains in the form of HO—SiR$_1$R$_2$—(O—SiR$_1$R$_2$-)$_n$O-SiR$_1$R$_2$—OH, where n is an integer that is 0 or greater, 1 or greater, 2 or greater, or 3 or greater, and up to about 5 or up to about 10, R$_1$ and R$_2$ can be the same or different and can be selected from alkyls or other hydrocarbon moieties. Other linear chains are encompassed within examples of soft organic ligand-containing precursors, such as polyamide chains, polyolefin chains, polyester chains, and polyurethane chains.

Referring to FIG. 3b, examples of metal-containing precursors include metal hydrides, such as lithium aluminum hydride and lithium boron hydride. Additional examples of metal-containing precursors include a combination of a lithium organocomplex, such as ethoxylithium or another alkoxylithium, and a metal halide, such as cobalt chloride, zinc chloride, nickel chloride, copper chloride, or iron chloride.

Reaction between a soft organic ligand-containing precursor and a metal-containing precursor results in an ION including anionic coordination units and soft organic ligands bonded through the anionic coordination units, an example of which is shown in FIG. 3c. The organic ligands can include linear chains resulting from the reaction, such as polyalkylene oxide chains in the form of -A-(O-A-)$_n$O-A-, hydrocarbon chains in the form of -A-(A-)$_n$A-, fluorinated hydrocarbon chains in the form of -A-(A'-)$_n$A-, fluorinated polyalkylene oxide chains in the form of -A-(O-A'-)$_n$O-A- or -A-(O-A'-)$_n$O-(A''-O-)$_m$A-, or polysiloxane chains in the form of —SiR$_1$R$_2$—(O—SiR$_1$R$_2$-)$_n$O-SiR$_1$R$_2$—.

Applications of IONs

Some embodiments of this disclosure relate to improved lithium metal anodes and the incorporation of such anodes in electrochemical energy storage devices, such as batteries. Some embodiments of this disclosure can effectively address the challenges of lithium metal anodes that otherwise can lead to low Coulombic efficiency, short cycle life, and safety concerns resulting from lithium dendrite formation. Batteries incorporating such improved anodes can show high Coulombic efficiency that is retained over extended cycling, and can show little or no formation of lithium dendrites at practical current densities. Together with the high specific capacity of lithium metal, batteries incorporating such improved anodes are desirable for use in various applications, including portable electronics, electric vehicles, and grid storage, among others.

Figure 4A:
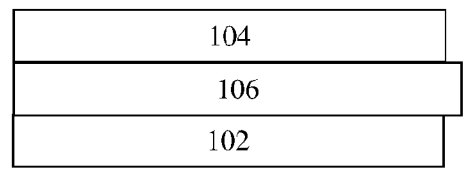
FIG. 4a. Schematic of an embodiment of a lithium metal anode.

Referring to an embodiment of FIG. 4a, a lithium metal anode is provided, including a current collector 102 and a protective, interfacial layer or coating 104 disposed over and covering at least a portion of a top surface of the current collector 102. The current collector 102 can be formed of a metal (e.g., copper), a metal alloy, or other suitable electronically conductive material. As shown in FIG. 4a, an anode material 106, which corresponds to lithium metal in this embodiment, is disposed between the current collector 102 and the interfacial layer 104, and is deposited on the current collector 102 during cycling. Other anode materials are contemplated, such as sodium metal, calcium metal, or magnesium metal. In the embodiment of FIG. 4a, the interfacial layer 104 is formed of, or includes, an ION. The interfacial layer 104 readily allows the passage of lithium ions to afford rapid ion transport, and may also possess stretchability and softness to accommodate and sustain the pressure induced by any lithium dendrite formation. The interfacial layer 104 can have a thickness in a range of about 1 nm to about 100 μm, such as about 10 nm to about 100 μm, about 50 nm to about 90 μm, about 50 nm to about 80 μm, about 50 nm to about 70 μm, about 50 nm to about 60 μm, about 50 nm to about 50 μm, about 50 nm to about 40 μm, about 50 nm to about 30 μm, about 100 nm to about 30 μm, about 200 nm to about 30 μm, about 200 nm to about 20 μm, about 200 nm to about 15 μm, about 200 nm to about 10 μm, about 200 nm to about 5 μm, about 200 nm to about 3 μm, or about 500 nm to about 3 μm.

Figure 4B:
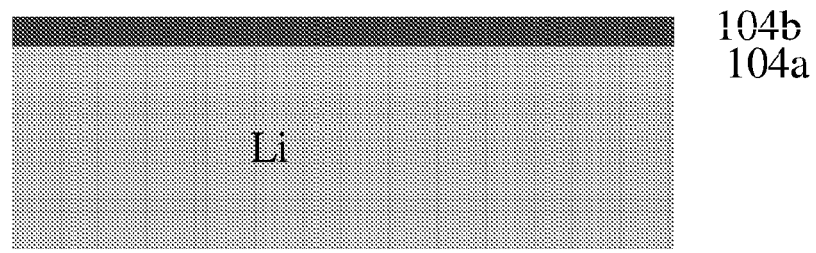
FIG. 4b. Schematic of a multi-layered implementation of an interfacial layer for a lithium metal anode.
Figure 4C:
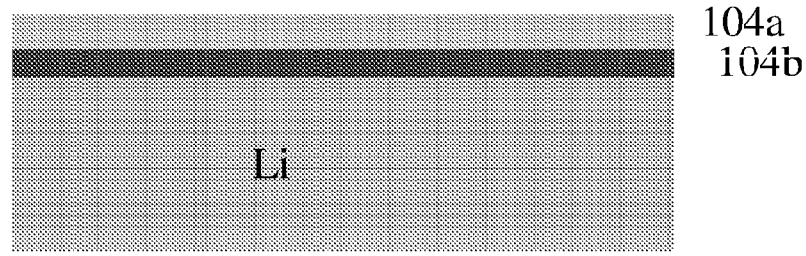
FIG. 4c. Schematic of another multi-layered implementation of an interfacial layer for a lithium metal anode.

It is also contemplated that the interfacial layer 104 can be implemented so to include multiple (two or more) sub-layers or having a gradient distribution or profile along its thickness direction. For enhanced lithium protection and referring to FIG. 4b, a multi-layered implementation of the interfacial layer 104 is shown, including a sub-layer 104a, which is in direct contact with lithium metal and is formed of, or includes, an ION having low reactivity with lithium metal and allows little electrolyte diffusion, while another sub-layer 104b is a highly ionically conductive coating and is included as an additional coating to allow faster charging and discharge while still maintaining a stable lithium metal deposition. The sub-layer 104b can be formed of, or can include, a different ION from that of the sub-layer 104b, or can be formed of another ionically conductive material that provides desired properties. It also contemplated that the order of the sub-layers 104a and 104b can be reversed, such that the sub-layer 104a is coated on the sub-layer 104b that is in direct contact with lithium metal, with the sub-layer 104a as an exterior coating to reduce electrolyte diffusion, as shown in FIG. 4c.

Figure 4D:
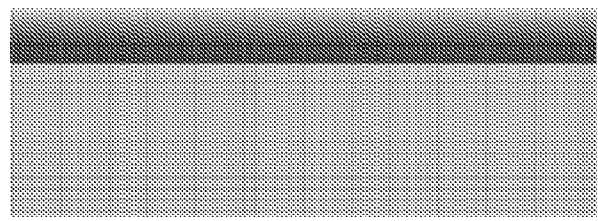
FIG. 4d. Schematic of an interfacial layer for a lithium metal anode having a gradient distribution or profile along its thickness direction.

Also, the interfacial layer 104 having a lithiophilic-lithiophobic gradient distribution or profile can enhance lithium metal anode performance. Therefore, multiple sub-layers can be coated on a surface of lithium metal to impart such gradient. Since IONs can be solution processed, different IONs can be individually and sequentially coated, to form a varying gradient distribution or profile along a thickness direction on top of lithium metal, as shown in FIG. 4d. X-ray photoelectron spectroscopy (XPS) depth profiling can be used to characterize the gradient distribution. Also, a thickness, a chemical composition, and an ordering of each sub-layer can be optimized.

IONs described herein can be used for a variety of batteries and other electrochemical energy storage devices. As shown in an embodiment of FIG. 4e, a battery includes a cathode 202, an anode 204, and an electrolyte 206 that is disposed between the cathode 202 and the anode 204. The anode 204 can be a lithium metal anode as described herein, including an ION-containing interfacial layer. The cathode 202 can be a lithium metal oxide or phosphate cathode, a sulfur cathode, or an air cathode. The electrolyte 206 can be a liquid electrolyte, such as including one or more carbonates, such as ethylene carbonate and diethyl carbonate, or one or more ethers, such as 1,2-dimethoxyethane and 1,3-dixolane.

In additional embodiments, IONs described herein can be included in solid electrolytes for solid-state batteries. For example, referring to FIG. 4e, the battery can be a solid-state battery, and the electrolyte 206 can be a solid electrolyte including an ION as described herein.

EXAMPLES

The following examples describe specific aspects of some embodiments of this disclosure to illustrate and provide a description for those of ordinary skill in the art. The examples should not be construed as limiting this disclosure, as the examples merely provide specific methodology useful in understanding and practicing some embodiments of this disclosure.

Example 1

Figure 5:
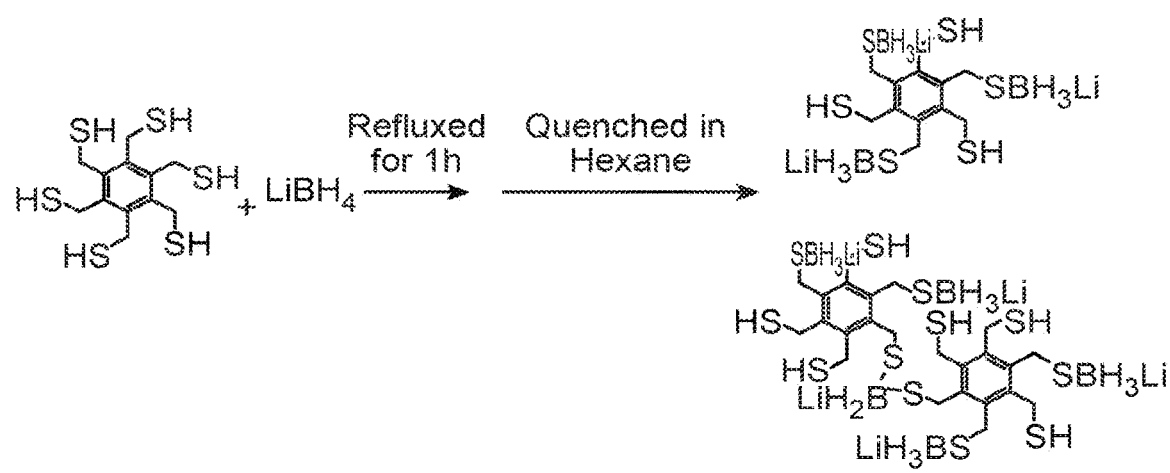
FIG. 5. Proposed reaction scheme between HMTB and $LiBH_4$ to form a solution processable intermediate of hard ION.
Figure 6:
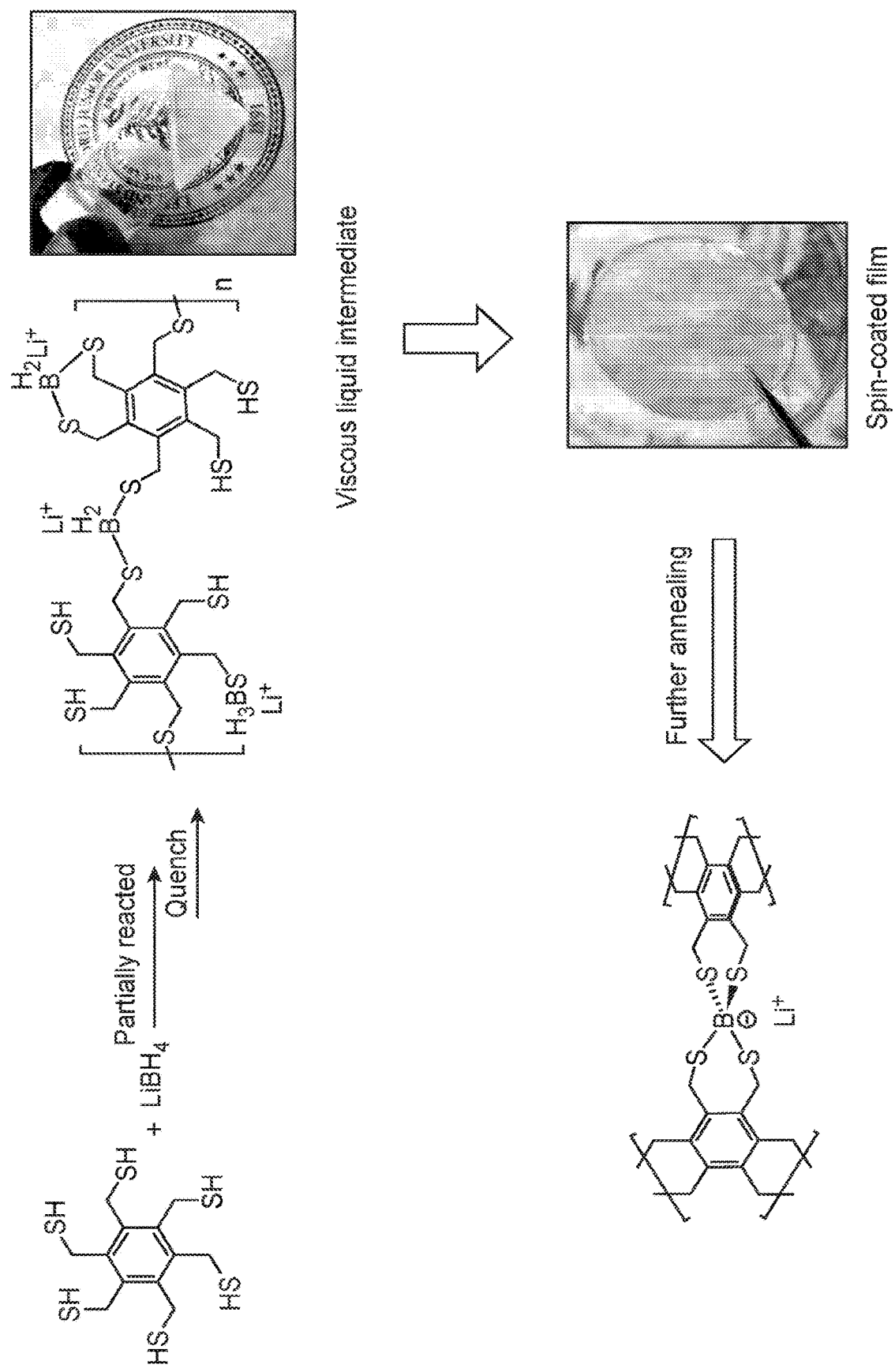
FIG. 6. Reaction between HMTB and $LiBH_4$ to form a hard ION, along with chemical structures and images of an intermediate state and a final product.

Molecular Design and Synthesis of Hard IONs:

For hard IONs (IONs including hard ligands), the reaction between hexamethylthiolbenzene (HMTB) and LiBH$_4$ is taken as an example to demonstrate the synthesis of LiB-HMTB (FIGS. 5 and 6). During LiB-HMTB formation, the material undergoes an intermediate state in which a solution becomes clear and transparent. Since both a starting material, HMTB, and a resulting product are not soluble in the solvent, tetrahydrofuran (THF), it is hypothesized that the clear solution includes a partially reacted state of an intermediate. Then, the solution is quenched with hexane and the solvent is evaporated to obtain a concentrated viscous intermediate state. This intermediate state is used as a solution processable sample, and can be either spin-coated or drop-casted on a substrate to form a continuous film. A resulting coating is then heat-treated at a moderate temperature (e.g., at or below about 100° C.) to complete the reaction. Since H$_2$ is released as a sole byproduct, this process yields a substantially pure ION product which may omit further purification. FIG. 7 shows the chemical structure of the final ION product.

Molecular Design and Synthesis of Soft IONs:

For soft IONs (IONs including soft ligands), the reaction between hydroxyl-terminated polydimethylsiloxane (PDMS) and LiBH$_4$ is taken as an example to demonstrate the synthesis of LiB-PDMS (FIG. 8a). A soft ligand-containing precursor is dissolved in 1,2-dimethoxyethane (DME) or THF and a resulting solution is sonicated for several minutes. Then LiBH$_4$ is added dropwise into the solution until no bubbles appear. The solution is placed in a glovebox overnight to obtain an intermediate state in the form of a viscous liquid. Then the intermediate state is spin-coated or drop-casted on a substrate. A resulting coating is then heat-treated to remove the solvent and to ensure a complete reaction, yielding an elastic film.

FIG. 8b presents a result showing the stability of Li metal anodes in Li||Cu cells which compares the cells with and without ION coatings. Both LiB-HMTB and LiB-PDMS coatings result in improved cycling Coulombic efficiency for over 50 cycles when compared with a blank condition. By varying ligands and coordination units, IONs can be obtained with varying mechanical strength and Li ion conduction properties.

Results:

Hard IONs

Figure 9A:
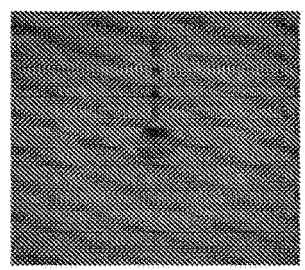
FIG. 9. a) X-ray diffraction of LiB-HMTB; b) Morphology of LiB-HMTB thin film obtained with scanning electron microscopy (SEM); c) Fourier-transform infrared spectroscopy (FTIR) spectrum of LiB-HMTB in comparison with model compound and precursors.
Figure 9B:
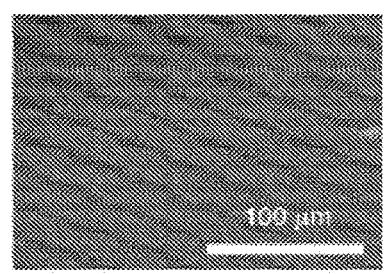
Figure 9C:
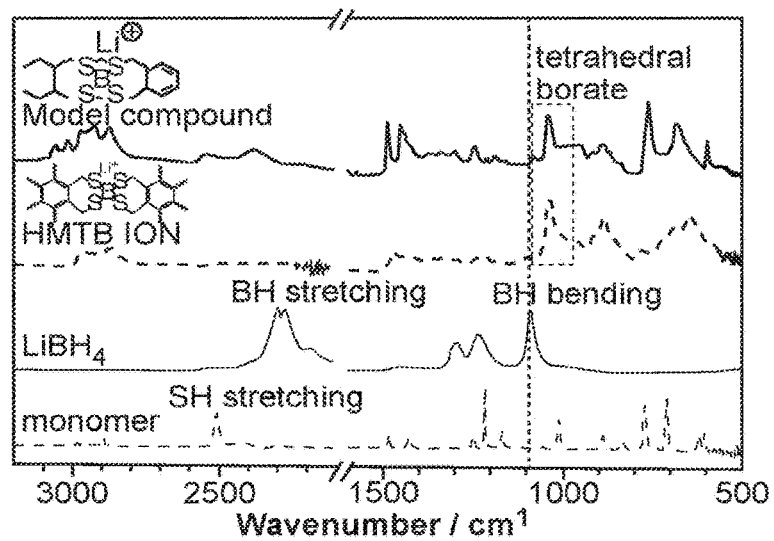

It is observed that the resulting LiB-HMTB is predominantly amorphous from its X-ray diffraction (FIG. 9a). The thin film formed from the intermediate solution on a copper (Cu) foil by spin-coating is confirmed to be substantially homogeneous without having noticeable pin-holes by scanning electron microscopy (SEM) (FIG. 9b). LiB-HMTB has a stoichiometry of Li:B:S (about 1:about 0.96:about 4.06) which was obtained by Inductively coupled plasma atomic emission spectroscopy (ICP-AES). Then, complete dehydrogenation of the HMTB monomer and LiBH$_4$ was confirmed in comparison with a model compound by Fourier-transform infrared spectroscopy (FTIR) as shown in FIG. 9c. Taken together, it is confirmed that amorphous LiB-HMTB in the desired stoichiometry can be synthesized as a high quality thin film on a substrate.

Figure 10A:
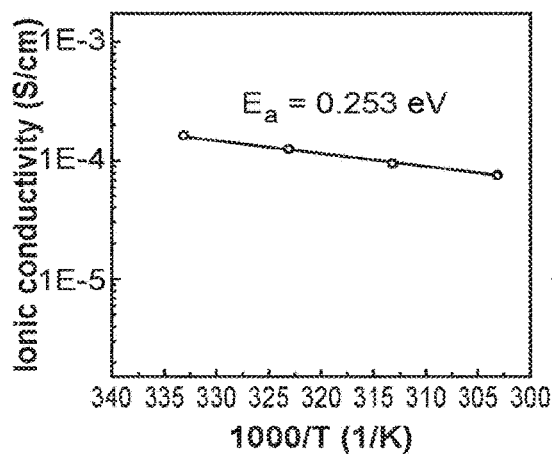
FIG. 10. a) Ionic conductivity of LiB-HMTB in the presence of propylene carbonate (about 20 wt. %). b) Lithium transference number of LiB-HMTB in the presence of propylene carbonate (about 20 wt. %). The inset shows impedance spectrum before and after the measurement.
Figure 10B:
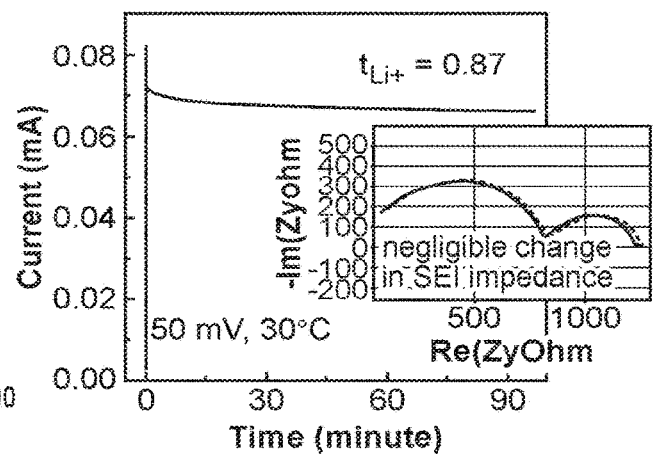

Ionic conductivity of LiB-HMTB was measured over a wide temperature window (FIG. 10a). Electrochemical impedance spectroscopy (EIS) of a bulk material in stainless steel (SS)∥SS symmetric cell is used to calculate the conductivity as well as the activation energy of Li transport. A promising conductivity of about $7.47 \times 10^{-5}$ S cm was observed at about 25° C. while showing a moderate activation energy of about 0.253 eV. Then, the Li transference number (LTN) of LiB-HMTB was obtained under constant voltage in Li∥Li symmetric cells, resulting in LTN of about 0.87 (FIG. 10b). Overall, LiB-HMTB showed desired Li ion transport properties to be capable for battery operation.

Figure 11A:
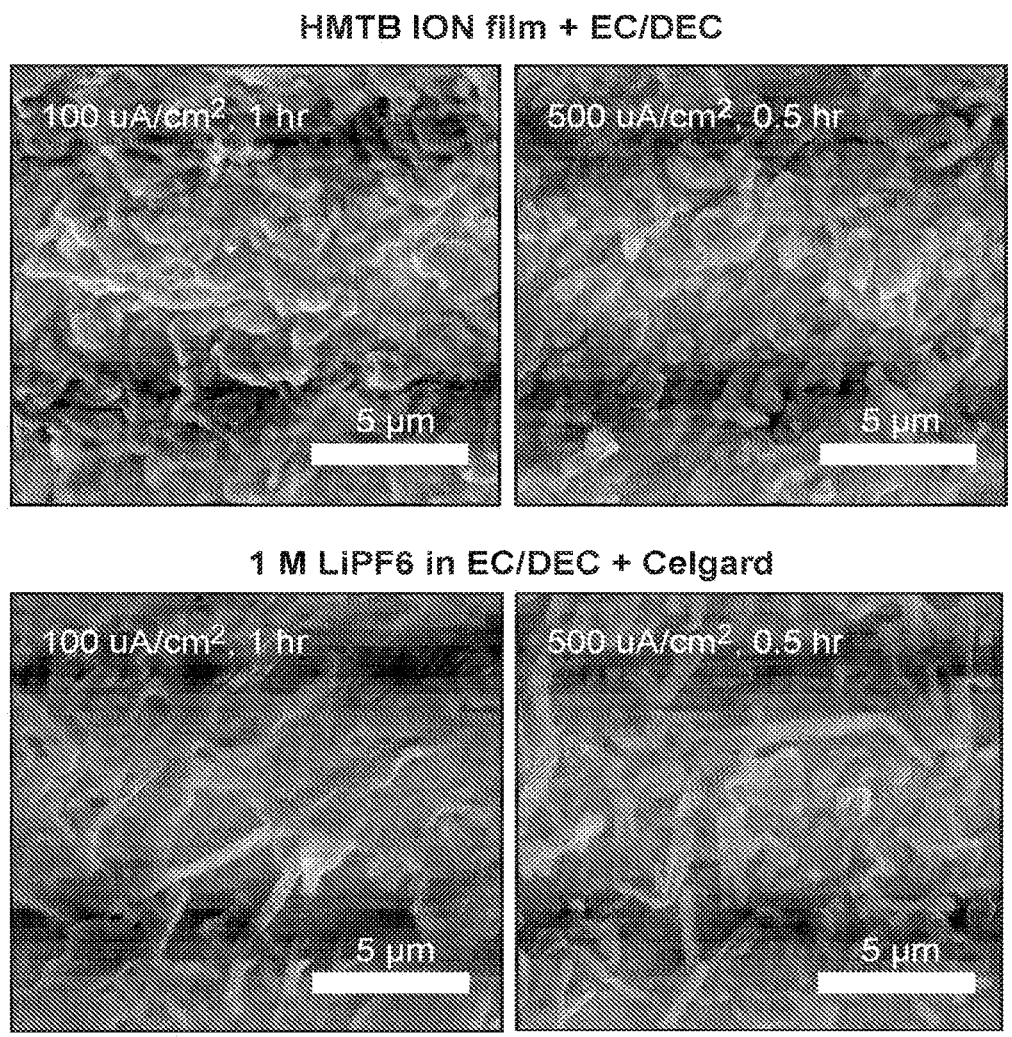
FIG. 11. a) SEM images of Cu foils after depositing Li in Li||Cu cells; b) Coulombic efficiency over cycling of Li||Cu cells. Cells with ION coatings show improved cycling stability in comparison with a blank condition.
Figure 11B:
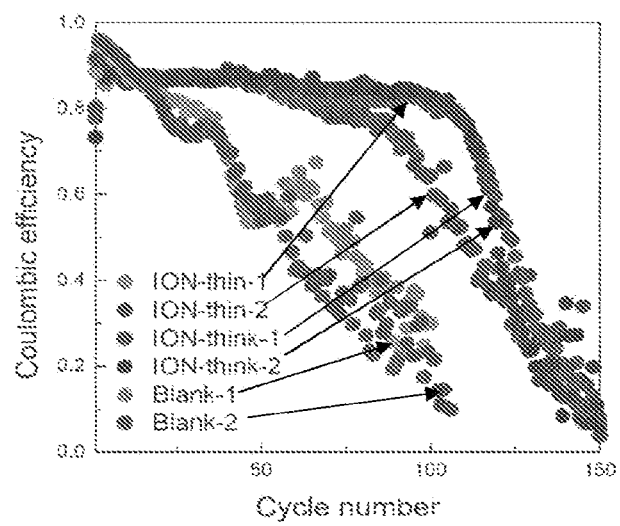

Comparison is made of Li metal deposition morphologies on a Cu foil in the presence of LiB-HMTB versus a blank condition using about 1 M $LiPF_6$ in EC/DEC electrolyte with ex-situ SEM. A fixed amount of Li was deposited onto the Cu foil, and then the coin cell was subsequently disassembled for characterization. SEM images provide information about how morphologies of Li deposits can be affected under different environments at an individual lithium particle-level and a degree of uniformity at an electrode-level, both of which are desired for high efficiency lithium cycling. It is observed that at rates of 100 $\mu A^2$ and 500 $\mu A\ cm^{-2}$, dendritic growth of Li metal was significantly suppressed in the presence of LiB-HMTB in contrast to the blank condition, which result is attributed to the substantially single-ion conductivity of LiB-HMTB (FIG. 11a). As a result of desired morphologies of Li deposits, the cycling stability of Li∥Cu cells with LiB-HMTB coating was improved over the blank condition (FIG. 11b). To measure the Coulombic efficiency over cycling, fixed amounts of Li are deposited on Cu foils with and without ION coating respectively, followed by stripping the Li fully to a cutoff voltage of about 1 V.

Soft IONs

LiAl-FTEG is taken as another example of a soft ION, which includes free $Li^+$ cations as counterions, soft fluorinated chains (derived from 1H,1H,11H,11H-perfluoro-3,6,9-trioxaundecane-1,11-diol, shortened as FTEG) as ligands, and fixed tetrahedral $Al(O)_4^-$ -anionic coordination units as cross linking centers (FIGS. 12a and b). It can be formed by the reaction between about 0.5 equivalence of $LiAlH_4$ and about 1.0 equivalence of dihydroxyl-terminated FTEG, with $H_2$ gas produced as a byproduct. The as-synthesized LiAl-FTEG in DME or THF solution is a viscous liquid while it can form a transparent soft film after solvent evaporation (FIG. 12c). Under $^1$H-NMR characterization, a peak with chemical shift of about δ4.0 ppm is assigned to Al—O—$CH_2$— ($H^b$ in FIGS. 12b and e) in FTEG, a peak at about δ3.9 ppm is assigned to H—O—$CH_2$—, while a peak with chemical shift of about 65.27 ppm corresponds to the unreacted —O—H in FTEG. Since the peak of —O—$CH_2$— shifts after the reaction, it indicates that hydrogen atoms in —O—$CH_2$— are de-shielded. The chemical environment of Al(III) center can provide such environment through the electron-withdrawing ability of 3d orbitals. Further proof of the LiAl-FTEG structure can be provided by $^1$H-NMR spectra of LiAl-FTEG formed from different molar ratios between $LiAlH_4$ and FTEG (FIG. 12d). The suffixes after "LiAl-FTEG" represent different molar ratios between hydride on $LiAlH_4$ and —OH group on FTEG. The pure LiAl-FTEG is set as LiAl-FTEG-1to1 which is the product of the reaction between about 0.5 equivalence of $LiAlH_4$ and about 1.0 equivalence of FTEG, with substantially all —OH groups reacted. Therefore, LiAl-FTEG-1to4, LiAl-FTEG-1to2, LiAl-FTEG-2to1, and LiAl-FTEG-4to1 correspond to about 0.125, about 0.25, about 1.0, and about 2.0 equivalences of $LiAlH_4$, respectively. Two evidences confirm the completion of the reaction between hydride and —OH groups. Firstly, for LiAl-FTEG-1to4 and LiAl-FTEG-1to2, the ratios of peak integral between Al—O—$CH_2$— and H—O—$CH_2$— are about 1:3 and about 1:1, respectively, indicating substantially all the hydrides on Al(III) are fully reacted with —OH. In the meantime, the peak of —O—H substantially fully disappeared for LiAl-FTEG-1to1, LiAl-FTEG-2to1, and LiAl-FTEG-4to1. Secondly, the Al—O—$CH_2$— chemical shift stays substantially constant from LiAl-FTEG-1to4 to LiAl-FTEG-1to1, while it shifts upfield from LiAl-FTEG-1to1 to LiAl-FTEG-4to1. The Al—O—$CH_2$— peak would not shift unless the chemical environment was different for LiAl-FTEG-1to1, LiAl-FTEG-2to1, and LiAl-FTEG-4to1. From LiAl-FTEG-1to4 to LiAl-FTEG-1to1, —OH group is an excess (or exact equivalence) compared to hydride, and thus this peak can remain unchanged when Al(III) center is tetrahedrally coordinated ($Al(O)_4^-$). This indicates that substantially all the hydrides are reacted when —OH is in excess or equivalence. Conversely, when $LiAlH_4$ is in excess, possible products will contain hydride groups on Al(III), which will better shield protons on adjacent carbons due to low electronegativity and better electron-donating ability of hydride, resulting in an upfield-shifted peak (FIG. 12e).

Figure 13B:
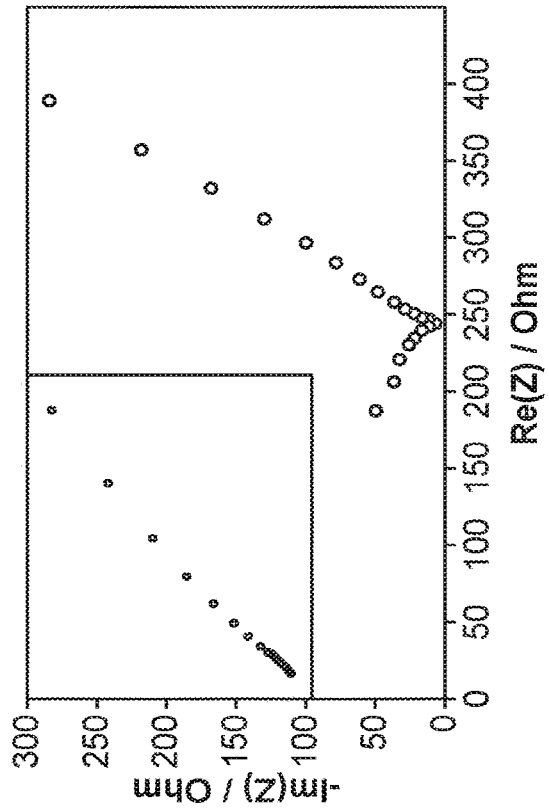
FIG. 13. a) Nyquist plot of electrochemical impedance spectra of bulk LiAl-FTEG material in SS||SS symmetric cell. Inset: the entire range of the Nyquist plot; b) LTN measurement of bulk LiAl-FTEG material in Li||Li symmetric cell (constant polarization voltage: about 100 mV). Inset: Nyquist plot of the electrochemical impedance spectra of LiAl-FTEG before and after polarization.
Figure 13A:
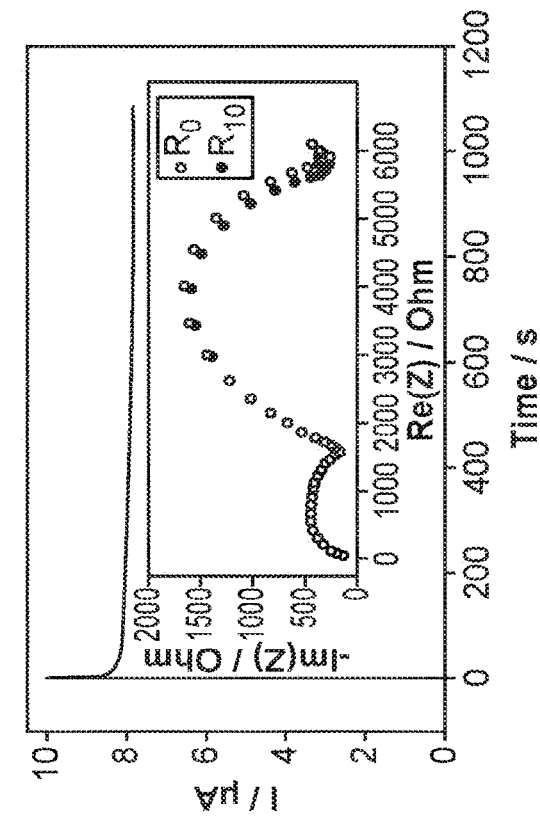

High lithium ion conductivity and high LTN of an artificial SEI layer can help decrease "hot spots", render smooth lithium deposition, and reduce harmful side reaction of anions with lithium metal. To examine Li ion transport in LiAl-FTEG, electrochemical impedance spectroscopy is applied to test the ion conductivity. A bulk LiAl-FTEG material in a stainless steel (SS)∥SS symmetric cell showed a high conductivity of $3.51 \pm 2.33 \times 10^{-5}$ S/cm, at room temperature (FIG. 13a). The Li ion transport or hopping is fast in LiAl-FTEG. Furthermore, the LTN was measured with potentiostatic polarization of LiAl-FTEG in a Li∥Li symmetric cell, obtaining a value of over about 0.8 (FIG. 13b). The dynamic nature of LiAl-FTEG can contribute to chain mobility, leading to anion movement to some extent. This mobility combined with some measurement deviation error result in the LTN being less than 1. However, LiAl-FTEG can still be regarded as approaching a single lithium ion conductor. The impedance before and after voltage polarization did not change significantly, indicating that LiAl-FTEG is stable in Li∥Li symmetric cells (FIG. 13b inset).

Figure 14A:
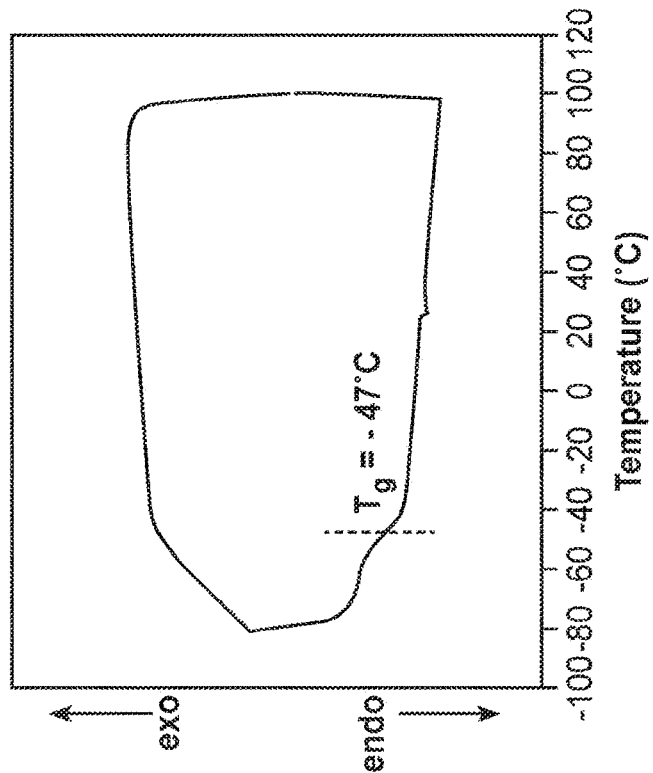
FIG. 14. a) Rheology of bulk LiAl-FTEG material by fitting frequency sweep tests at different temperatures (storage modulus; loss modulus; sheer rate: about 32.27 rad/s). b) Differential scanning calorimetry (DSC) of LiAl-FTEG, showing $T_g=-47°$ C.
Figure 14B:
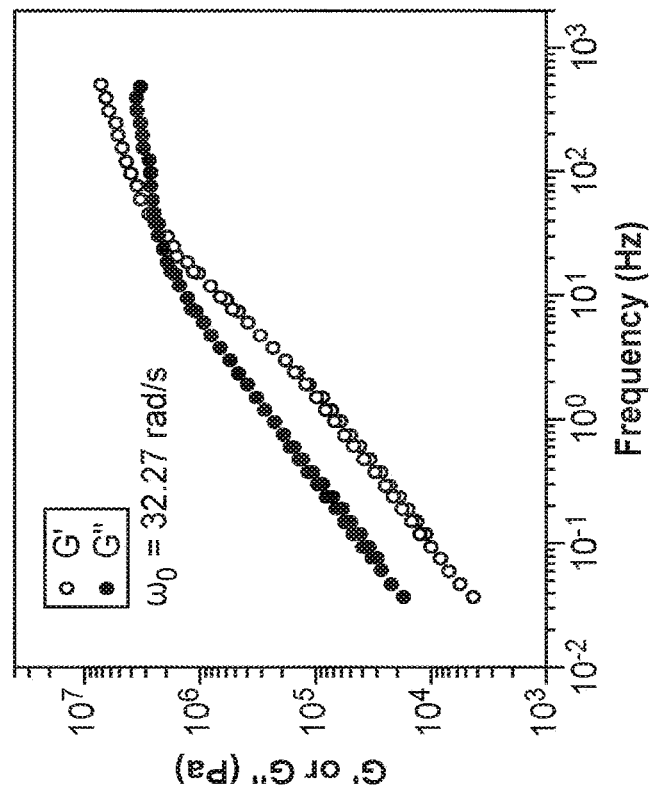

The solvent in as-synthesized LiAl-FTEG/THF solution is evaporated at about 90° C. for over about 6 hours to obtain a free-standing and bulk LiAl-FTEG material. The rheology measurement showed viscoelasticity of the LiAl-FTEG material by yielding two regions, solid-like and liquid-like (FIG. 14a). At higher frequency (>about 20 Hz, shorter time scale), the storage modulus is greater than the loss modulus (G'>G"), rendering LiAl-FTEG relatively stiff. Thus LiAl-FTEG behaves more like a solid in this region. By contrast, the storage modulus is lower than the loss modulus (G'<G") at lower frequency (<about 20 Hz, longer time scale). In this region, the liquid-like behavior dominates the mechanical property of LiAl-FTEG. With such viscoelastic property, LiAl-FTEG provides benefits as an artificial SEI layer. Firstly, when lithium dendrites grow rapidly in "hot spots", LiAl-FTEG can suppress dendrites growth with its solid-like behavior. Secondly, with its liquid-like behavior, LiAl-FTEG can finely adapt the volume change of lithium metal while cycling. Moreover, a LiAl-FTEG coating can remain as a protective interfacial layer to ensure deposition of lithium underneath and avoid "dead lithium" detaching from a bulk part. The chain derived from FTEG is long and relatively soft to enhance chain movement. Differential scanning calorimetry (DSC) showed about −47° C. glass transition temperature ($T_g$) of LiAl-FTEG, which further confirms the chains can be mobile at room temperature (FIG. 14b).

Figure 15:
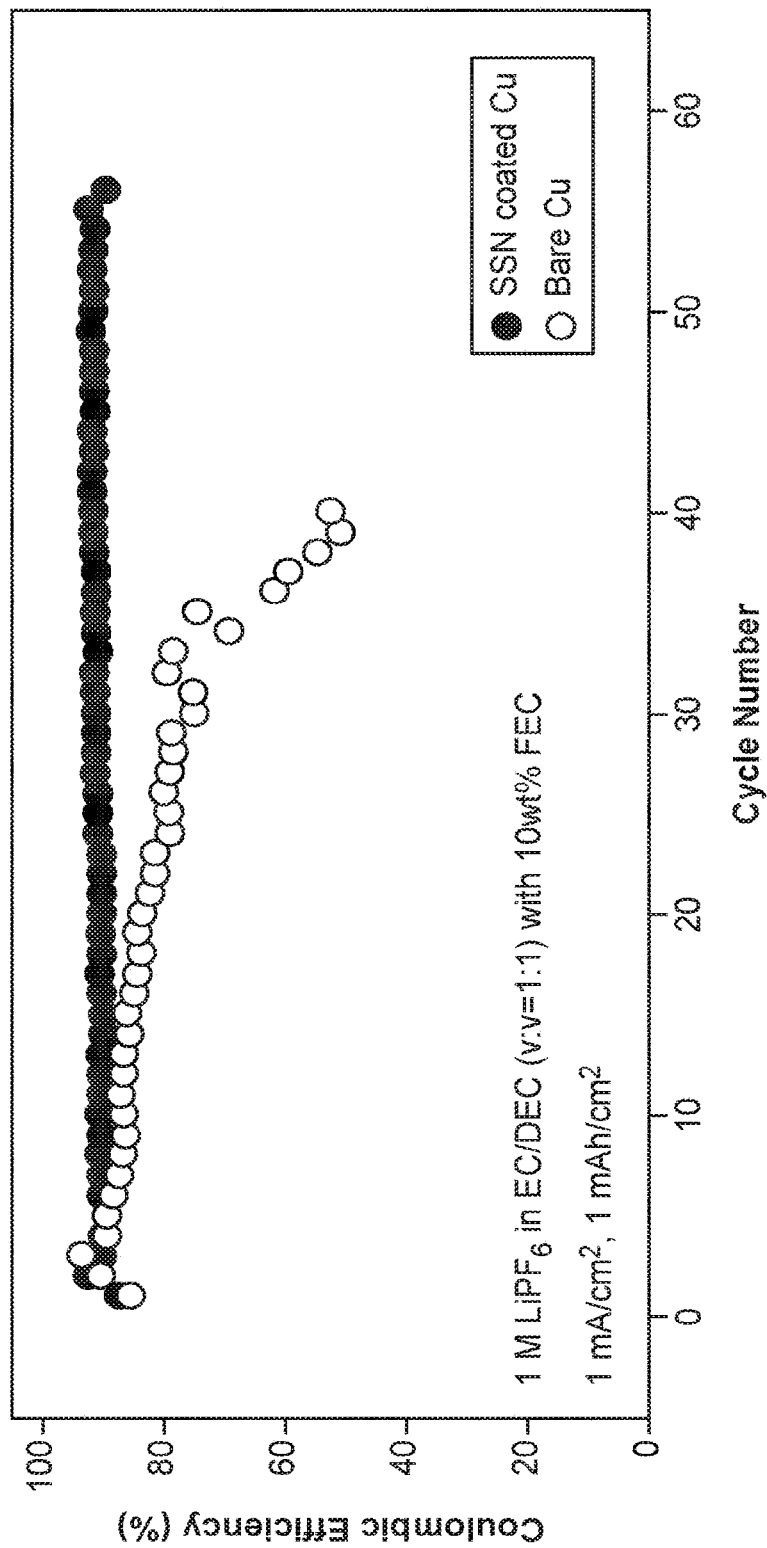
FIG. 15. Cycle stability plot of Coulombic efficiency (CE) under about 1 mA/cm$^2$ current density and about 1 mAh/cm$^2$ capacity.

FIG. 15 shows the Coulombic efficiency over cycling, where deposition of about 1 mAh/cm$^{-2}$ of Li is performed on Cu foils with and without LiAl-FTEG coating, followed by stripping the Li fully to a cutoff voltage of about 1 V. Coulombic efficiency is calculated as the ratio between charge and discharge capacity.

Example 2

Dynamic, Electrolyte-Blocking, and Single-Ion-Conductive Network for Stable Lithium Metal Anodes Overview:

Implementation of lithium (Li) metal anodes involves developments to solve the heterogeneity and instability issues of naturally formed solid electrolyte interphase (SEI). The artificial SEI, as an alternative, allows for an ideal interface by regulating features such as fast ion transport, conformal protection, and parasitic reaction mitigation. Herein, integration is made of all of these desired properties into a single matrix, the dynamic single-ion-conductive network (DSN), as a multifunctional artificial SEI. The DSN incorporates the tetrahedral Al(OR)$_4^-$ (R=soft fluorinated linker) centers as both dynamic bonding motifs and counter anions, endowing it with flowability and Li$^+$ single-ion conductivity. Simultaneously, the fluorinated linkers provide chain mobility and electrolyte-blocking capability. A solution-processed DSN coating was found to simultaneously hinder electrolyte penetration, mitigate side reactions between Li and electrolyte, maintain low interfacial impedance, and allow homogenous Li deposition. With this coating, long cycle life and high Coulombic efficiency are achieved for Li metal battery in a commercial carbonate electrolyte.

Introduction:

There has an exponential growth in demand for high-density energy storage devices, in which the lithium (Li)-ion battery plays an increasingly significant role. However, Li-ion batteries are nearing their theoretical capacity limit. Therefore, it is desired to develop a next generation of batteries to fulfill the aggressive energy density demands of modern mobile phones, portable computers, electrical vehicles, and other electronic devices. Li metal is an ideal candidate because it has both high theoretical specific capacity (about 3,860 mAh g$^{-1}$) and low electrochemical potential (about −3.04 V versus standard hydrogen electrode) among negative electrode materials. It has the potential to provide the highest specific energy as an anode for a Li battery.

Despite its promises, Li metal anode is challenging to implement due to several drawbacks. First, Li readily reacts with electrolytes to form a solid electrolyte interphase (SEI). The typically heterogeneous nature of the SEI results in local fluctuation of Li$^+$ ion flux and current density, which lead to the formation of dendrites. Second, large volume change during Li stripping and plating creates cracks in the brittle SEI, forms dead Li, and causes further electrolyte consumption. The above effects lower the Coulombic efficiency (CE) and devastate the cycle life of Li-metal anodes. To mitigate the aforementioned degradation pathways, strategies pursued include modifying components of the liquid electrolyte, introducing electrolyte additives, utilizing solid electrolytes, employing a shielding cation layer, or chemically pretreating Li metal. Nevertheless, it remains challenging to achieve a stable SEI on Li metal; therefore, an artificial SEI is particularly promising as an alternative strategy to replace the native SEI on Li.

An ideal artificial SEI should have several key properties. First, flowability and dynamic property should allow SEI to adapt to large volume change during Li stripping and plating, and result in uniform Li deposition macroscopically. Second, uniform and fast Li$^+$ single-ion conduction in the artificial SEI is found to be beneficial to reduce "hot spots", increase critical Li deposit size, and stabilize the Li-metal anode. Finally, the SEI should be both chemically and electrochemically inert itself and mitigate electrolyte penetration to minimize deleterious side reactions between Li and coating or Li and electrolyte. Nevertheless, few artificial SEIs possess all the desirable properties such as dynamic property, flowability, or high ion conductivity. Additionally, various reported Li metal artificial SEIs are compatible with just ether-based electrolytes (Table 1 and its Plot), making them incompatible with high-voltage, high-energy-density lithium nickel manganese cobalt oxide (NMC) cathodes that are used in commercial Li-ion batteries. Herein, this example reports an artificial SEI design based on a dynamic polymeric network with high Li$^+$ single-ion conductivity. In this network, tetrahedral Al(OR)$_4^-$ (R=soft fluorinated linker) anions are used as a dynamic motif while providing counter anions for Li, ions (FIG. 16A). With this dynamic single-ion-conductive network (DSN) as an artificial SEI, demonstration is made of over 400 stable stripping and plating cycles in Li||Cu cell using commercial carbonate-based electrolyte. Greater than about 85% capacity retention for over 160 cycles in a Li||NMC full battery was achieved using directly coated thin Li foils and commercial, industry-standard NMC cathode sheets. The design concept of using dynamic single-ion conductor as a stable and scalable artificial SEI is promising for practical Li metal batteries.

Results and Discussion:

Material Design

To prepare the DSN, tetrahedral Al(OR)$_4^-$ anions were used as dynamic crosslinking centers, and as a source of dynamic flowability. The Li$^+$ counter ions are introduced as the mobile ions in the network, while soft fluorinated chains (1H,1H,11H,11H-perfluoro-3,6,9-trioxaundecane-1,11-diol, FTEG) are chosen as inert ligands (FIG. 16A). The FTEG is less chemically reactive and more solvent resistant compared to its non-fluorinated version, poly(ethylene oxide) (PEO) and therefore can potentially mitigate side reactions between Li and DSN, prevent the dissolution of DSN in the polar carbonate electrolyte, and reduce the penetration of the electrolyte through DSN. Furthermore, the flexible FTEG chains ensure flowability when combined with dynamic Al(OR)$_4^-$ crosslinking sites. Since Li$^+$ ions are directly introduced during the synthesis of DSN, it can transport through the network of fixed Al(OR)$_4^-$ anions, making DSN a solid-state single-ion conductor.

To confirm the effects of single-ion conductivity and dynamic property on the performance of artificial SEI materials, design is made of two additional networks, in which the Al centers were substituted with the single-ion-conductive yet non-dynamic B centers (B-FTEG) or the neither single-ion-conductive nor dynamic Si centers (Si-FTEG), respectively (FIGS. 16B, 16C, 22, and 23). These designs allow for the fine tuning of electrochemical and mechanical properties of the artificial SEIs and provide a platform to understand their structure-property relationships. The chemical characterizations and costs of the prepared materials are provided in FIGS. 16D and 24-26 and Table 2.

Mechanical Property

Figure 17A:
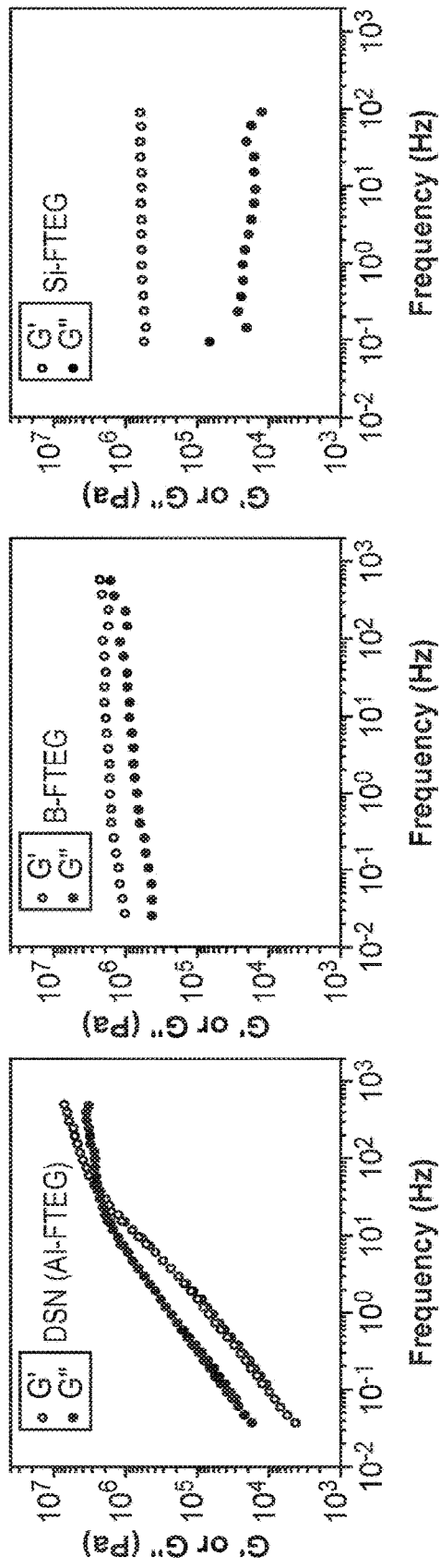
FIG. 17. Mechanical Property of DSN and the Dynamic Nature of Al(OR)$_4^-$ Coordination Bond. (A-C) Rheology measurements of DSN (A), B-FTEG (B), and Si-FTEG (C). (D) DSC of DSN derivatives and FTEG. (E) Optical microscope pictures for dynamic property test. Scale bars, 200 mm. (F) Comparison of Al—O, B—O, and Si—O bonding energies calculated by density functional theory (DFT).
Figure 17B:
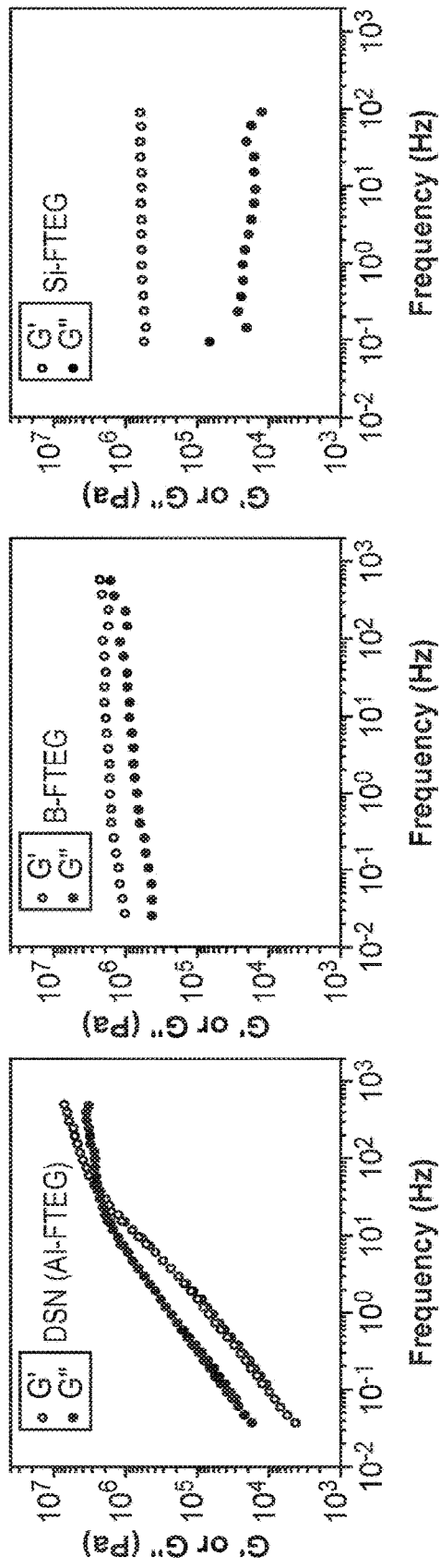
Figure 17C:
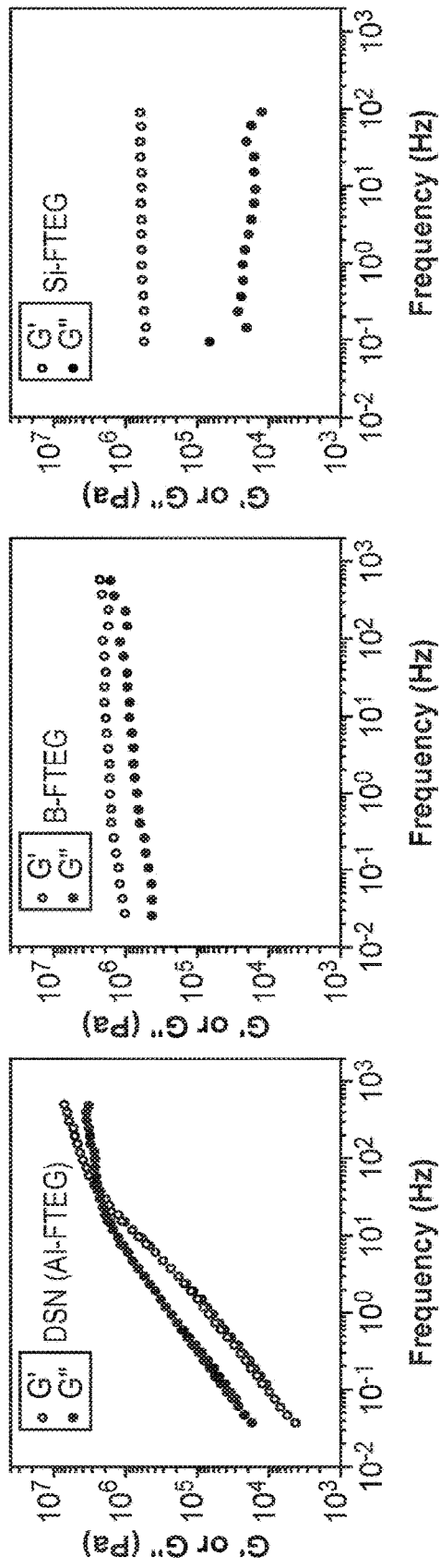
Figure 17D:
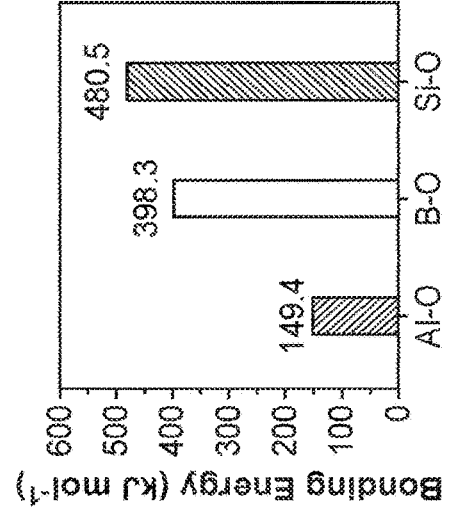
Figure 27:
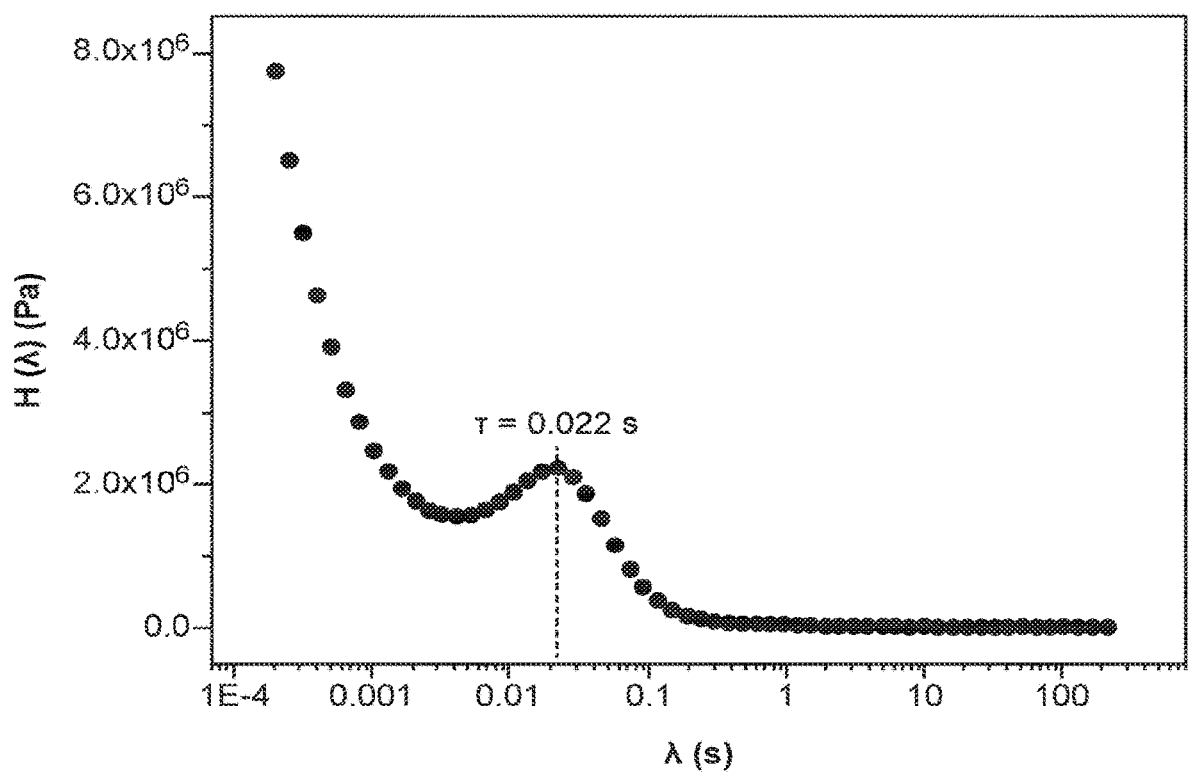
FIG. 27. Relaxation time (about 0.022 s) extracted from rheology measurement (FIG. 17a) of DSN sample. Rheological experiments were carried out using frequency sweeps from about 0.01 to about 1000 Hz at about 0.1% strain.

Viscoelasticity and dynamic properties are properties that can improve Li deposition in artificial SEI materials. The rheology measurement of bulk DSN material shows its viscoelasticity (FIG. 17). At frequencies higher than about 45 Hz, the storage modulus becomes greater than the loss modulus (G'>G"), which yields a short relaxation time of about 0.022 s (FIG. 27). Such a liquid-like behavior at low frequency will potentially allow DSN to adapt and remain conformally in contact with Li even with volume change while cycling. Scanning electron microscopy (SEM) reveals that the conformal DSN coating indeed remained as a protection layer with Li deposition underneath even after long-term cycling (FIG. 28). Consistent with the liquid-like behavior of DSN, differential scanning calorimetry (DSC) of DSN shows a low glass transition temperature ($T_g$) of about −47° C. (FIG. 17D). In contrast, both B-FTEG and Si-FTEG show little or no flowability in the available frequency sweeping range and behave as elastic solids (FIGS. 17B and 17C). A high $T_g$ of about 50° C. was observed for B-FTEG while the $T_g$ was undetectable for covalently cross-linked Si-FTEG.

Figure 17E:
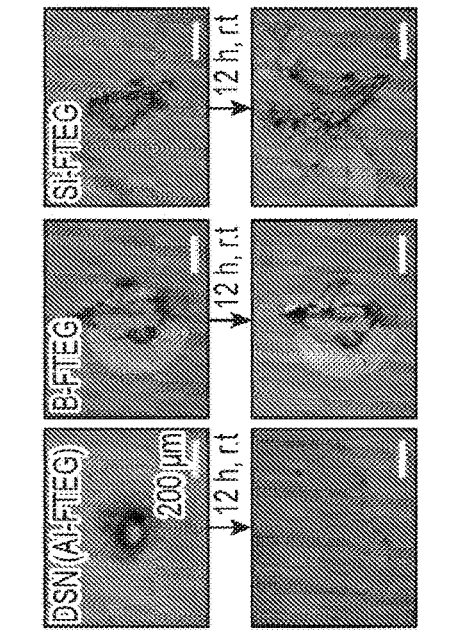
Figure 17F:
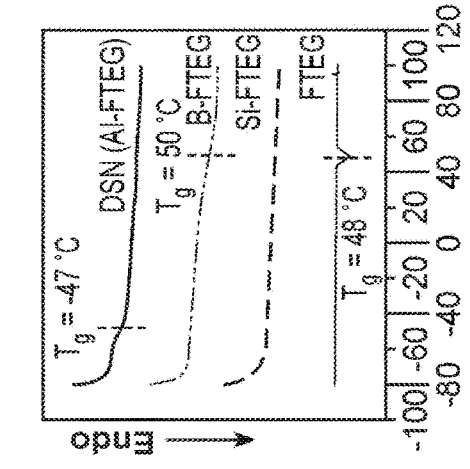
Figure 30A:
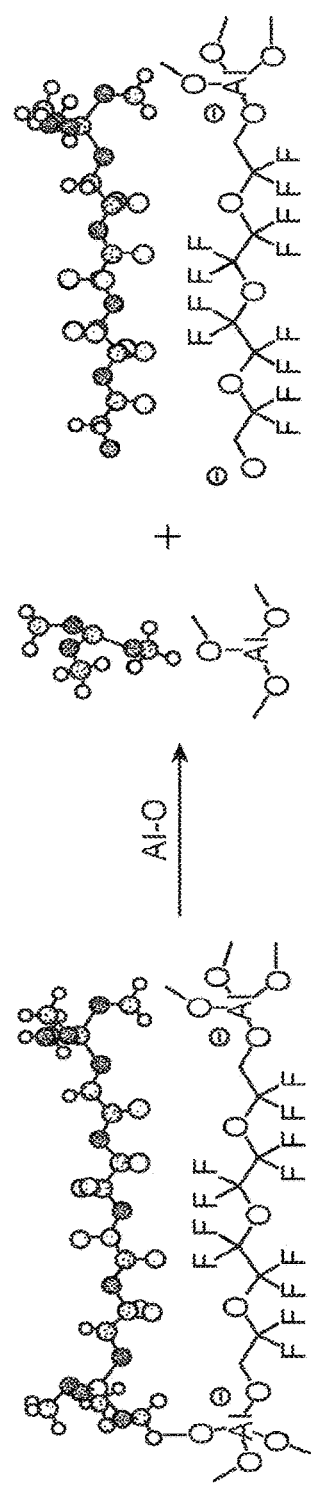
FIG. 30. a-c) Simplified DSN, B-FTEG, and Si-FTEG systems for DFT calculations of Al—O (a), B—O (b), and Si—O (c) coordination bonding energies. Note: The simplified DSN, B-FTEG, and Si-FTEG systems composed of one FTEG chain bound with two M(OCH$_3$)$_3$ (M=Al, B, or Si) segments. In the DFT calculations, the resulting two segments after split were optimized and calculated individually at the B3LYP/6-31G+(d,p) level, to obtain the optimized energy of each. Then the sum of these two energies were subtracted by the energy of the starting molecule, to obtain the bonding energy (namely, the bonding energy represents the value when two segments are split to infinite distance).
Figure 30B:
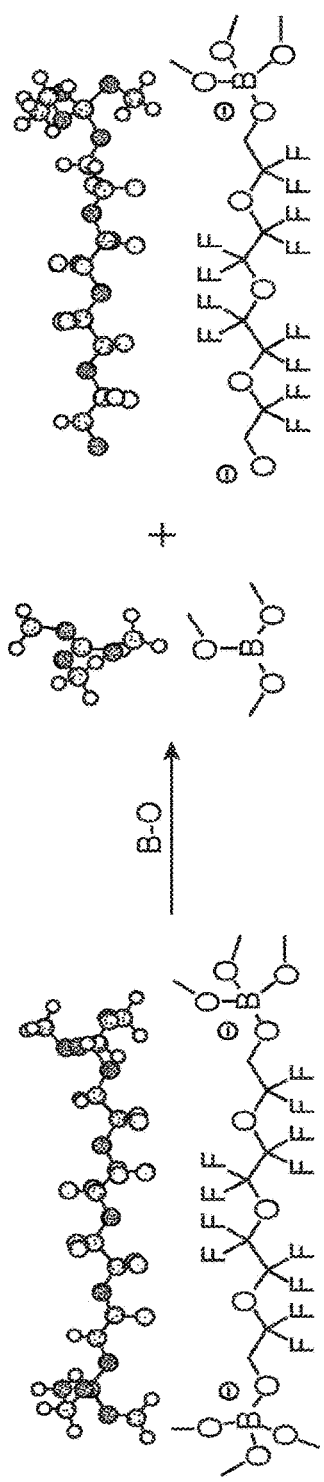
Figure 30C:
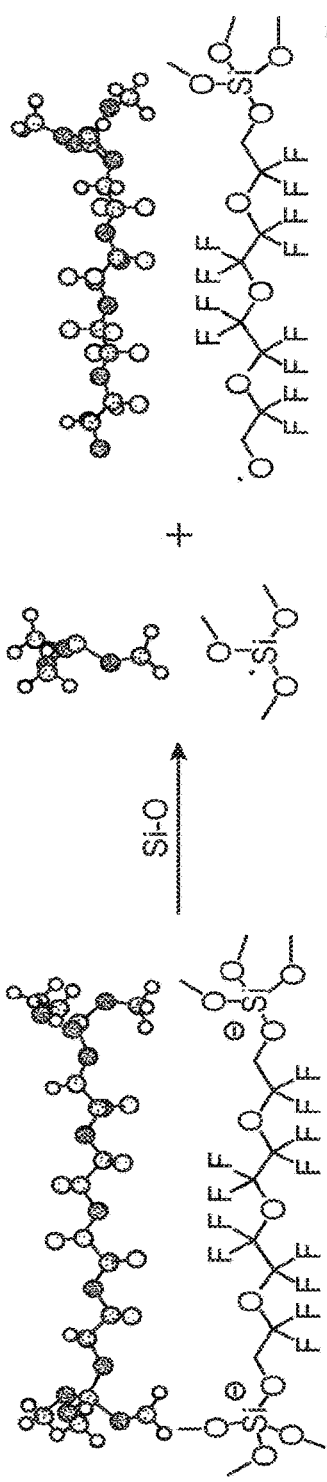
Figure 34A:
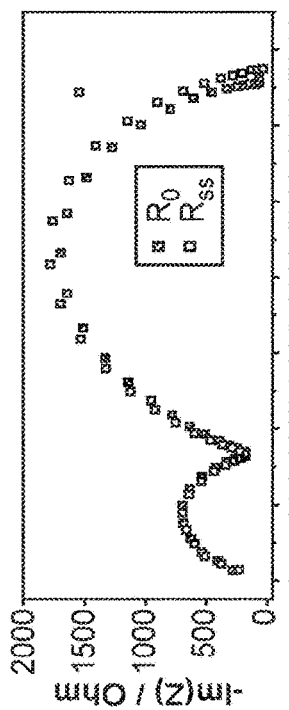
FIG. 34. a,c) LTN measurement of the original B-FTEG material (a) and the B-FTEG after electrolyte soaking (c) in Li∥Li symmetric cell. Constant voltage applied: about 100 mV. b,d) Nyquist plot of the original B-FTEG (b) and the B-FTEG after electrolyte soaking (d) before and after polarization. e) LTN measurement of the Si-FTEG after electrolyte soaking in Li∥Li symmetric cell. Constant voltage applied: about 100 mV. f) Nyquist plot of the Si-FTEG after electrolyte soaking before and after polarization. Note: The electrolyte used for soaking is about 1 M LiPF$_6$ in EC/DEC (v:v=about 1:1) with about 10 wt. % FEC additive, the same as used for all battery tests. Before measurement, addition is made of about 5 wt. % diglyme to wet the B-FTEG film to get lower resistance. The measured LTN is about 0.97 for original B-FTEG and about 0.89 for B-FTEG after electrolyte soaking. Negligible decrease in LTN was observed after soaking. Negligible decrease in LTN was observed after soaking. The measured LTN is about 0.21 for Si-FTEG after electrolyte soaking.
Figure 34B:
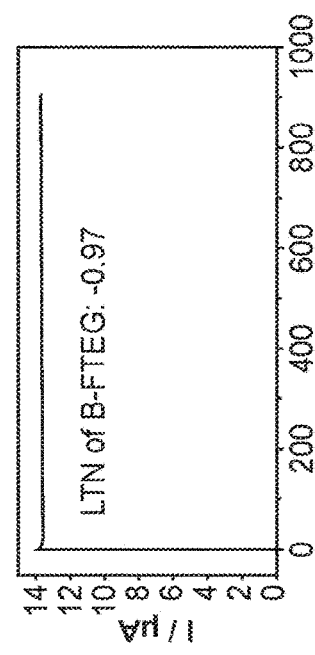
Figure 34C:
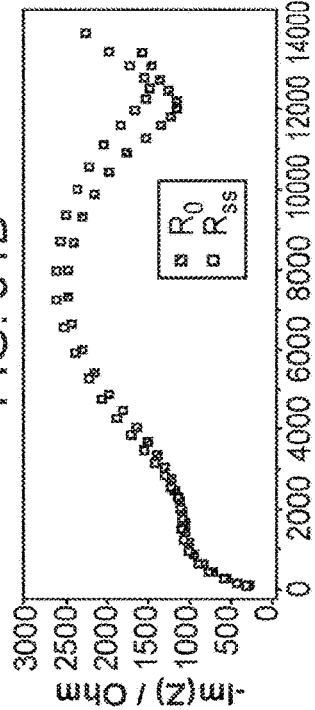
Figure 34D:
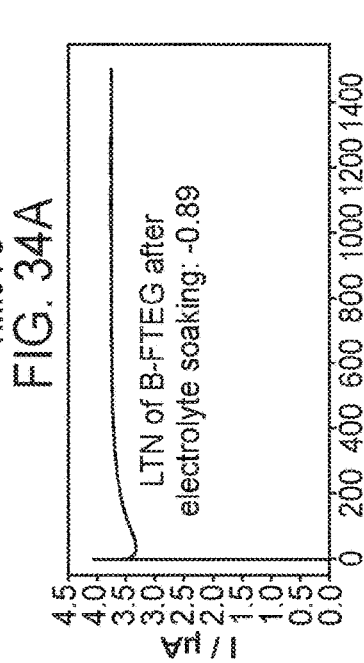
Figure 34E:
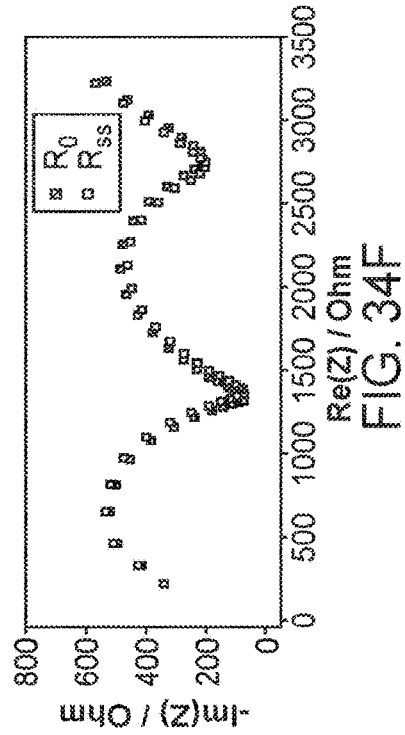
Figure 34F:
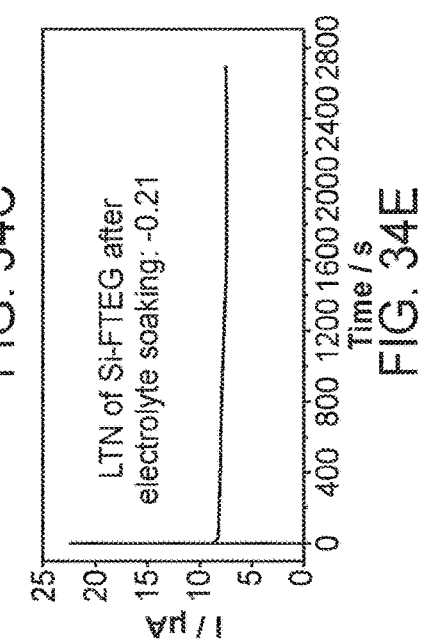

To show the dynamic nature, a hole with about 200 mm diameter was pierced through a thin film of each material and the film was left to heal at room temperature (RT) for about 12 h (FIGS. 17E and 29). The hole of DSN was completely healed, while there was no change in the size or appearance for B-FTEG or Si-FTEG. This is attributed to the dynamic property of DSN based on the reversible Al—OR coordination bonds. Density functional theory (DFT) calculations were conducted on simplified Al-FTEG (DSN), B-FTEG, and Si-FTEG composed of one FTEG chain bound with two $M(OCH_3)_3$ (M=Al, B, or Si) segments (FIG. 30). The calculated coordination bonding energy of Al—O bond is found to be much lower than that of the B—O bond and Si—O bond, consistent with the finding that the Al—O bonds are weak and dynamic (FIG. 17F). The FTIR of DSN exposed to humidity over time shows a continuous increase in the —OH vibration peak accompanied by a decrease in the Al—OR vibration peak, indicating facile bond hydrolysis (FIG. 31). Despite the dynamic nature of the Al—O bonds, the DSN is robust enough to maintain its chemical structure in a battery, as indicated by FTIR of DSN after Li deposition in a battery (FIG. 32).

Li-Ion Conduction

High $Li^+$ ion conductivity and high Li transference number (LTN) of the SEI can help increase critical Li nucleate size, render smooth Li deposition, and reduce parasitic reactions of anions with Li metal. Electrochemical impedance spectroscopy (EIS) measurements show considerable ion conductivity for DSN ($3.5\pm2.3\times10^{-5}$ S cm$^{-1}$) and B-FTEG ($4.2\pm1.1\times10^{-6}$ S cm$^{-1}$) at 25° C. without addition of any salt or electrolyte (FIGS. 18A and 22), both of which are essentially high for interfacial ion conduction. Consistent with the design, Si-FTEG shows negligible ion conductivity due to lack of free-ions in the network (<10$^{-10}$ S cm$^{-1}$, FIG. 23). On the other hand, the Si-FTEG became considerably more conductive after soaking in the electrolyte used for battery testing (about 1 M LiPF$_6$ in EC/DEC (v:v=about 1:1) with about 10 wt. % FEC additive). Furthermore, the LTNs of DSN and B-FTEG were measured using potentiostatic polarization in Li‖Li symmetric cells, showing a LTN over 0.80±0.05 for DSN and 0.96±0.01 for B-FTEG (FIGS. 18B and 22). The slightly lower LTN of DSN compared to B-FTEG is expected due to the flowable nature of DSN which allows for a small degree of anion motion. Even after soaking in electrolyte, both showed just a slight decrease in LTN, confirming that they act as single-ion-conducting SEIs, but for Si-FTEG, the LTN after electrolyte soaking is 0.21±0.03, similar to the normal liquid electrolyte (FIGS. 18B, 33, and 34).

Figure 35A:
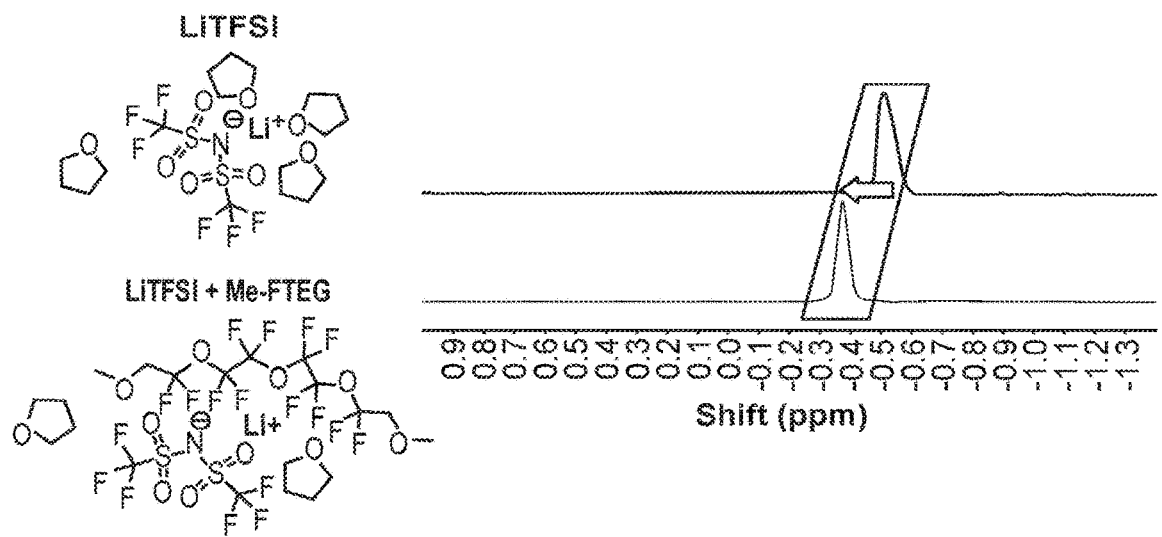
FIG. 35. a) The $^7$Li-NMR of about 0.15 M LiTFSI in THF (upper) and LiTFSI plus Me-FTEG in THF (lower). b) The $^{19}$F-NMR of about 0.15 M LiTFSI in THF (upper), LiTFSI plus Me-FTEG in THF (middle), and Me-FTEG in THF (lower). Note: The Li$^+$ peak of LiTFSI and Me-FTEG mixture showed noticeable downfield shift compared to pristine LiTFSI, which indicates the deshielding effect of FTEG chains. The $^{19}$F-NMR result is consistent with the $^7$Li-NMR one by showing downfield shift peaks when adding LiTFSI in Me-FTEG (The $^{19}$F peaks downfield shifted by about 0.06 ppm after the addition of LiTFSI).
Figure 35B:
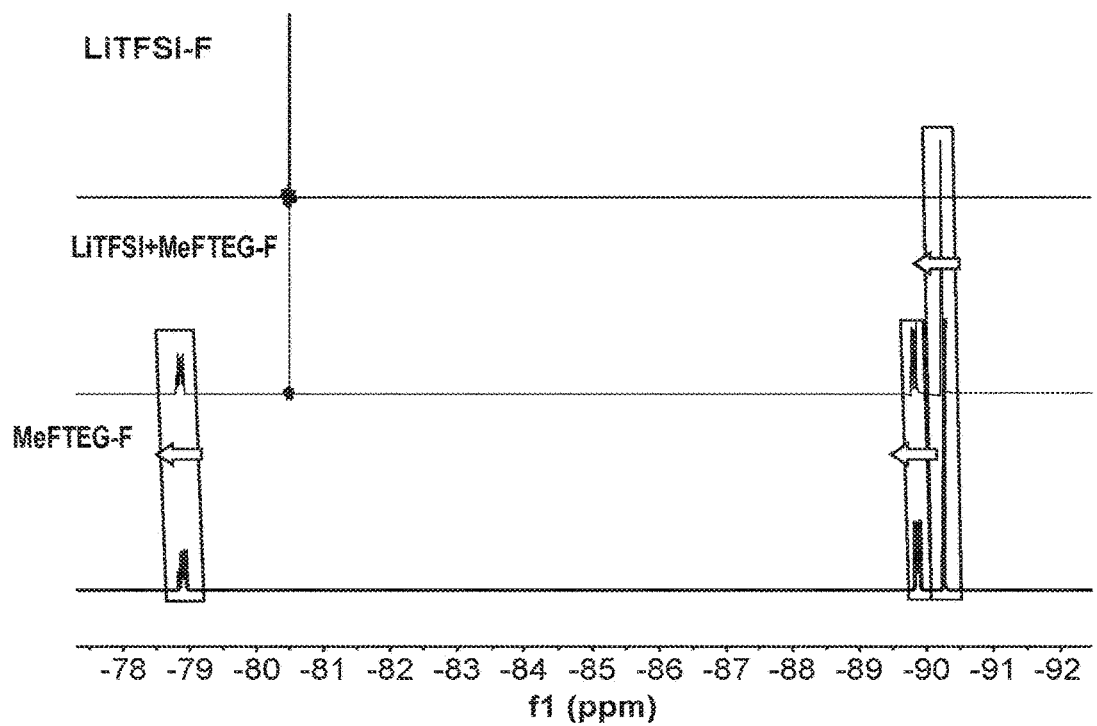

To further examine the ion transport behavior, molecular dynamic (MD) simulations were conducted on Al-FTEG (DSN). The simulated network forms a uniform distribution of Li atoms, Al centers, and FTEG chains (FIG. 18C). It is worth noting that the radial distribution function (RDF) of Li—Al showed two peaks, giving one type of $Li^+$ ions (peak 1) close to Al anion centers and the other type (peak 2) far away (FIG. 18D). It is hypothesized that this could result from the presence of two $Li^+$ ion solvation environments in DSN. To confirm this, $^7$Li-NMR was utilized to study $Li^+$ ion solvation in DSN. As shown in FIG. 18E, indeed two $^7$Li peaks can be found in DSN, labeled as 1 and 2, which represent two different $Li^+$ ion solvation states. However, for the LiAlH$_4$ precursor, there is just one $^7$Li peak. Furthermore, using the RDF of Li—Al and the $^7$Li-NMR spectra, identification is made of two different Li solvation environments in DSN: one is from $Li^+$ ions coordinated close to the $Al(OR)_4^-$ center, and the other is from $Li^+$ ions coordinated by the FTEG chains. The upfield peak (peak 1) in $^7$Li-NMR is attributed to the $Li^+$ ions that are coordinated by the strongly-shielding $Al(OR)_4^-$ anions (FIGS. 18D and 18E). The $Li^+$ ions corresponding to the small peak 2 in DSN (FIGS. 18D and 18E) are assigned to $Li^+$ ions solvated by FTEG chains. The poor solvation ability of fluorinated ether chains results in deshielded $Li^+$ ions, causing a downfield shift and freeing of $Li^+$ ions to transport rapidly through the fluorinated chains. Thus F atoms are taken as an indicator of the FTEG chains to cross-validate this proposal. The $^{19}$F-NMR spectra (FIG. 24) of DSN and B-FTEG support these observations by showing two sets of $^{19}$F signals; one set comes from uncoordinated F atoms and the other comes from F atoms coordinated by $Li^+$ ions. Si-FTEG and FTEG, which do not contain any $Li^+$ ions, showed just one set of $^{19}$F peaks as expected. The $^{19}$F-NMR results are consistent with RDF of Li—F as well (FIG. 18D). To further confirm this assignment, synthesis is made of an unreactive dimethyl terminated FTEG (Me-FTEG, Supplemental Information Synthesis) and $^7$Li-NMR is conducted on Me-FTEG mixed with about 0.5 equivalence of LiAlH$_4$. This mixture showed noticeable downfield shift for the $^7$Li peak compared to neat LiAlH$_4$, which confirms the deshielding effect from FTEG chains. Similar shifts were observed from $^7$Li-NMR spectra of lithium bis(trifluoromethanesulfonyl)imide (LiTFSI) compared to an LiTFSI/Me-FTEG mixture (FIG. 35). Using these peak assignments, it is reasonable to conclude that $Li^+$ ion transport through DSN occurs via FTEG-mediated hopping between Al centers.

Figure 36:
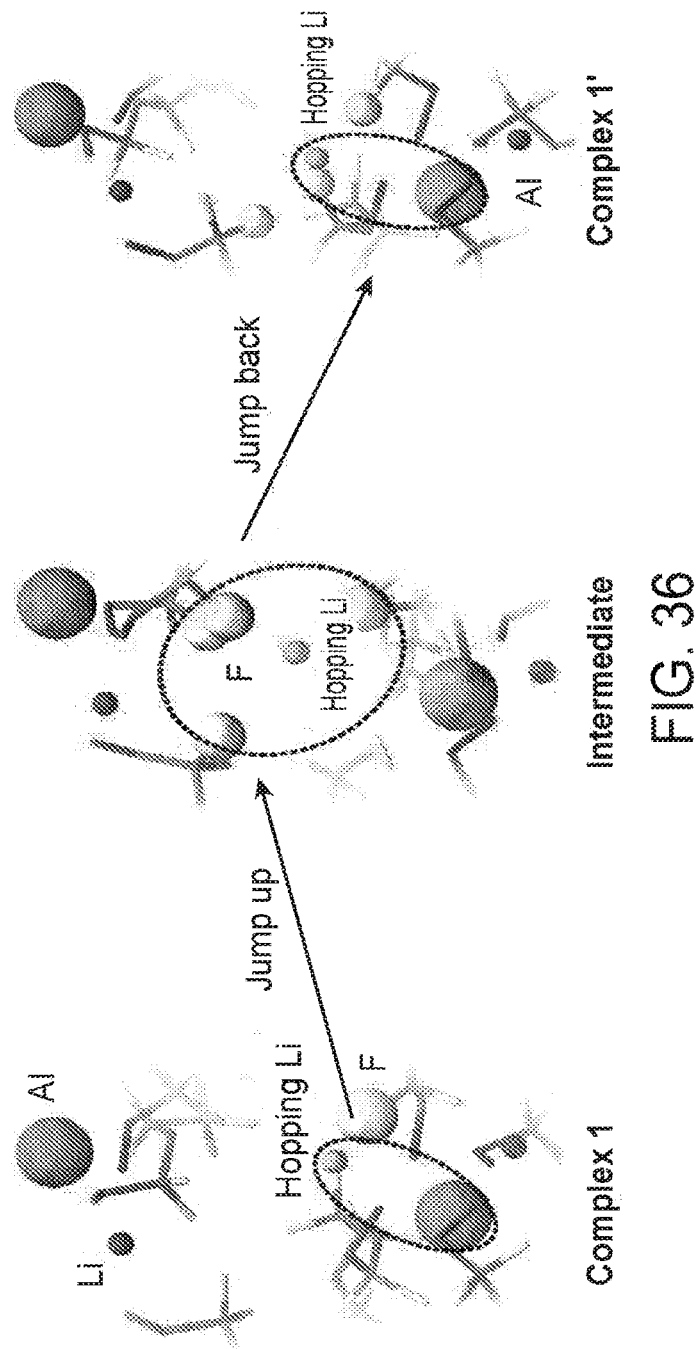
FIG. 36. An example of "failed" $Li^+$ ion transport pathway ($Li^+$ jumped up to be stabilized by F atoms but jumped back to bind with the original Al center). The hopping Li is shown along with other Li's. F atoms within about 3 Å of the hopping Li are emphasized with spheres. For clarity, FTEG chains are faded. Scheme: Li, Al center, F, C, and O. Note: The "Complex 1" and "Intermediate" are identical to FIG. 18$f$, while the "Intermediate" does not go through successful transport. The hopping $Li^+$ goes back to coordinate with the lower Al centers rather than hop to the upper ones. This "failed" transport shows that it is possible for the hopping $Li^+$ to return and bind back with the original Al center, in which it does not get over a transition state barrier.
Figure 37B:
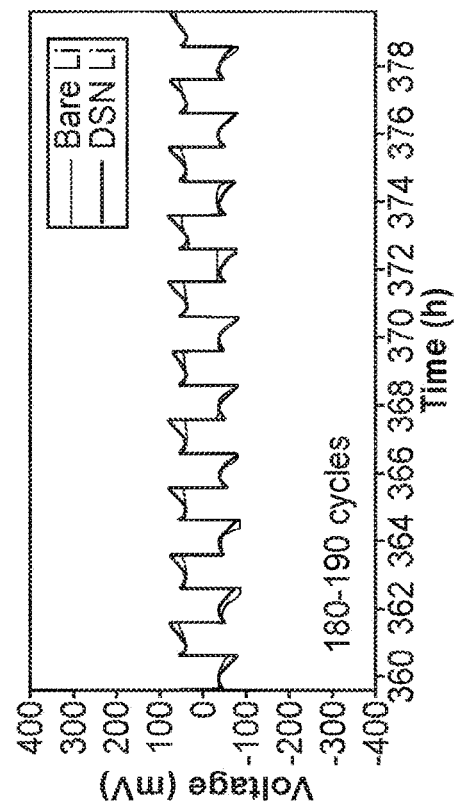
FIG. 37. Li||Li symmetric cell cycling or resting under different conditions. a, b) Thin Li (about 42 μm)||thin Li, about 1 mA $cm^{-2}$, about 1 mAh $cm^{-2}$. b) shows zoomed-in plot for the $180^{th}$-$190^{th}$ cycles. c, d) Thick Li (about 750 μm)||thick Li, about 2 mA $cm^{-2}$, about 1 mAh $cm^{-2}$. d) shows zoomed-in plot for the $150^{th}$-$160^{th}$ cycles. The electrolyte used is about 1 M $LiPF_6$ in EC/DEC (v:v=about 1:1) with about 10 wt. % FEC additive. Note: The DSN Li||DSN Li cells showed lower impedance and stable cycling for both conditions. The bare Li||bare Li cell involved larger and asymmetric stripping/deposition overpotential compared to DSN Li||DSN Li one.
Figure 37D:
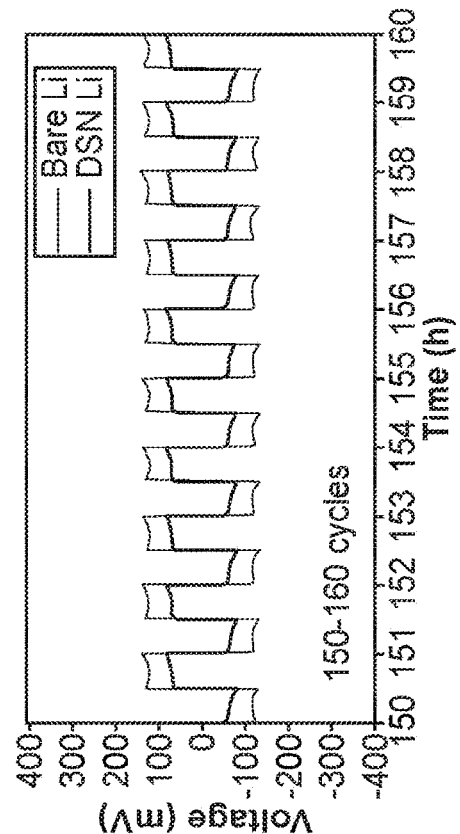
Figure 37A:
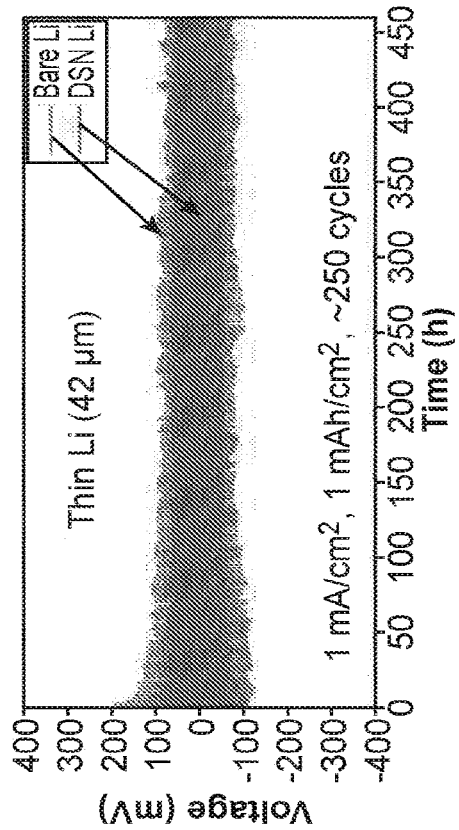
Figure 37C:
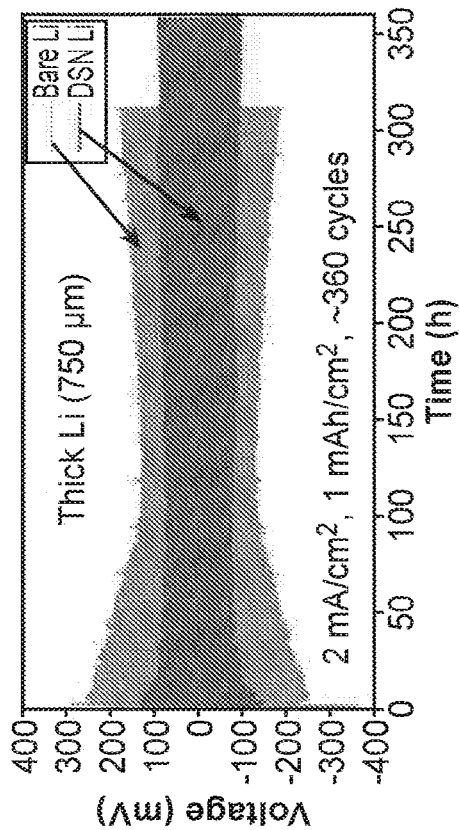
Figure 38F:
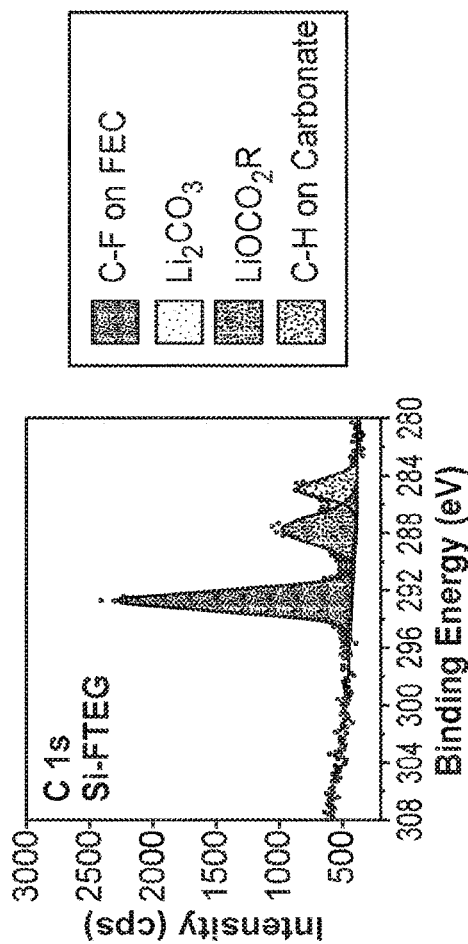
FIG. 38. The whole range and C 1 s XPS profiles of different artificial SEIs coated Li and bare Li after soaking in the electrolyte for 4 days followed by washing coating layers off. CPS: counts per second. The electrolyte used is about 1 M $LiPF_6$ in EC/DEC (v:v=about 1:1) with about 10 wt. % FEC additive. Note: The whole range scan of each sample showed all expected elements in SEI. The C 1 s XPS profile again confirmed the appearance of FTEG species in DSN and B-FTEG coated Li, while more Li-electrolyte reaction derived SEI ($Li_2CO_3$, $LiOCO_2R$, FEC, and so forth) was observed for Si-FTEG Li and bare Li.
Figure 38H:
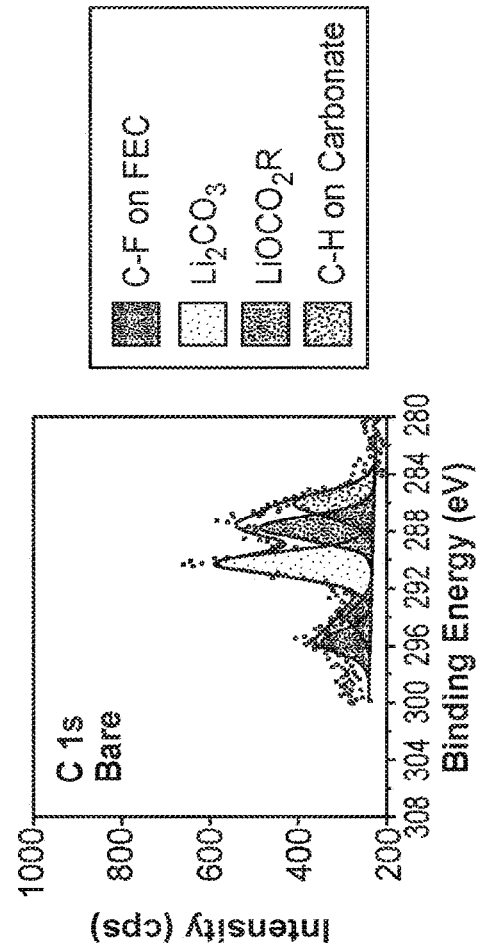
Figure 38E:
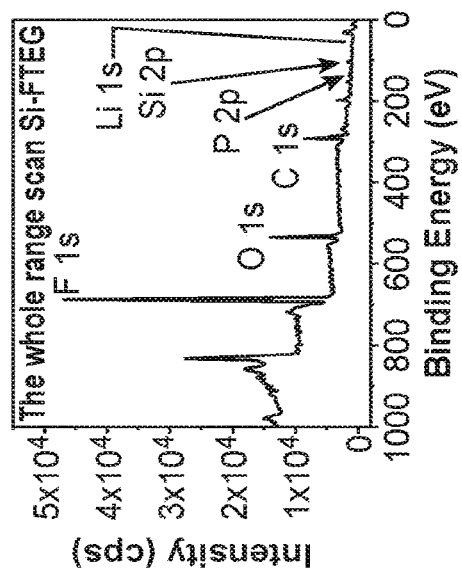
Figure 38G:
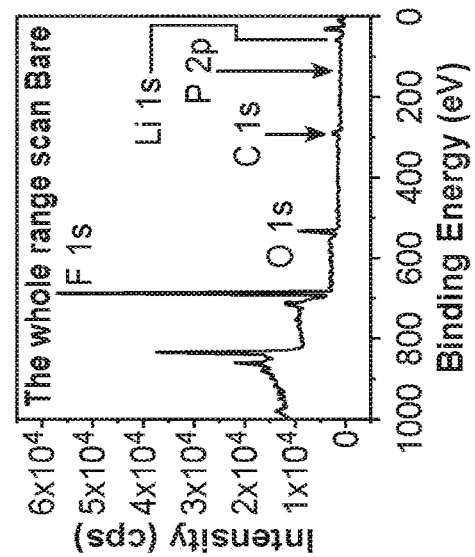
Figure 39A:
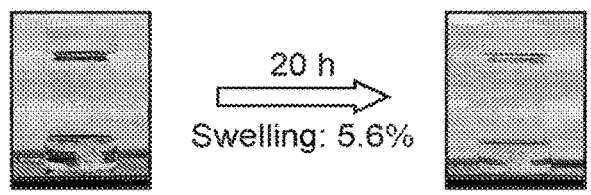
FIG. 39. Swelling test of DSN (a), B-FTEG (b), Si-FTEG (c), and TEG-DSN (d). Reference is made to FIG. 55 for details of the TEG-DSN. e) The $^{19}$F-NMR of DSN, B-FTEG, and Si-FTEG after soaking in the electrolyte. The electrolyte used is about 1 M $LiPF_6$ in EC/DEC (v:v=about 1:1) with about 10 wt. % FEC additive. About 10 mg of each sample is soaked in the electrolyte for about 20 h, and then the sample is lifted and wiped until dry. Finally about 0.5 mL of $d^6$-DMSO containing about 0.01 M α,α,α-trifluorotoluene as reference was used to dissolve each sample. Normalization is made of the reference peak and showed the $LiPF_6$ peaks for comparison. Note: For DSN and B-FTEG, both swell lower than about 10 wt. % (about 5.6% for the DSN and about 8.7% for the B-FTEG); however, the Si-FTEG shows much more swelling in terms of weight increase (about 26.9%) and volume expansion. Specially, the TEG-DSN almost dissolves in the electrolyte, which indicates solvent-resistant capability of the FTEG chains compared to the tetraethylene glycol (TEG). The $^{19}$F-NMR spectra clearly shows the difference of each sample after electrolyte soaking, where the DSN and B-FTEG show much lower $LiPF_6$ peaks than the Si-FTEG. This observation means that the DSN and B-FTEG contain fewer quantities of $LiPF_6$ than the Si-FTEG does.
Figure 39B:
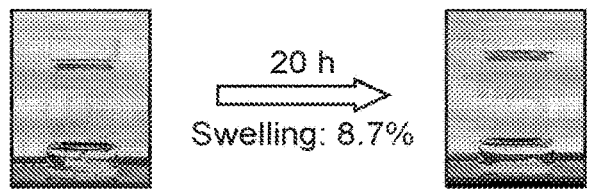
Figure 39C:
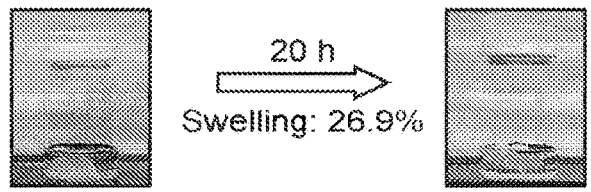
Figure 39D:
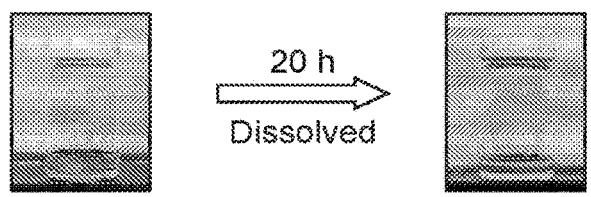
Figure 39E:
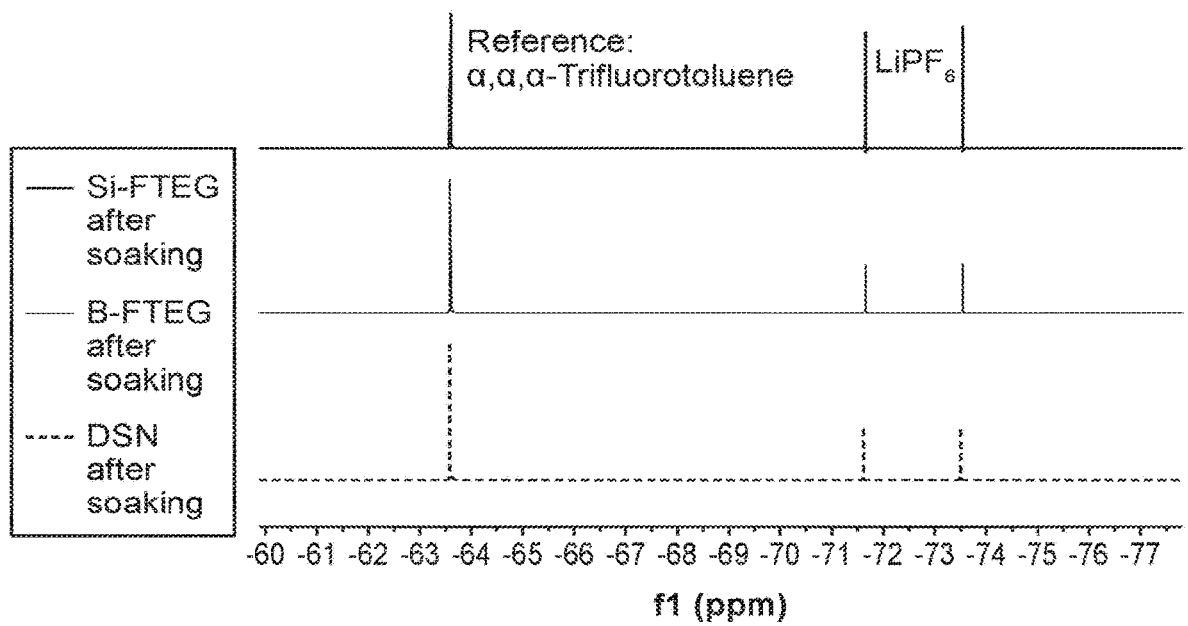
Figure 42A:
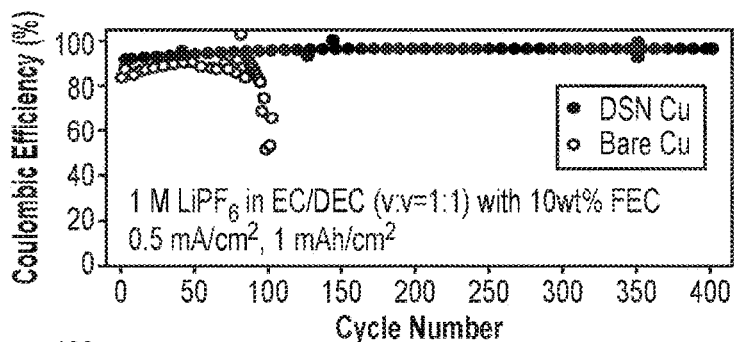
FIG. 42. Cycle stability plot of Coulombic efficiency under different electrolyte and current conditions. a) about 1 M $LiPF_6$ in EC/DEC (v:v=about 1:1) with about 10 wt. % FEC additive, about 0.5 mA $cm^{-2}$, about 1 mAh $cm^{-2}$. b) about 1 M $LiPF_6$ in EC/DEC (v:v=about 1:1) with about 10 wt. % FEC additive, about 2 mA $cm^{-2}$, about 1 mAh $cm^{-2}$. c) about 1 M $LiPF_6$ in EC/DEC (v:v=about 1:1) with about 2 wt. % VC additive, about 1 mA $cm^{-2}$, about 1 mAh $cm^{-2}$. d) about 1 M LiTFSI in propylene carbonate (PC), about 0.5 mA $cm^{-2}$, about 1 mAh $cm^{-2}$. e) about 1 M LiTFSI in DOL/DME (v:v=about 1:1) with about 1 wt. % $LiNO_3$ additive, about 1 mA $cm^{-2}$, about 1 mAh $cm^{-2}$.
Figure 42B:
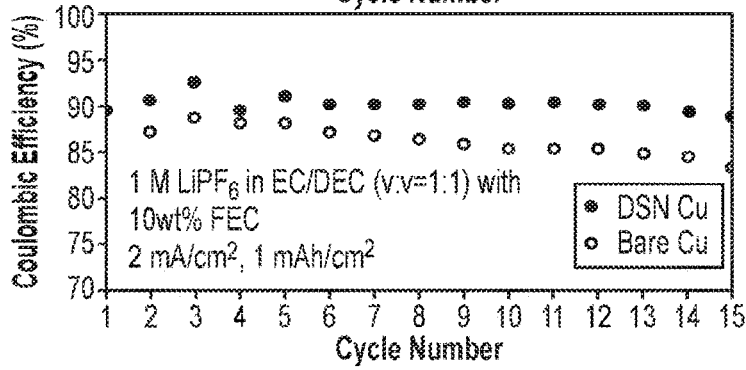
Figure 42C:
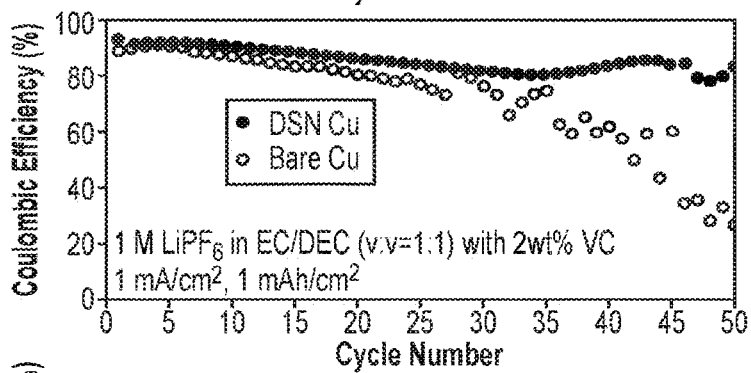
Figure 42D:
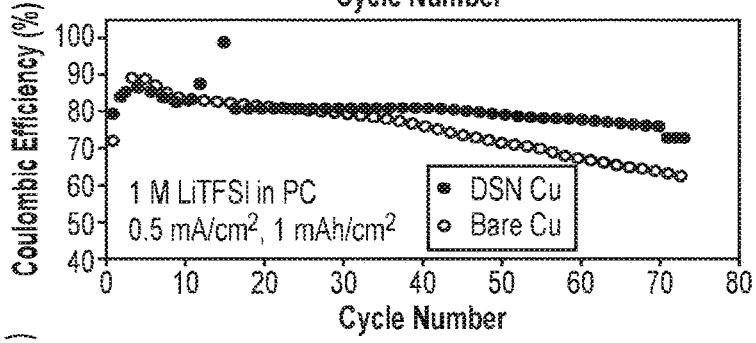
Figure 42E:
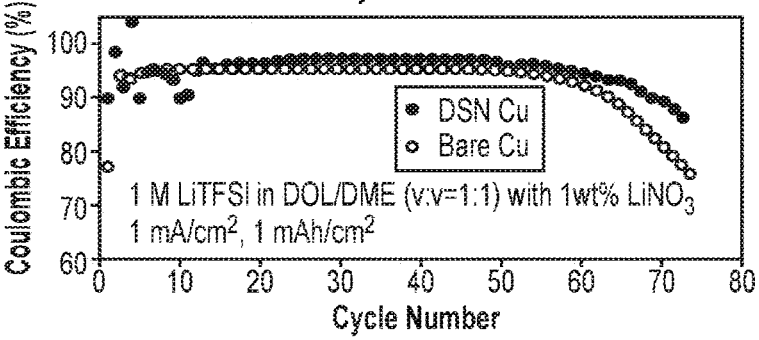

FIG. 18F illustrates the simulated $Li^+$ ion hopping mechanism in DSN. At first, the hopping $Li^+$ ion is mainly bound by the lower Al center to form Complex 1, where the Li—Al distance is about 3.2 Å (black circle in Complex 1). The hopping $Li^+$ ion then moves up to suspend between Al centers, leading to a Li—Al distance of about 4.2 Å. During the transition, the $Li^+$ ion is coordinated and transiently stabilized by the FTEG chain. The black circle in the intermediate panel of FIG. 18F illustrates the transport through the intermediate state by highlighting the proximity of hopping $Li^+$ ion to the F atoms, where the Li—F distances are below about 3 Å. Finally, it can further hop to coordinate with the upper Al centers (black circle in Complex 2), forming Complex 2, the successfully hopped product. On the other hand, it is also possible for the hopping Li$^+$ ion to return and bind back with the lower Al center, in which it does not get over transition state barrier (FIG. 36). Both the experimental and simulation results indicate that the fluorinated chains assist the transport of Li$^+$ ions.

Li-Metal Deposition and Morphology

Next, examination is made of the battery performance of Al-FTEG (DSN), B-FTEG, and Si-FTEG as artificial SEIs by monitoring the CE of Li stripping and plating in Li∥Cu cells in a commercial carbonate electrolyte (about 1 M LiPF$_6$ in EC/DEC (v:v=about 1:1) with about 10 wt. % FEC additive) (FIG. 19A). The sample with no artificial SEI coating rapidly loses its CE, lasting just over 80 cycles before failure. The Si-FTEG coated Cu cell, with neither single-ion conductivity nor dynamic property behavior, shows almost no improvement compared to the bare Cu control. By contrast, the single-ion-conductive yet non-dynamic B-FTEG modified Cu evidently prolongs the cycle life. This result supports the initial hypothesis that uniform single-ion conduction can reduce "hot spot" formation and enhance artificial SEI performance. Finally, with Al-FTEG (DSN) as an artificial SEI, the cyclability is vastly improved, lasting remarkably longer than uncoated, Si-FTEG, or B-FTEG samples. At about 1 mA cm$^{-2}$ current density and about 1 mAh cm$^{-2}$ capacity, the CE of the DSN-coated cell was maintained at about 94.9% for over 250 cycles.

Figure 4E:
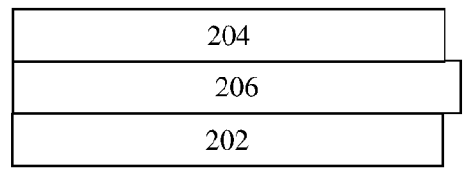
FIG. 4e. Schematic of an embodiment of a battery.
Figure 19G:
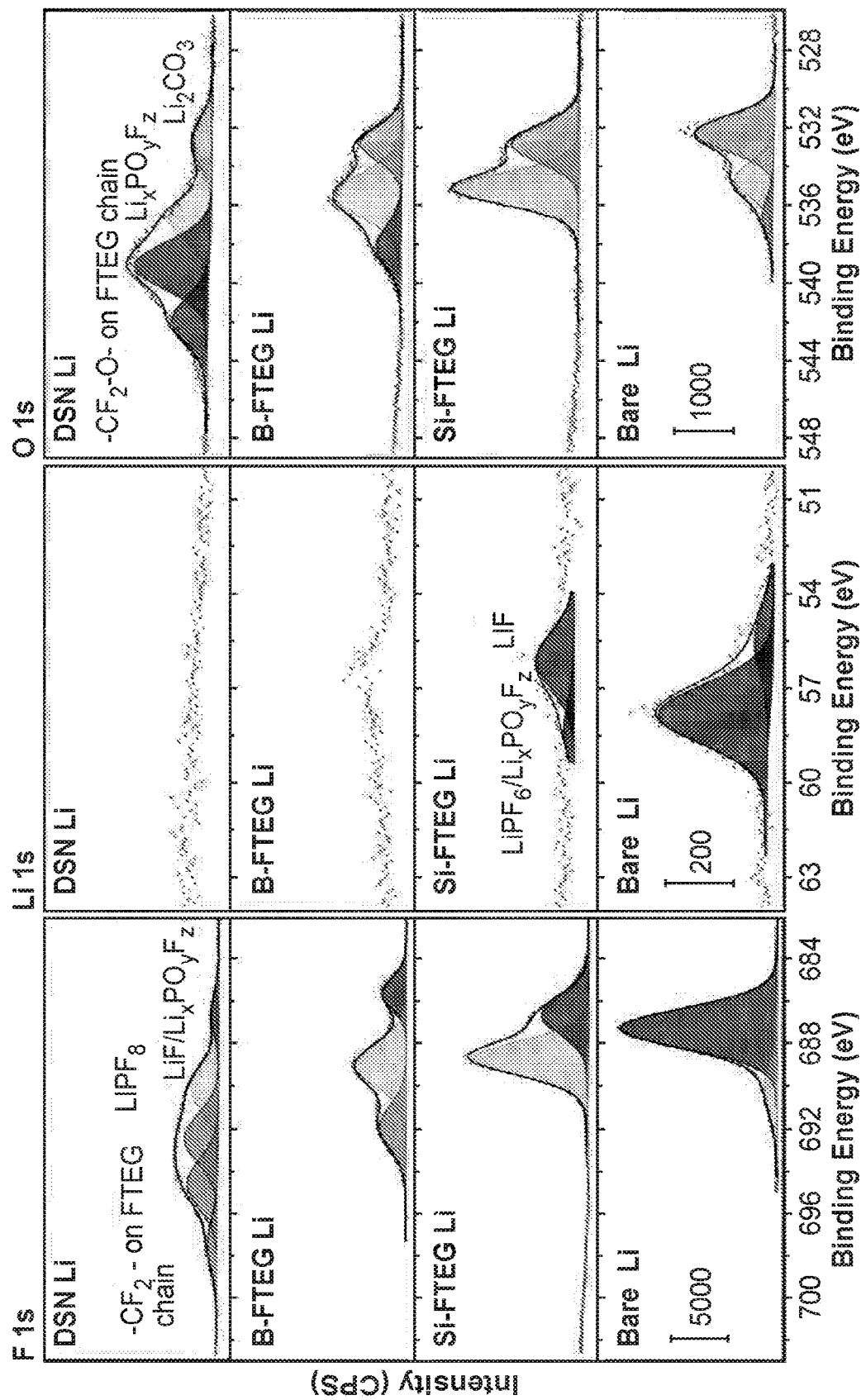
FIG. 19. Characterization of Artificial Solid Electrolyte Interphases (SEIs). (A) Cycle stability plot of Coulombic efficiency (CE) under about 1 mA cm$^{-2}$ current density and about 1 mAh cm$^{-2}$ areal capacity. The electrolyte is about 1 M LiPF$_6$ in EC/DEC (v:v=about 1:1) with about 10 wt. % FEC additive. About 75 mL electrolyte was used for each cell. (B-E) Nyquist plot of DSN Li||DSN Li (B), B-FTEG Li||B-FTEG Li (C), Si-FTEG Li||Si-FTEG Li (D), and bare Li||bare Li (E) symmetric cell rested over time after cell assembling. Inset of (B) and (C): zoomed-in plot. (F) Comparison of cycling performance of bare Li||bare Li and DSN Li||DSN Li symmetric cells. Inset: zoomed-in plot of the 500$^{th}$-505$^{th}$ cycles. (G) F 1 s, Li 1 s, and O 1 s X-ray photoelectron spectroscopy (XPS) profiles of different artificial SEIs coated Li and bare Li after soaking in the electrolyte for 4 days followed by washing coating layers off. CPS, counts per second. Scale bars: F 1 s, 5,000 CPS; Li 1 s, 200 CPS; O 1 s, 1,000 CPS.
Figure 57:
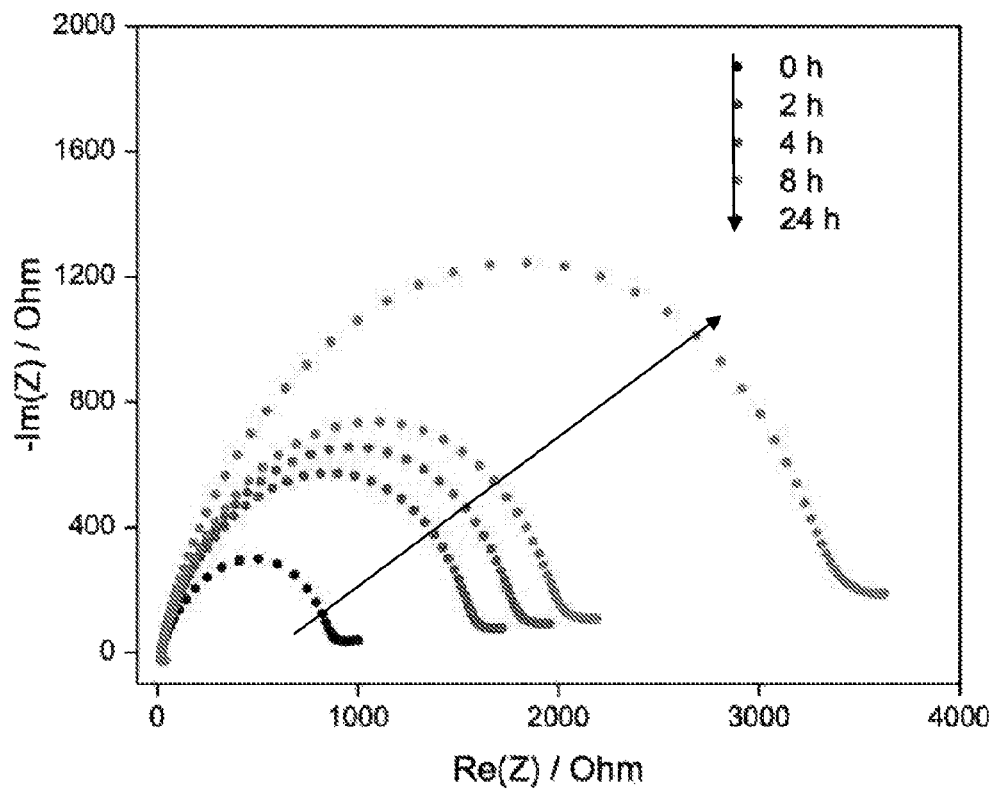
FIG. 57. Ruling out the potential influence of DME solvent on the interfacial impedance change. Note: Using the same dip-coating procedure as set forth in the Methods section, the Li foils are dipped into DME and wiped with Kimwipe to dry. Then Li∥Li cell is assembled to measure impedance evolution. Observation is still made of huge increase in the interfacial impedance, just like Si-FTEG Li and bare Li cells.

DSN (Al-FTEG) and B-FTEG artificial SEIs can be directly coated on Li-metal foil and provide stable cycling in a Li∥Li cell configuration. Both EIS measurements show much lower SEI impedances compared to the Si-FTEG or bare one (FIGS. 19B-19E). With resting time, the DSN (and B-FTEG) cell impedance increases modestly for about 300Ω in the first 8 h after cell assembling and then remains constant (FIGS. 19B and 19C). The impedance of the Si-FTEG or bare Li cell, on the other hand, increases dramatically from about 1,000 to over about 3,000Ω after 8 h and continues to increase even several days after assembling (FIGS. 19D, 19E, and 57). As a result, DSN Li∥DSN Li and bare Li∥bare Li cells were chosen as representatives to evaluate the overpotential, and the DSN cell show lower overpotential and more stable cycling than its counterpart (FIGS. 19F and 37), indicating its protection effect on Li metal surface. High interfacial impedance and overpotential can be due to continuous electrolyte consumption to form a poorly conductive and devastated SET. To confirm this in the evaluated system, examination is made of X-ray photoelectron spectroscopy (XPS) profiles of different SEI layers on Li (FIGS. 19G and 38). Careful scrutiny of XPS spectra reveals that the SEI of DSN Li and B-FTEG Li is dominated by FTEG chains (—CF$_2$—, about 693 eV, F is; —CF$_2$—O—, about 539 eV, O 1 s), whereas that of Si-FTEG Li and bare Li contains more inorganic components derived from reactions between Li and electrolyte, such as LiPF$_6$ (about 690 eV, F is), Li$_x$PO$_y$F$_z$ (about 687 eV, F 1 s; about 58 eV, Li 1 s; about 535 eV, O 1 s), LiF (about 56 eV, Li 1 s), and Li$_2$CO$_3$ (about 533 eV, O 1 s). These results indicate that the Al-FTEG (DSN) is the most effective, followed by the B-FTEG, to mitigate the electrolyte penetration and prevent continuous reactions between Li and electrolyte while the Si-FTEG coating or uncoated Li cannot. The Lewis acidity of the Si centers in the Si-FTEG may attract LiPF$_6$ in the electrolyte while the anionic centers in the DSN and B-FTEG mitigate the electrolyte penetration. This hypothesis is further supported by the swelling test where less swelling was observed for the soaked DSN and B-FTEG, and by the $^{19}$F-NMR where less LiPF$_6$ was found in the soaked DSN and B-FTEG (FIG. 39). The lower initial SEI impedance of the DSN and B-FTEG-coated cell (about 600Ω) compared to that of the Si-FTEG and bare Li cell (about 1,000Ω) can be explained by the electrolyte-blocking property as well (FIGS. 19B-4E).

Figure 20:
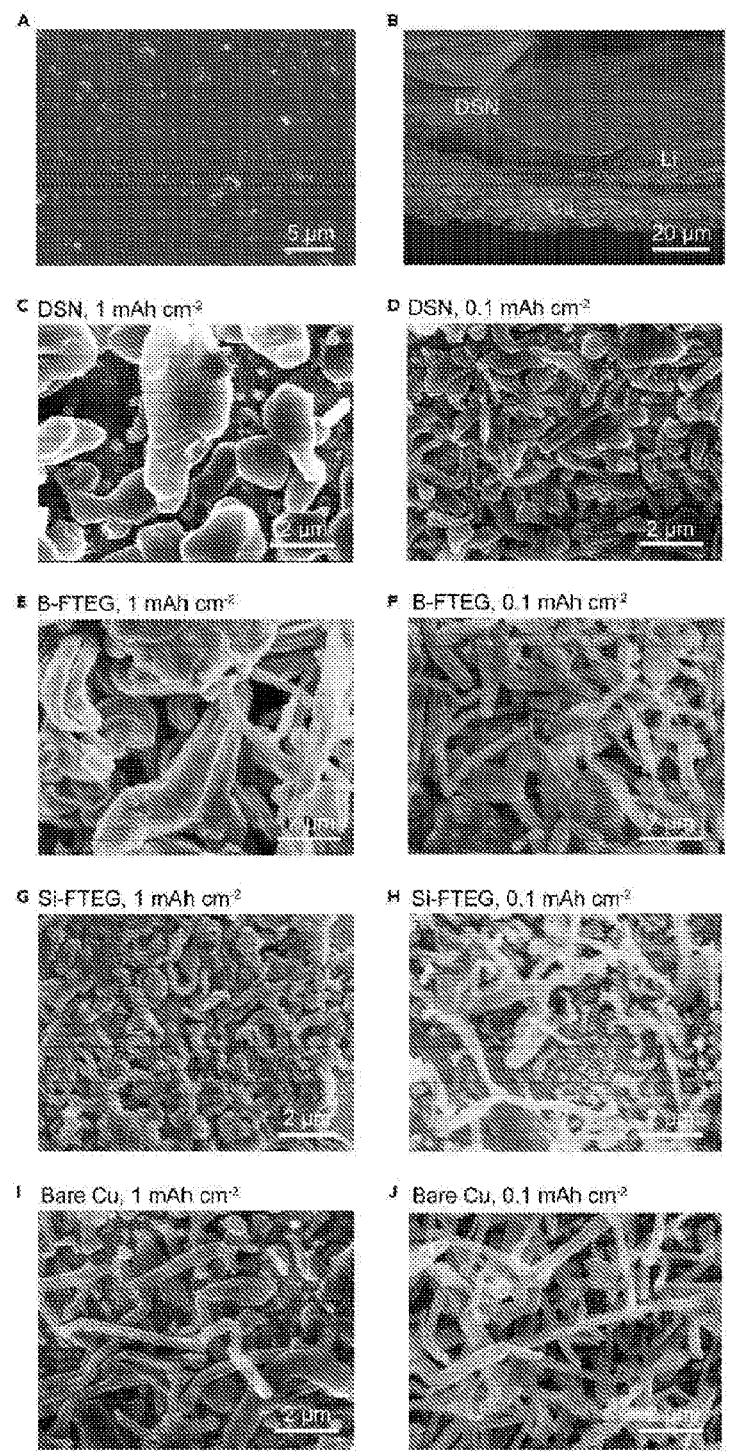
FIG. 20. Li Deposition Morphology. (A) Top view SEM of the DSN layer with directly deposited about 1 mAh cm$^{-2}$ Li underneath. Scale bar, 5 mm. (B) Side view of deposited about 0.5 mAh cm$^{-2}$ Li under the protection of DSN. Scale bar, 20 mm. (C-J) Morphology of Li deposited on bare Cu and different artificial SEI coated Cu foils. (C) DSN, about 1 mAh cm$^{-2}$. (D) DSN, about 0.1 mAh cm$^{-2}$. (E) B-FTEG, about 1 mAh cm$^{-2}$. (F) B-FTEG, about 0.1 mAh cm$^{-2}$. (G) Si-FTEG, about 1 mAh cm$^{-2}$. (H) Si-FTEG, about 0.1 mAh cm$^{-2}$. (I) bare, about 1 mAh cm$^{-2}$. (J) bare, about 0.1 mAh cm$^{-2}$. Scale bars, 2 mm.

Non-dendritic, two-dimensional (2D) growth of Li is desirable for battery performance; thus, SEM is used to examine the morphology of Li deposition on Cu to further understand the origins of the improved cyclability of Li metal with the DSN coating. The DSN protection layer remained nearly intact after about 1 mAh cm$^{-2}$ Li deposition despite being deliberately peeled off for side-view SEM (FIGS. 20A, 20B, and 28). The top layer is washed off in order to compare the Li morphology. With the DSN protection, the deposited Li at about 1 mAh cm$^{-2}$ showed large and flat plate-like structures, while Li deposited with B-FTEG coating showed large particles mixed with needle-like dendrites (FIGS. 20C, 20E, 40, and 41). Interestingly, the initial Li deposits at about 0.1 mAh cm$^{-2}$ under DSN were still dominated by 2D plates whereas those under B-FTEG were mainly one-dimensional (1D) dendritic structures (FIGS. 20D and 20F). In contrast, for Si-FTEG coated Cu or bare Cu, the deposited Li were observed as needles or small particles at both about 1 and about 0.1 mAh cm$^{-2}$ (FIGS. 20G-20J). The best Li surface protection effect of the DSN coating, confirmed by the least Li∥Li interfacial impedance evolution over time (FIGS. 19B and 19C) and fewest products of parasitic reactions between Li and electrolyte (FIG. 19G), is potentially an important factor that helped to improve the Li deposition morphology. The non-dynamic B-FTEG was observed to be less effective due to the absence of flowability and conformal protection. On the other hand, the continuous increase observed in Li∥Li impedance of Si-FTEG-coated Li or bare Li (FIGS. 19D and 19E) along with the lack of conformal protection is responsible for its worse Li deposition morphology. These SEM observations are consistent with the Li∥Cu cycling result (FIG. 19A) and confirm that the DSN design improves Li growth morphology.

Battery Performance

Figure 21E:
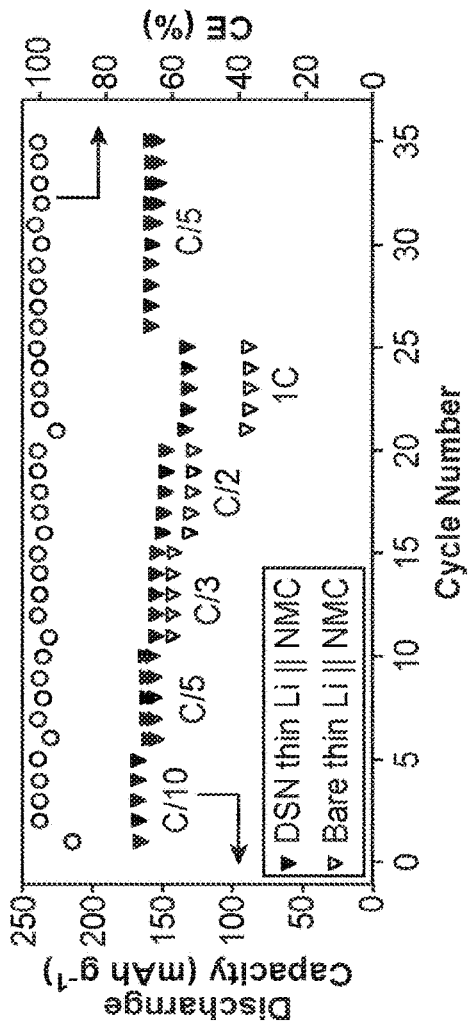
FIG. 21. Battery Performance. (A) Cycle stability plot of CE at a current density of about 0.25 mA cm$^{-2}$ and areal capacity of about 0.5 mAh cm$^{-2}$. (B) Comparison of the Li||Cu cell cycle number and CE of this example (star) with the performance of other artificial SEIs or strategies using about 1 M LiPF$_6$ in carbonate electrolytes at about 0.5 mA cm$^{-2}$ and about 1 mAh cm$^{-2}$. Triangles: other artificial SEIs; spheres: other strategies. (C) Voltage profiles of Li||DSN Cu cell at the 20$^{th}$ and 90$^{th}$ cycle, at a current density of about 0.25 mA cm$^{-2}$ and areal capacity of about 0.5 mAh cm$^{-2}$. (D) The first three cyclic voltammetry (CV) cycles of Li||DSN Cu cell (voltage range: about −0.1 V to about 2.0 V; scanning rate: about 0.5 mV s$^{-1}$). (E) Rate capability of DSN thin Li (about 42 μm)||NMC532 and bare thin Li||NMC532 full batteries. (F) Long-term cycling performance of DSN thin Li||NMC532 and bare thin Li||NMC532 full batteries.
Figure 21D:
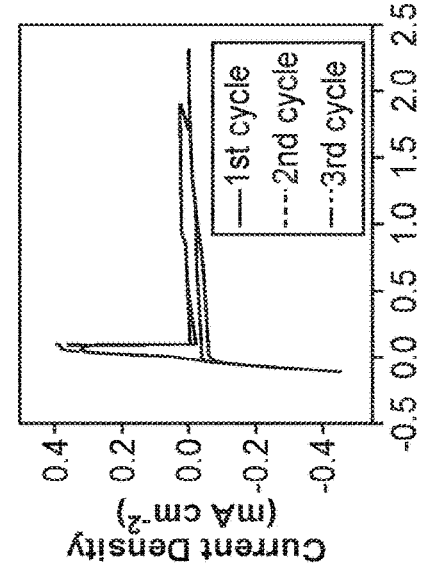
Figures 43A, 43B, 43C:
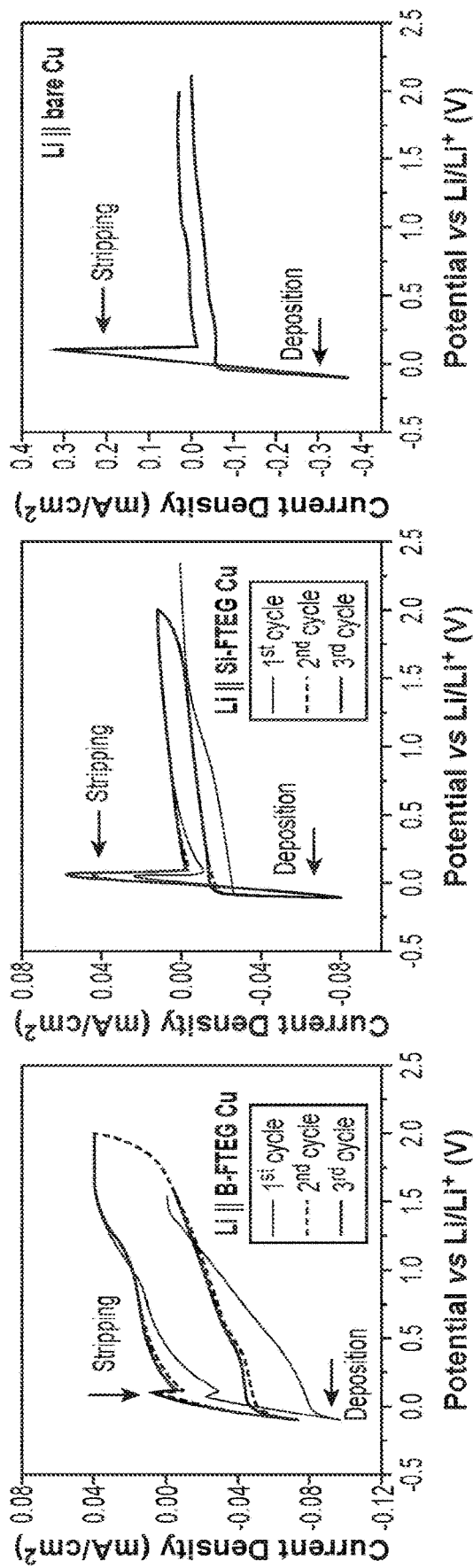
FIG. 43. The CV cycles of Li||B-FTEG Cu (a), Li||Si-FTEG Cu (b), and Li||bare Cu (c) cells in about 1 M $LiPF_6$ in EC/DEC (v:v=about 1:1) with about 10 wt. % FEC additive (voltage range: about −0.1 V to about 2.0 V; scanning rate: about 0.5 mV $s^{-1}$). Note: Clear Li metal stripping/deposition peaks (marked as arrows) can be observed under all three conditions, while none of them showed noticeable side reaction peaks.
Figure 56:
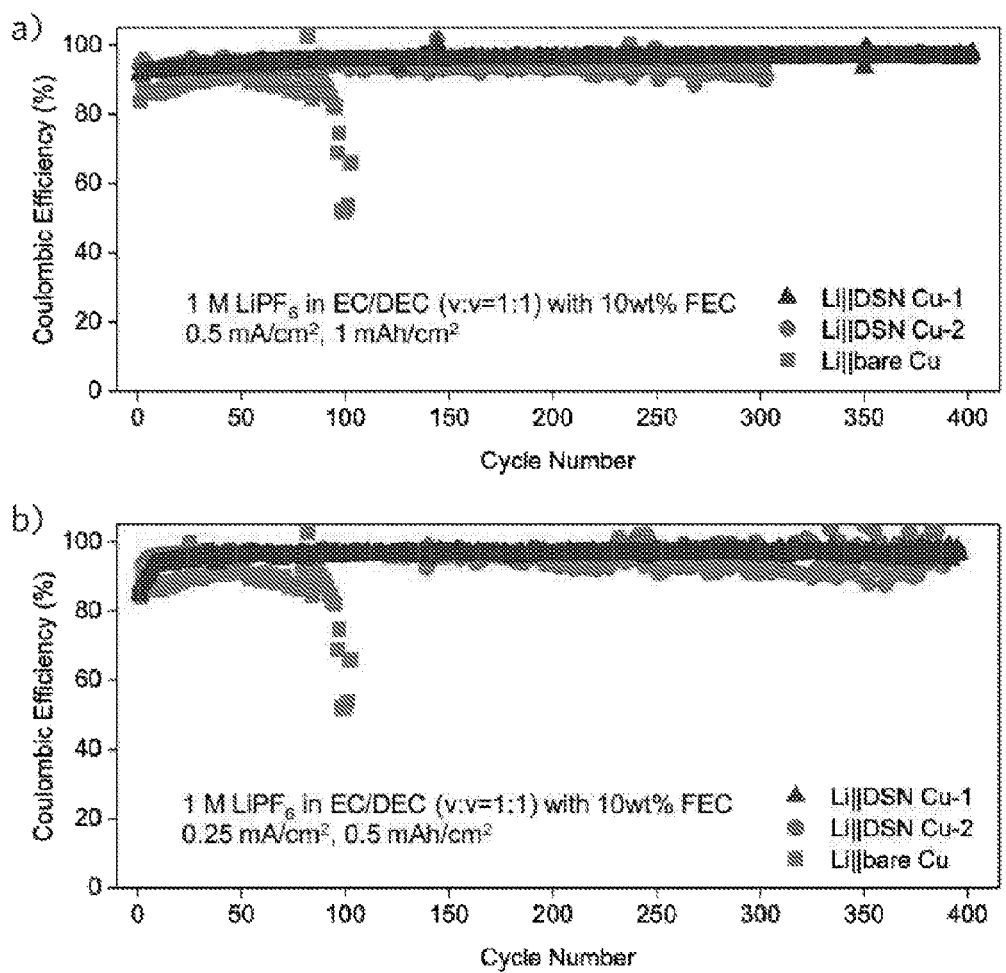
FIG. 56. Cycle stability plot of Coulombic efficiency at different current densities. a) about 0.5 mA cm$^{-2}$, about 1 mAh cm$^{-2}$, b) about 0.25 mA cm$^{-2}$, about 0.5 mAh cm$^{-2}$. For each condition, two cells with DSN coatings were given to establish repeatability. The electrolyte used: about 1 M LiPF$_6$ in EC/DEC (v:v=about 1:1) with about 10 wt. % FEC additive.

Given the improved Li deposition morphology with DSN, further investigation is made of the Li stripping and plating performance with the DSN artificial SEI. The Li∥DSN Cu cell can stably cycle for over 400 cycles with a high average CE of about 97.3% at a current density of about 0.25 mA/cm$^{-2}$ and areal capacity of about 0.5 mAh cm$^{-2}$ (FIG. 21A). At a current density of about 0.5 mA cm$^{-2}$ and a capacity of about 1 mAh cm$^{-2}$, the CE of DSN-coated cell remains at about 96.5% for over 400 cycles (FIGS. 42 and 56). The cycle number and CE outperform those of other artificial SEIs or strategies using about 1 M LiPF$_6$ in carbonate electrolytes (FIG. 21B and Table 1). Under other electrolytes or higher current density conditions, DSN-coated cells also perform significantly better than bare ones (FIG. 42). The voltage profiles of Li∥DSN Cu cell indicate stable stripping and plating by showing a smooth plateau with a low overpotential of about 20 mV (FIG. 21C). The high CE and stable cycling are indications of chemical stability of DSN against Li metal. The cyclic voltammetry (CV) of Li∥coated Cu cell usually contain several redox peaks aside from Li stripping and plating, indicating additional side reactions between the coating layer and Li metal. Nevertheless, the CV of the Li∥DSN Cu cell showed clean sweep with no other peaks except those for Li stripping and plating, again confirming that DSN has no uncontrollable side reactions with Li metal (FIGS. 21D and 43). Such tolerance toward the highly reductive environment of Li metal makes DSN robust for long-term cycling.

Figure 21F:
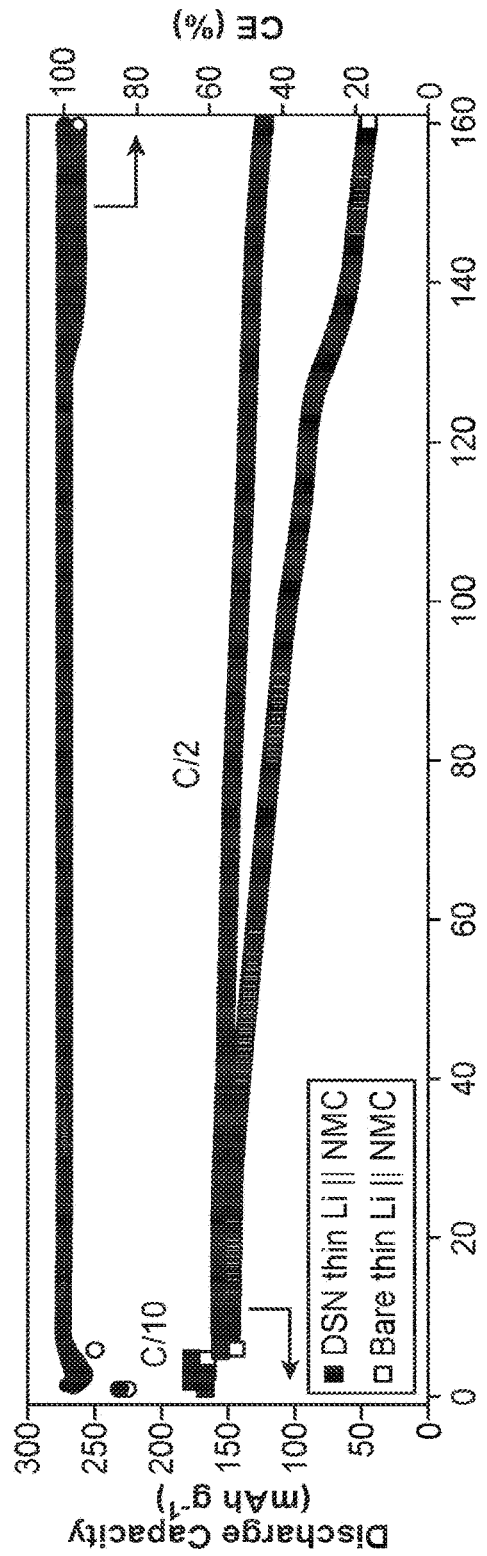
Figure 23B:
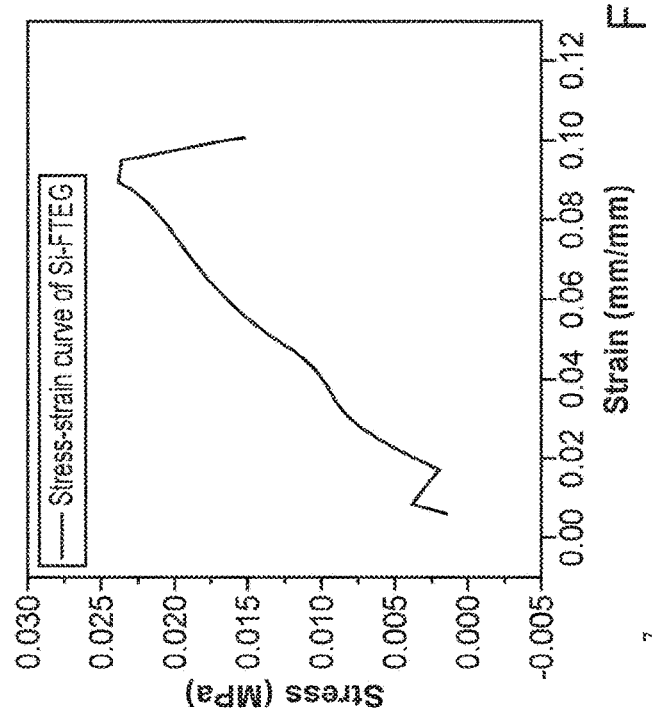
FIG. 23. a) Detailed chemical structure of Si-FTEG. b) Stress-strain curve of Si-FTEG free-standing film. Strain rate: about 10 mm/min. c) Pictures of Si-FTEG free-standing film. d) Nyquist plot of the Si-FTEG material measured in SS||SS symmetric cell. The conductivity is lower than about 10$^{-10}$ S/cm. e) DFT calculation of Si(OR)$_4$ covalent bonding energy at the B3LYP/6-31G+(d,p) level. Note: Similar to B-FTEG, the stress-strain curve showed Si-FTEG is a brittle material with breaking point at about 9% strain. DFT gave a covalent bonding energy for Si-FTEG (about 480.5 kJ/mol).
Figure 23D:
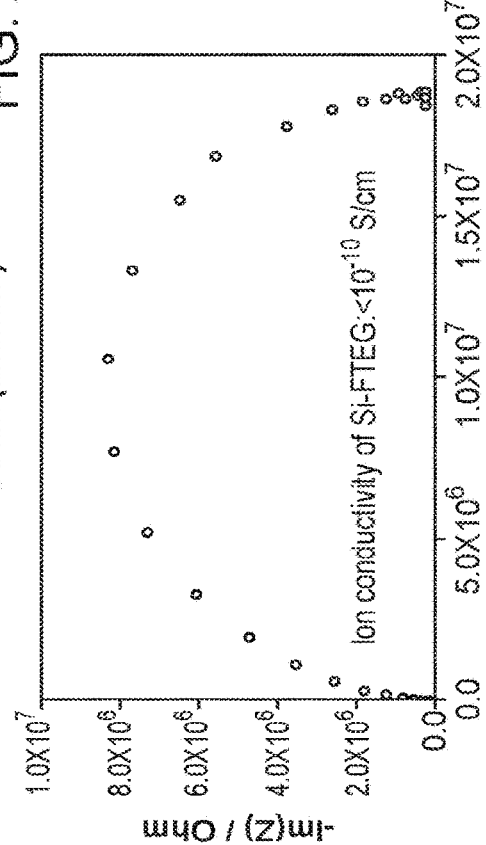
Figure 23A:
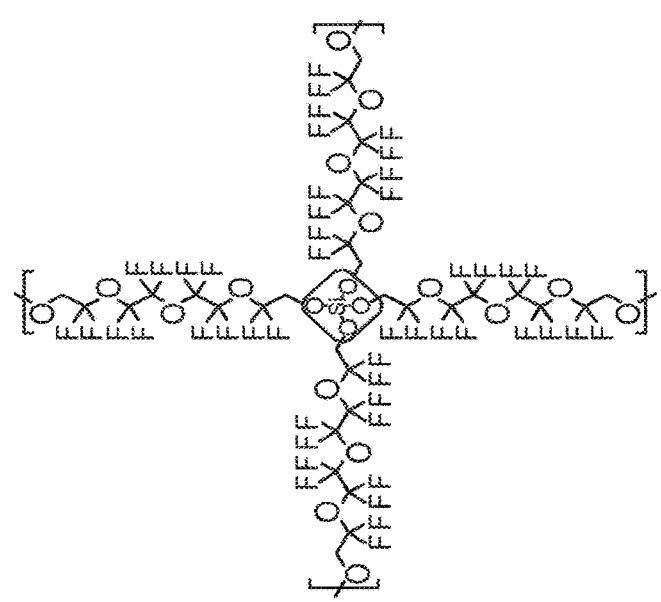
Figure 23C:
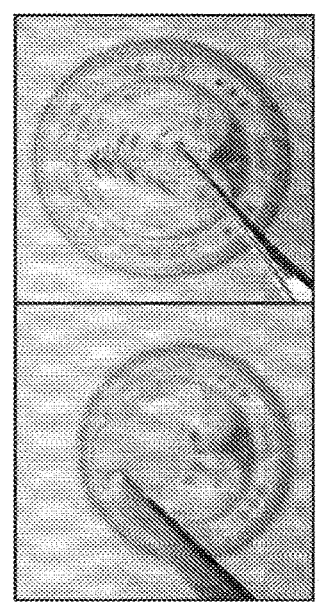
Figure 23E:
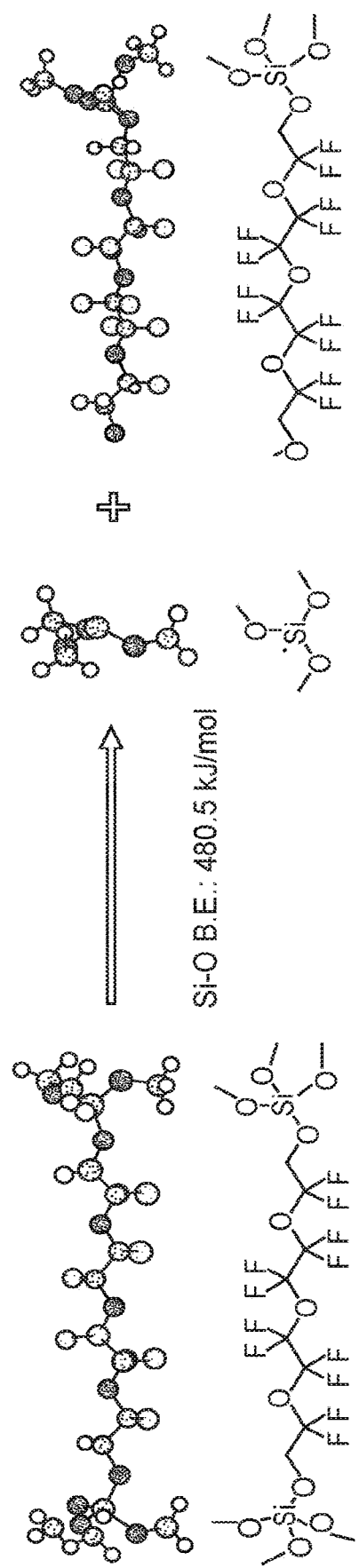
Figure 24A:
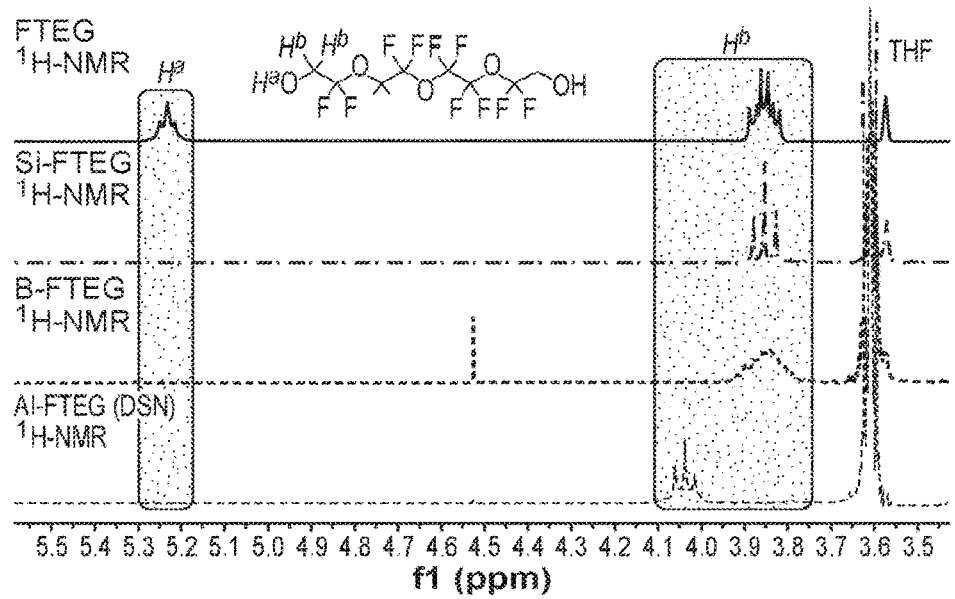
FIG. 24a showed complete reactions to obtain DSN, B-FTEG, and Si-FTEG.
Figure 24B:
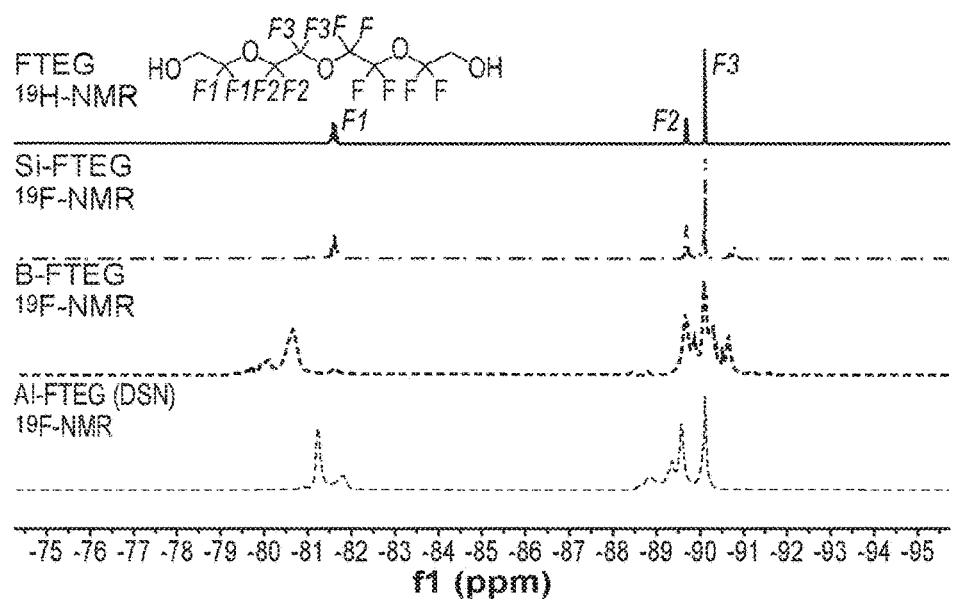
FIG. 24b showed one set of $^{19}$F signals for starting material, FTEG, and non-Li$^+$-containing material, Si-FTEG, while several sets of $^{19}$F signals for Li$^+$-containing materials, DSN and B-FTEG. All NMR experiments were done in d$^8$-THF solution.
Figure 24C:
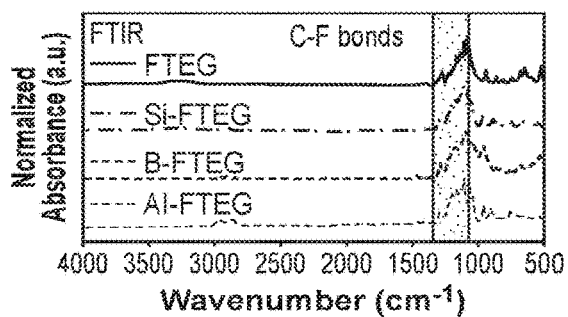
FIG. 24. Comparison of $^1$H-NMR (a) and $^{19}$F-NMR (b) in d$^8$-THF, and FTIR (c) of FTEG, Si-FTEG, B-FTEG, and DSN. d) Detailed comparison of FTIR of FTEG, Si-FTEG, B-FTEG, and DSN, where Si—O, B—O, and Al—O bonds are labeled as shown. Note.
Figure 24D:
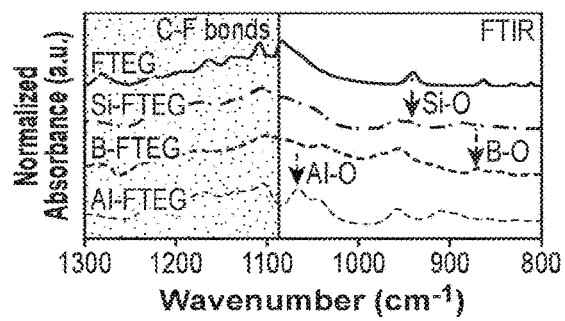
Figures 26A, 26B, 26C, 26D:
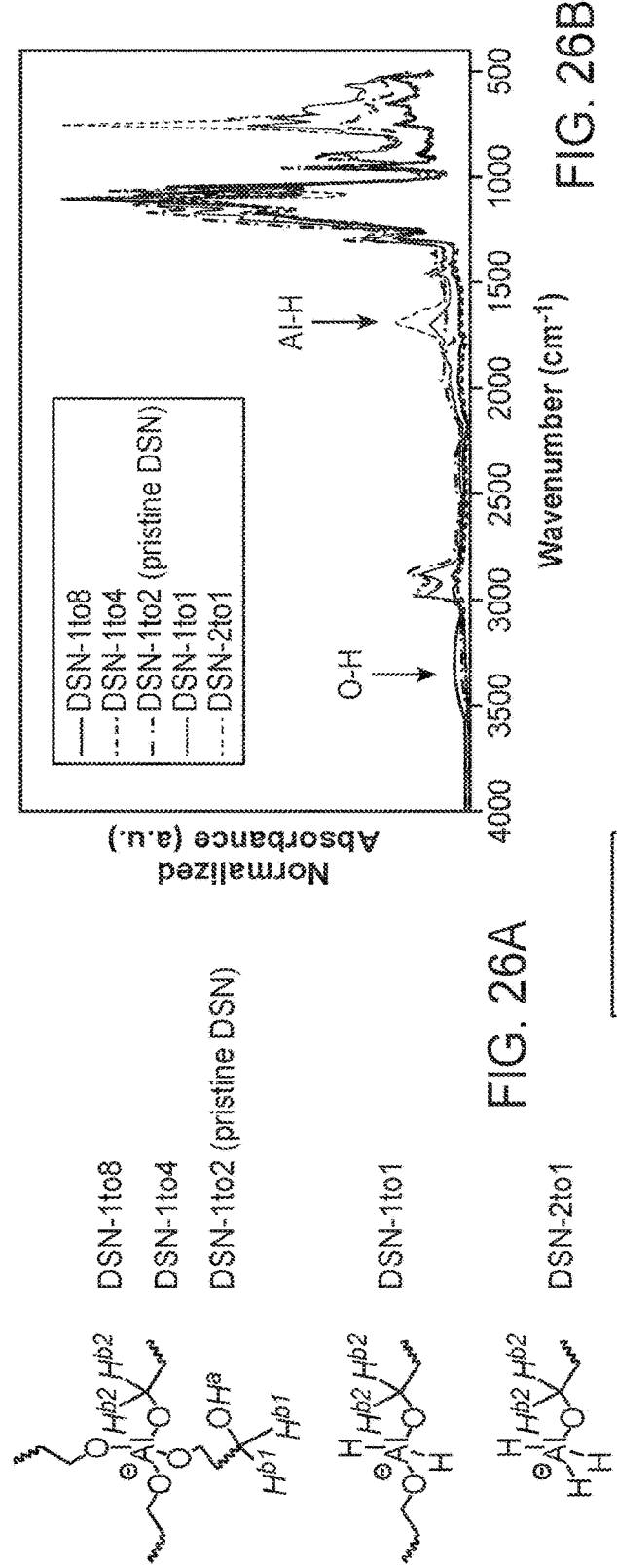
FIG. 26. a) Ideal structures of DSN-1to8, DSN-1to4, DSN-1to2, DSN-1to1, and DSN-2to1. b) The whole range ATR-FTIR spectrum of DSN-1to8, DSN-1to4, DSN-1to2, DSN-1to1, and DSN-2to1. Detailed comparison of FTIR for c) O—H vibration range and d) Al—H vibration range. Due to the high reactivity of hydride group, FTIR was done in argon-filled glovebox. Note: ATR-FTIR results also confirm the DSN structure by showing that DSN-1to8, DSN-1to4, and DSN-1to2 have solely Al—O vibrations, while DSN-1to1 and DSN-2to1 have both Al—O and Al—H vibrations.
Figure 47:
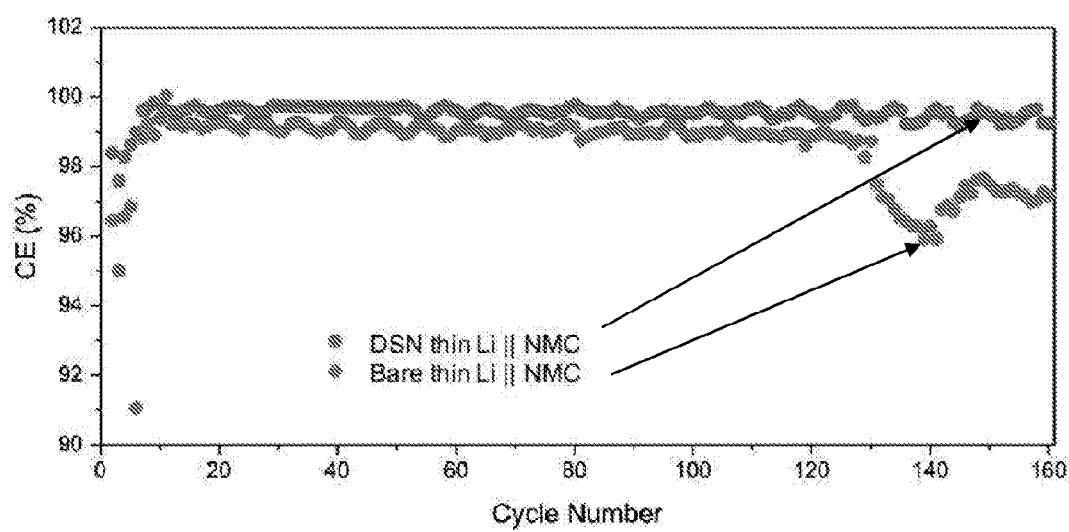
FIG. 47. Zoomed-in comparison of Coulombic efficiency for long term cycling of Li∥NMC full cells. Note: The Coulombic efficiency of DSN coated Li∥NMC full cell (about 99.6%) is higher and more stable compared to that of bare Li∥NMC one (about 98.4%).
Figure 49A:
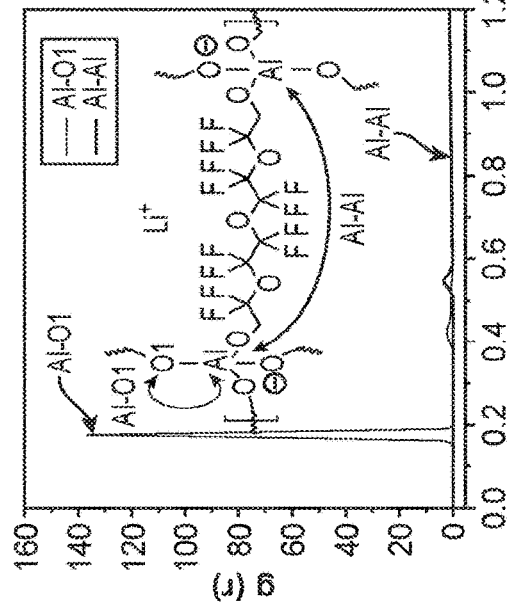
FIG. 49. a) Ion drift in DSN under z-direction electric field. b) Radial distribution functions (RDF) at equilibrium: Al—O1; Al—Al. c) Distribution of drift distances along electric field over 50 ns simulation (n=192 counts). d) Distribution of average velocities along electric field. To make ion drift clear, the electric field applied in the MD simulation is as high as $4 \times 10^9$ V/m. Note: Calculated from a), the LTN is about 0.98 for DSN. For b), observation is made of nearly single distribution for either Al—O1 or Al—Al, which indicates uniformity of DSN system. The small shoulder of Al—O1 RDF at about 0.42 nm (farther than the single distribution peak at about 0.18 nm) might result from the dynamic nature of Al—O bondings. From c) and d), it can be concluded that under high electric field Li$^+$ ions are transporting while Al centers are relatively fixed.
Figure 49B:
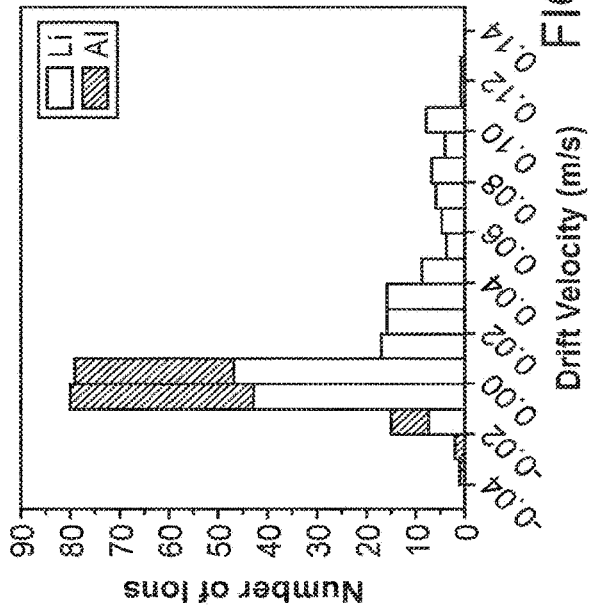
Figure 49C:
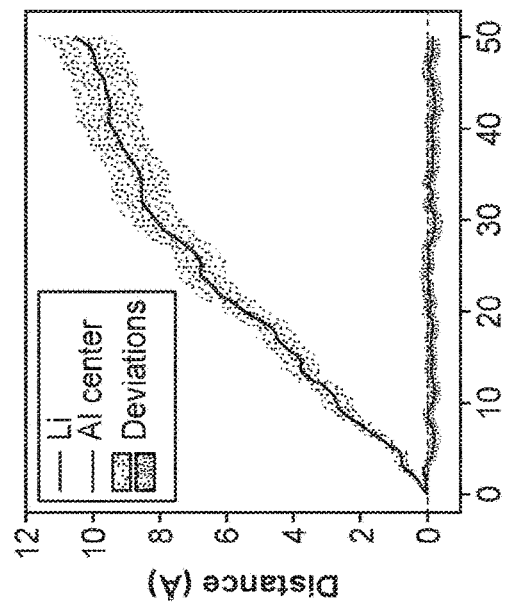
Figure 49D:
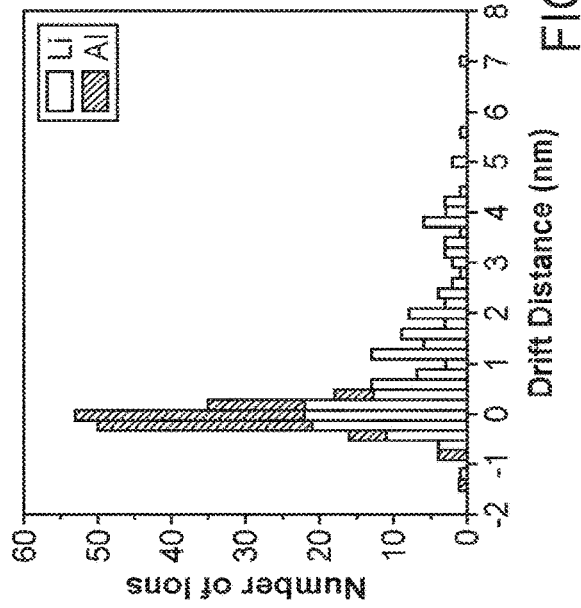
Figure 50A:
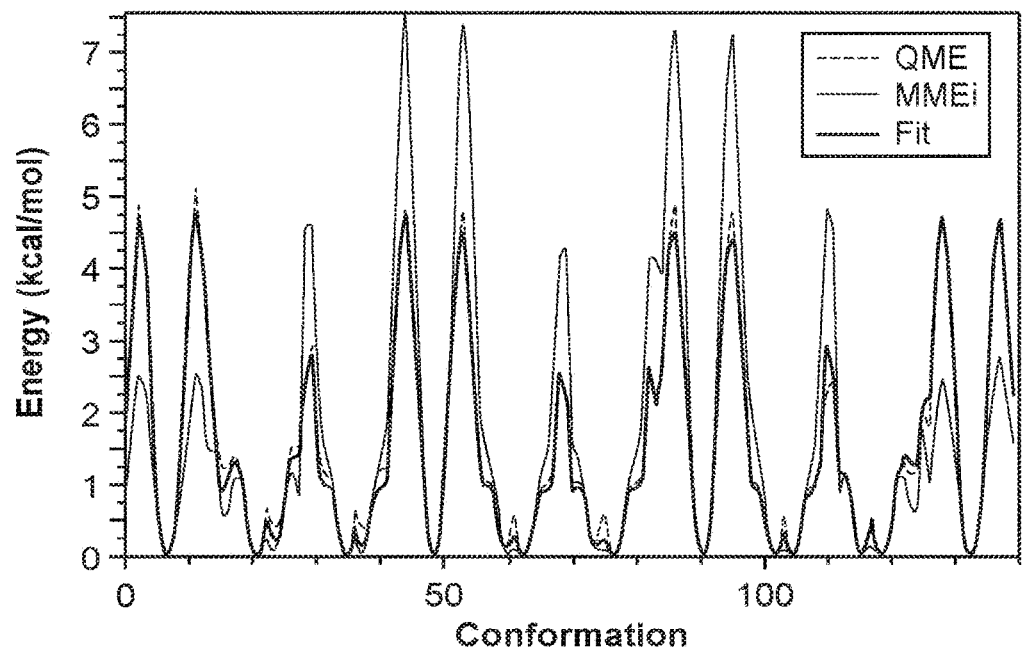
FIG. 50. Molecular dynamics torsion potential parameterization errors for a) FTEG linker (FIG. 47a) and b) aluminate node (FIG. 47b). Labeled ines indicate the MP2, initial MD, and optimized MD energy values, respectively. Root mean squared errors (kcal/mol) listed in Table 3.
Figure 50B:
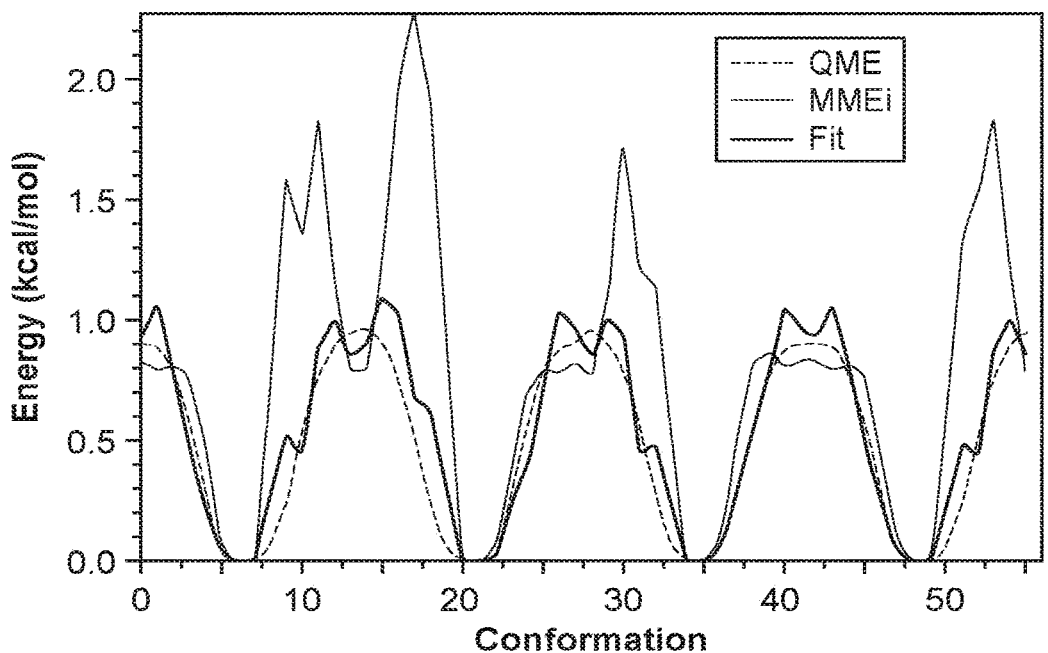

An ideal artificial SEI will allow the operation of Li metal full battery using all commercial components, especially thin Li foils and commercial cathodes with high active material proportion, for practical application. Direct coating is made of an DSN protection layer on a thin Li foil (about 42 mm thickness, about 8 mAh cm$^{-2}$) through a dip-coating method (Experimental Procedures and FIG. 44) and full cells are assembled with coated Li foils and commercial NMC532 electrode sheets (about 95% active material, about 2 mAh cm$^{-2}$ loading). The DSN coating greatly decreases impedance while increasing the rate capability of Li||NMC full cells, obtaining a discharge capacity of about 132.9 mAh g$^{-1}$ compared to about 88.2 mAh g$^{-1}$ for the uncoated anodes at a rate of about 1C (FIGS. 21E, 45, and 46). Given a higher average CE (>about 99.6%), the DSN Li||NMC full cell also showed much improved capacity retention of about 85% after 160 cycles at a charge-discharge rate of about C/2 as compared to that of the bare Li cell (<about 30% retention). The average CE of the bare Li battery is just about 98.4% due to the dramatic failure after 130 cycles (FIGS. 21F, 46, and 47). These results demonstrate that DSN is desirable for large-scale fabrication and further development into pouch or cylinder cells.

Conclusions:

In this example, demonstration is made of utilizing Al—OR bonding to create a dynamic single-ion-conductive network (DSN) coating to protect Li-metal anodes. The DSN greatly improves Li metal anode performance mainly in three ways: (1) its appreciable Li$^+$ single ion conductivity can reduce the interfacial impedance and lower the overpotential for Li metal deposition, (2) the DSN coating mitigates the electrolyte penetration and reduces parasitic reactions between Li and electrolyte, (3) the dynamic flowability results in relatively uniform Li metal deposition morphology, and (4) the chemically inert FTEG chains makes DSN coating stable toward Li metal. All features allow stable Li metal cycling in Li||Li symmetric cells, Li||Cu half cells, and Li||NMC full cells. Specifically, the electrodes and electrolyte utilized in Li||NMC full cells are commercially available at a large-scale. Combined with its low-cost starting materials and convenient processing method, the reported DSN coating provides a desirable approach for realizing practical Li metal batteries. Meanwhile, the design strategy to combine single-ion conductivity with dynamic chemistry into one material matrix provides an extraordinary type of material for next generation Li batteries.

Experimental Procedures

Synthesis of DSN, B-FTEG, and Si-FTEG
DSN Synthesis

About 410 mg FTEG and about 2.8 mL DME were added to an about 20 mL vial. After sonicating for about 3 min until FTEG was substantially fully dissolved, the vial was transferred into a nitrogen-filled glovebox with sub-ppm O$_2$ and H$_2$O level (MBRAUN). Under stirring, about 500 mL of about 1 M LiAlH$_4$ in THF was added dropwise into the vial. After stirring at RT overnight, the yielding solution was filtered through 0.45 mm PTFE filter into an about 4 mL vial, to obtain about 150 mg mL$^{-1}$ DSN/DME solution.

B-FTEG Synthesis

About 410 mg FTEG and about 2.8 mL DME were added to an about 20 mL vial. After sonicating for about 3 min until FTEG was substantially fully dissolved, the vial was transferred into the nitrogen-filled glovebox. While stirring, about 250 mL of about 2 M LiBH$_4$ in THF was added dropwise into the vial. The yielding solution was immediately filtered through 0.45 mm PTFE filter into an about 4 mL vial, to obtain about 150 mg mL$^{-1}$ of B-FTEG in DME solution.

Si-FTEG Synthesis

About 410 mg FTEG and about 3.2 mL DME were added to an about 20 mL vial. After sonicating for about 3 min until FTEG was fully dissolved, the vial was transferred into the nitrogen-filled glovebox. Under stirring, about 85 mg SiCl$_4$ was added slowly into the vial and the vial was sealed then. After stirring at about 80° C. overnight, the yielding solution was filtered through 0.45 mm PTFE filter into 4 mL vial, to obtain about 150 mg mL$^{-1}$ Si-FTEG/DME solution. All those solutions were used for spin-coating right after procurement. For free-standing samples, the solutions were poured into corresponding mold and heated to about 80° C. for about 6 h to evaporate all solvents.

Fabrication of DSN, B-FTEG, and Si-FTEG-Modified Cu Electrodes and DSN-Coated Li Anode The coated Cu working electrodes were fabricated in the nitrogen-filled glovebox. About 100 mL as-synthesized DSN (or B-FTEG, Si-FTEG)/DME solution (about 150 mg mL-1) was transferred onto the smooth side of Cu foil (about 2 cm$^{-2}$ round disk) and spin-coated with about 2000 rpm spin rate for about 30 s. The acceleration rate is about 500 rpm s$^{-1}$. The obtained modified Cu electrodes were transferred quickly into an argon-filled glovebox with sub-ppm O$_2$ and H$_2$O level (Vigor Tech) for further use. The coated thin Li foil was fabricated with dip-coating method in an argon-filled glovebox with sub-ppm O$_2$ and H$_2$O level (Vigor Tech). First, thin Li foils were punched into about 0.7 (for Li||Cu cells) or about 1.0 (for Li||Li and Li||NMC cells) cm$^{-2}$ round disks. Then they were dipped into about 50 mg mL-1 DSN/DME solution for about 1 min and lifted out. The remaining solution on Li was immediately but gently wiped out with Kimwipes (KIMTECH) until a dry yet sticky surface was formed.

DFT Calculations

The molecular geometries for the ground and charged states were optimized by density functional theory (DFT) at the B3LYP/6-31G+(d,p) level. Then, the energy of molecules were evaluated at the DFT-B3LYP/6-31G+(d,p). The bonding energy was calculated from the energy difference between starting structure and products after bond breakage. All the DFT calculations were carried out with the Gaussian 09 package.

MD Simulations

All-atom MD simulations of FTEG-DSN were performed in GROMACS (FIGS. 48-51 and Tables 3-7). Force field parameters were generated using AMBER methodology with the Force Field Toolkit in VMD. Production simulations were performed in triplicate for each network in the NPT ensemble for 50 ns, in both the absence and presence of electric field. A timestep of 1 ns was used in all simulations. Each simulation contained 128 FTEG chains, 64 Al atoms, and 64 Li atoms. Systems were initialized without Li atoms or bonds between FTEG chains and Al atoms. Network topology was generated dynamically to best replicate experimental conditions; the linking procedure is detailed in the Supplemental Information. Initial configurations included Al atoms and FTEG chains randomly distributed in the gas phase. The system was first energy-minimized in the NVE ensemble, then equilibrated in the NVT and NPT at 600 K and 1 bar, resulting in an average density of (about 1,700 g/cm$^3$). Bondings were then generated between FTEG chains and Al atoms. Next, Li atoms were added, and the system re-equilibrated in the NPT ensemble. Production simulations utilized Parrinello-Rahman barostat and Nose"-

Hoover thermostat. Simulations of Li transport under applied voltage used potentials of strength between 1 and 6 V/nm along the z axis. Analysis of MD trajectories was aided by use of the MDAnalysis library in Python.

Figure 52:
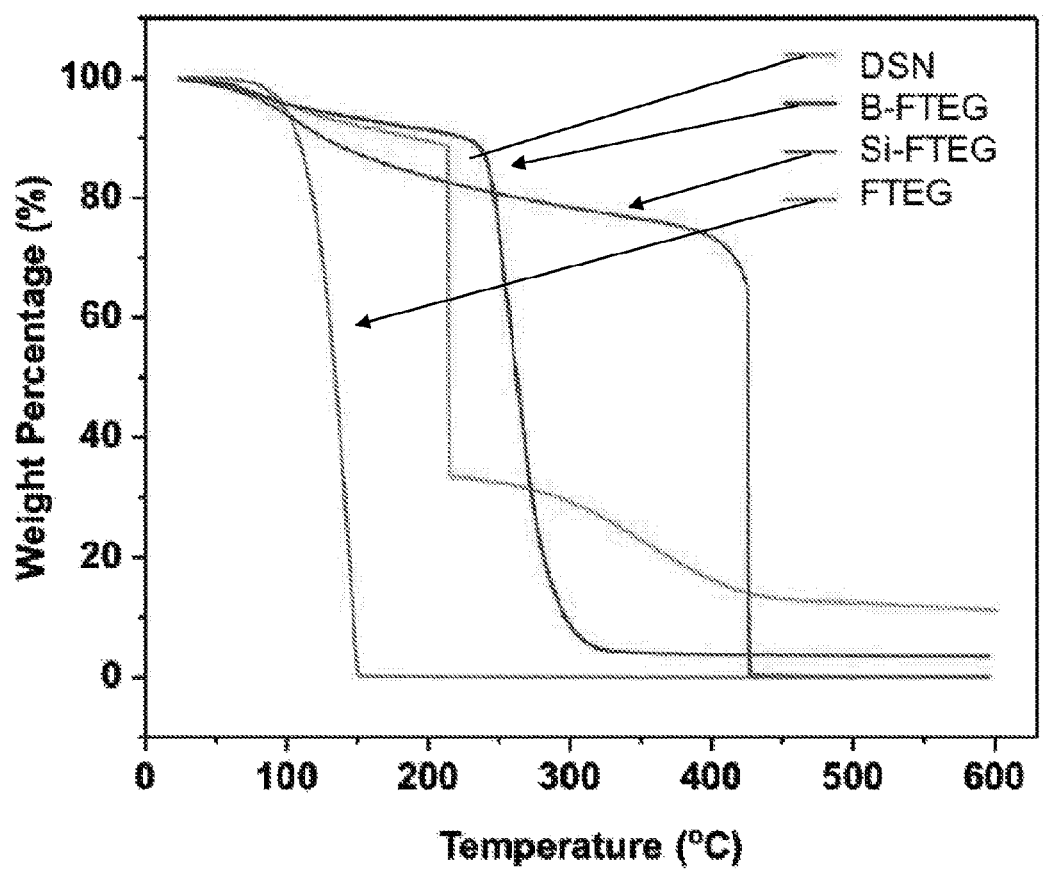
FIG. 52. Thermal gravimetric analysis (TGA) curves of DSN, B-FTEG, Si-FTEG, and FTEG. Note: The starting reactant FTEG has a low boiling point of about 120° C., thus showing a sharp decrease in TGA from about 110° C. to about 150° C. and zero weight after about 150° C. All three network materials (DSN, B-FTEG, and Si-FTEG) showed much higher stability; however, they also slowly lost their weight at initial heating stage. This is attributed to the slow evaporation of strongly coordinated solvent in the networks (e.g., DME coordinated with Li$^+$ ions).
Figures 55A, 55B, 55C, 55D, 55E:
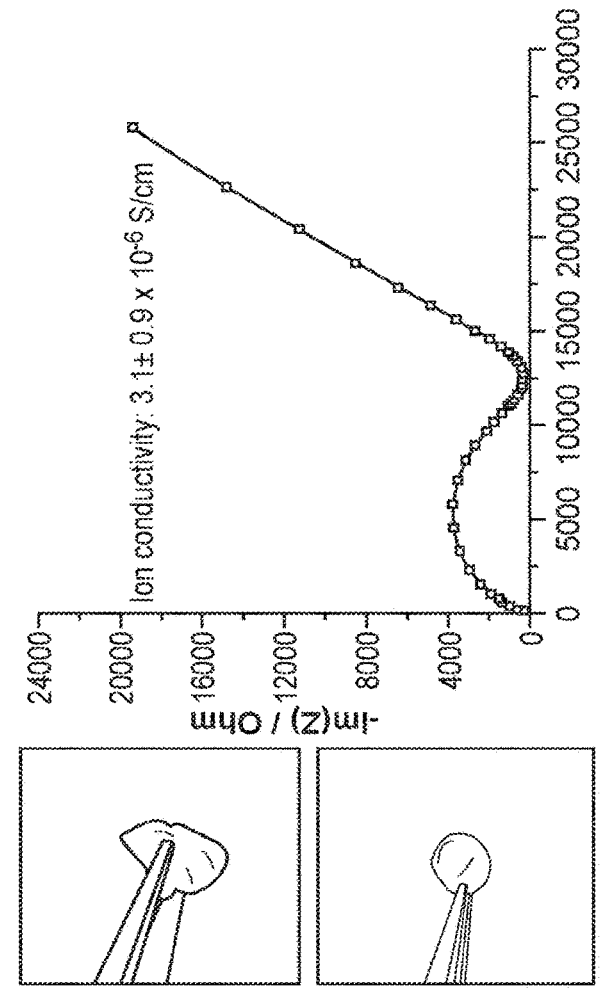
FIG. 55. An example of DSN derivative, TEG-DSN, where the FTEG chains in DSN were replaced by tetraethylene glycol (TEG) chains while keeping Al centers and Li$^+$ ions in the network. a) Chemical structure of TEG-DSN. b) Free standing film of TEG-DSN. c) Nyquist plot of the TEG-DSN material measured in SS∥SS symmetric cell. The conductivity is about $3.1 \pm 0.9 \times 10^{-6}$ S/cm. d) LTN measurement of TEG-DSN material in Li∥Li symmetric cell. e) Nyquist plot of TEG-DSN before and after polarization. Note: The ion conductivity and LTN of TEG-DSN are both lower than those of DSN. It is hypothesized that TEG chains can solvate Li$^+$ strongly through Li$^+$—O coordination thus causing slow Li$^+$ transport and chain (anion) movement. These will decrease the ion conductivity and LTN.
Figure 58:
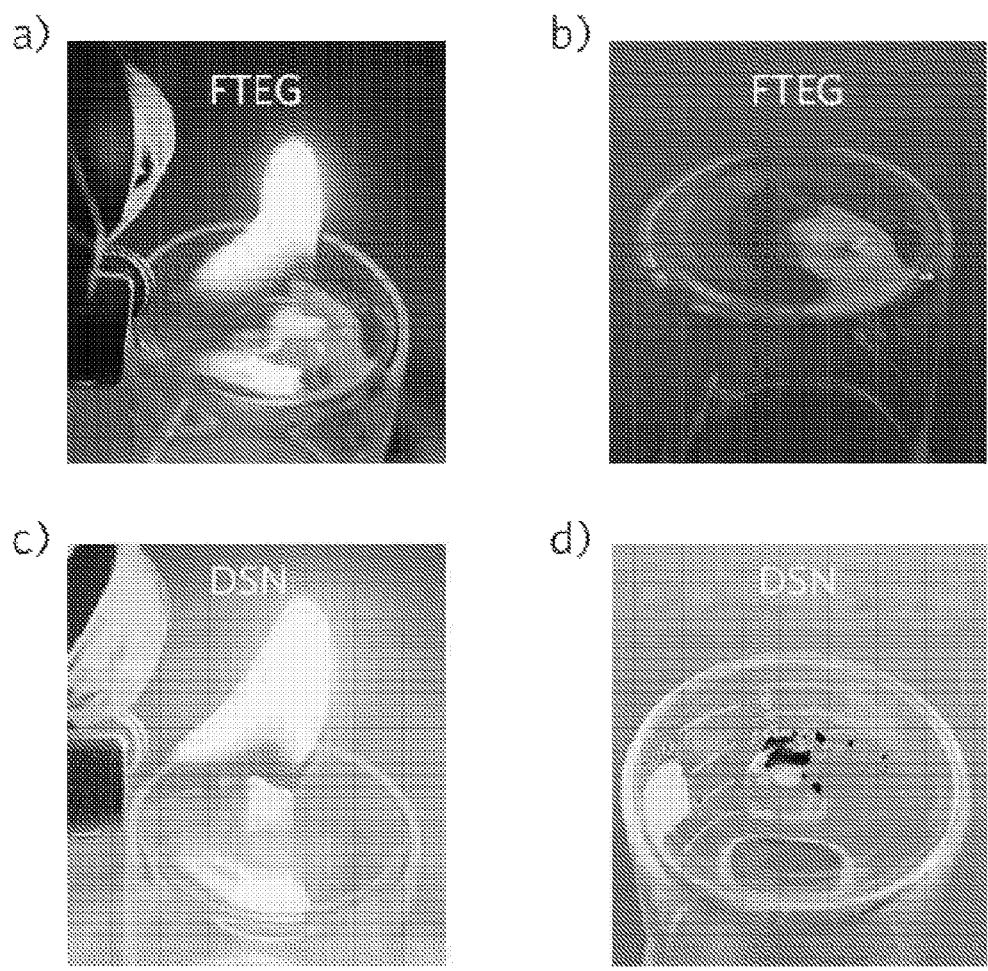
FIG. 58. Flammability test of the reactant, FTEG (a and b), and the DSN (c and d). Note: When the FTEG is burnt, it melted (boiling point of the FTEG: about 40-42° C.) but did not burn. When the bulk DSN material is burnt, it generated a little smoke but did not burn either. The smoke and dark part after burning may be caused by the trace amount of remaining solvents that coordinate with Li$^+$ ions in DSN.

Material Characterizations $^1$H NMR spectra were recorded on a Varian Mercury 400 MHz NMR spectrometer and $^7$Li NMR spectra were recorded on a UI 300 MHz NMR spectrometer at RT. For $^7$Li NMR spectra, in order to rule out concentration effects, the concentration of Li$^+$ ion is fixed in THF at about 0.15 M for all samples. Rheological experiments were carried out using an Ares G2 Rheometer (TA Instruments) with an advanced Peltier system (APS) at about 25° C. Frequency sweeps were carried out from about 0.01 to about 1000 Hz at about 0.1% strain. Stress-strain tests were carried out using Instron with about 10 mm/min strain rate. DSC experiments were performed using a DSC-Q2000 (TA Instruments) over a temperature range of about −80 to about 100° C. with a ramp rate of about 10° C. min$^{-1}$. TGA plots were recorded with a Mettler Toledo AG-TGA/SDTA851e (FIG. 52). A FEI Magellan 400 XHR SEM was used for SEM and Energy dispersive spectroscopy (EDS) characterizations. XPS profiles were collected by PHI VersaProbe 1 Scanning XPS Microprobe. The samples were transferred for XPS using a sample transfer vessel that prevented air exposure at any time. Before XPS measurement, the artificial SEIs coated or bare Li was soaked in the electrolyte for 4 days, and then washed with DME for about 30 min to remove electrolyte and coating layers. FTIR spectra were measured using a Nicolet iS50 FT/IR Spectrometer (Thermo Fisher) with a diamond ATR attachment. For flammability test, the material is burned under fire for about 10 s and stopped for observation (FIG. 58).

Electrochemical Measurements

All battery components used in this example were commercial large-scale products and electrochemical testing was all carried out in 2032-type coin cell configuration. About 1.0 M LiPF$_6$ in EC/DEC electrolyte (Selectilyte LP40) and FEC (MONOFLUOROETHYLENE CARBONATE) were purchased from BASF. One layer of Celgard 2325 (about 25 μm PP/PE/PP) was used as separator and about 75 μL electrolyte was added in each coin cell. Thin Li foil (about 42 μm) was purchased from Hydro-Quebec. Two layers of thin Li foils were stacked, punched, and used in Li∥Cu half cell for cycling, and one layer of that was used in Li∥NMC full cell. Single-side coated LiNi$_{0.5}$Mn$_{0.3}$Co$_{0.2}$O$_2$ (NMC532) sheets (about 95% active materials) with about 2 mAh cm$^{-2}$ capacity loading were purchased from MTI. Thick Li foil (about 750 μm) was purchased from Alfa Aesar and used in Li∥Li symmetric cell and Li∥Cu cell for SEM. Copper current collector (about 25 μm, about 99.8% metals basis) was purchased from Alfa Aesar and used as working electrode. The EIS, LTN, and CV measurements were carried out on a Biologic VMP3 system. The cycling tests for half cells and full cells were carried out on an Arbin system. The EIS measurements were taken over a frequency range of about 100 mHz to about 7 MHz. For the LTN measurements, addition is made of about 5 wt. % diglyme to wet the DSN film to get lower resistance and about 100 mV voltage bias was applied to Li∥Li cells. The CV tests were carried out over a voltage range of about −0.1 to about 2 V for three cycles. For Li∥Cu half-cell CE cycling tests, ten pre-cycles between 0 and about 1 V were initialized to clean Cu electrode surface, and then cycling was done by depositing about 1 (or about 0.5) mAh cm$^{-2}$ of Li onto Cu electrode followed by stripping to about 1 V. The average CE is calculated by dividing the total stripping capacity by the total deposition capacity after the formation cycle. For CE test (FIG. 53), a standard protocol was followed: (1) perform one initial formation cycle with Li deposition of about 5 mAh cm$^{-2}$ on Cu under about 0.5 mA cm$^{-2}$ current density and stripping to about 1 V; (2) deposit about 5 mAh cm$^{-2}$ Li on Cu under about 0.5 mA cm$^{-2}$ as Li reservoir; (3) repeatedly strip and plate Li with about 1 mAh cm$^{-2}$ under about 0.5 mA cm$^{-2}$ for 10 cycles; (4) strip all Li to about 1 V. For the Li∥NMC full cell study, NMC532 sheets were used and stored in argon-filled glovebox as received. After the first five activation cycles at about C/10 charge/discharge, the cells were cycled at about C/2 between about 2.7 to about 4.2 V.

Supplemental Information:

1. Materials 1H,1H,11H,11H-perfluoro-3,6,9-trioxaundecane-1,11-diol (FTEG) was purchased from SynQuest Laboratories and used as received. Silicon tetrachloride (SiCl$_4$), about 2 M lithium borohydride in tetrahydrofuran solution (about 2 M LiBH$_4$/THF), about 1 M lithium aluminum hydride in tetrahydrofuran solution (about 1 M LiAlH$_4$/THF), THF (anhydrous, ≥about 99.9%, inhibitor-free), and vinylene carbonate (VC, about 99.5%, acid <about 200 ppm, H$_2$O<about 100 ppm) were purchased from Sigma-Aldrich and used as received. 1,2-Dimethoxyethane (anhydrous, about 99.5%) was purchased from ACROS Organics and used as received. Other commercial reactants were purchased from Sigma-Aldrich and used without further purification. Li foil (about 750 μm thickness) and Cu current collector (about m thickness, about 99.8% metal basis) were purchased from Alfa Aesar. Commercial about 1.0 M LiPF$_6$ in EC/DEC electrolyte and FEC were purchased from BASF (Selectilyte LP40). Commercial lithium battery separator Celgard 2325 (about 25 μm thickness, PP/PE/PP) was purchased from Celgard LLC. Thin Li foil (about 42 μm thickness) was purchased from Hydro-Québec. Commercial cathode sheets, NMC532 coated Al foils, were purchased from MTI, and used without any further processing. Other battery materials, such as 2032-type coin cell cases, springs, and spacers were all purchased from MTI.

2. General Characterization Methods

Nuclei magnetic resonance (NMR) spectra were recorded on a Varian Mercury console spectrometer ($^1$H: 400 MHz, $^{13}$C: 100 MHz, $^{19}$F: 376 MHz) at about 293 K. Chemical shifts are given in parts per million (ppm) with respect to solvent peaks as standard. Infrared spectroscopy was performed on a Nicolet iS50 FT-IR Spectrometer with a diamond ATR crystal and DTGS detector. Differential scanning calorimetry (DSC) experiments were performed with a TA Instruments DSC Q2000 using Tzero aluminum pans. Thermal gravimetric analysis (TGA) plots were recorded with a Mettler Toledo AG-TGA/SDTA851e. Rheological experiments were carried out using an Ares G2 Rheometer (TA Instruments) with an advanced Peltier system (APS) at about 25° C. Frequency sweeps were carried out from about 0.01 to about 1000 Hz at about 0.1% strain. Stress-strain tests were done by Instron. A FEI Magellan 400 XHR SEM was used for SEM and Energy dispersive spectroscopy (EDS) characterizations. XPS profiles were collected by PHI VersaProbe 1 Scanning XPS Microprobe. The electrochemical impedance spectroscopy (EIS) and cyclic voltammetry (CV) measurements were carried out on a Biologic VMP3 system. All half cells and full cells were cycled on Arbin.

3. Synthesis

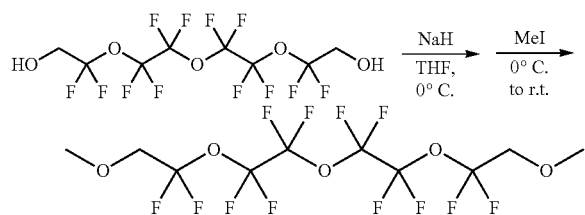

Synthesis of Me-FTEG: To an about 500 mL two-neck flask was added about 150 mL anhydrous tetrahydrofuran (THF) and about 5 g sodium hydride (NaH, about 60 wt. % dispersed in mineral oil). The mixture was purged by nitrogen, cooled to 0° C., and stirred for about 10 min. Then about 10 g FTEG was dissolved in about 20 mL THF and the solution was added dropwise to the stirring suspension. After stirring for about 2 h at 0° C., about 4.0 mL methyliodide (MeI) was added dropwise into the suspension. The mixture was further stirred at room temperature overnight. Methanol was added to quench excess NaH, and the solvents were removed in vacuo. The yielding viscous solid-liquid mixture was dissolved in about 100 mL of about 10% HCl, and extracted with chloroform. The chloroform was removed in vacuo then to yield light yellow liquid. The crude product was purified over column chromatography (silica gel, ethyl acetate/hexanes, about 1:9, v/v) to obtain Me-FTEG as a colorless liquid in about 80% yield (about 8.5 g). $^1$H NMR (400 MHz, d$^8$-THF, δ/ppm): 3.86 (t, J=11.4, 10.0 Hz, 4H), 3.46 (t, J=0.6 Hz, 6H). $^{19}$F NMR (376 MHz, d$^8$-THF, δ/ppm): −78.81--78.99 (m, 4F), −89.77--89.93 (m, 4F), −90.25 (s, 4F). $^{13}$C NMR (100 MHz, d$^8$-THF, δ/ppm): 126.03, 123.25, 120.46, 114.91, 70.97, 70.67, 70.36, 59.49, 59.47.

4. Molecular Dynamics Parameterization and Simulation Methods 4.1 Force Field Parameterization All-atom molecular dynamics (MD) simulations of FTEG-DSN were performed in GROMACS. Force field parameters were generated using AMBER methodology with the Force Field Toolkit in VMD. The parameterization procedure is as follows: the Lennard-Jones (LJ) parameters are assigned by analogy, the partial charges are calculated to reproduce the molecular electrostatic energy, the bond and angle parameters are chosen to reproduce the molecular Hessian from ab initio calculations, and dihedral parameters are fitted to the torsional potential energy surface, also from ab initio calculations. Ab initio calculations were performed at the MP2/6-31G(d) level of theory; the 6-31+G(d) basis set was used for anions.

The periodic network of the structure specified that it be broken into constituent parts for parameterization. Following the FTEG-DSN synthetic chemistry, isolation is made of the FTEG oligomers ("linkers") and a central aluminate "node", Al(CH$_3$)$_4^-$, depicted in FIG. 48a-b. Aluminate ions were represented as hydrogen atoms when parameterizing the linker. Partial charges calculated for a larger node, Al(C$_2$H$_5$)$_4^-$ (FIG. 48c), were largely similar to those of Al(CH$_3$)$_4^-$, indicating that the small node was an acceptable choice for parameterization.

AMBER methodology is chosen opposed to that of CHARMM because the CHARMM partial charges, which are fitted to reproduce water interactions from ab initio calculations, yielded unphysical parameters with unacceptably high error for the node's central aluminum atom (Table 7). In contrast, AMBER partial charges, determined using the RESP scheme, had low error and produced consistent values for all aluminate structures in FIG. 48, indicating the robustness of the approach for such molecules. As no LJ parameters were available for the tetrahedral aluminate node in AMBER, use is made of the LJ parameters from the CHARMM General Force Field (CGenFF). While this is not strictly a permissible approximation because parameters between force fields are not generally transferable, this is tolerated because of the chemical similarity between the tetrafluoroaluminate anion (for which the CGenFF parameters were developed, FIG. 48d) and the polymer network in the present example. Residual errors from each parameterization step are found in Table 6, and final parameters used in simulations are found in Table 4. For parameters that were present in both the node and oligomer force fields (e.g., the Al-O1-CH and OH—O1-CH angles in the node and oligomer force fields, respectively; atom names in FIG. 48), the combination rules is used as specified in Table 5. Analysis of MD trajectories was aided by use of the MDAnalysis library in Python.

4.2 Topology Generation

A defining feature of any network is its topology: the spatial arrangement and connectivity of its nodes. Because the aluminate nodes in FTEG-DSN are tetravalent, preliminary simulations fixed FTEG-DSN topology as a periodic system with a tetrahedral unit cell (FIG. 51). However, its density was 1.4 g/cm$^3$ at 400 K, lower than the experimental value of about 1.7 g/cm$^3$, indicating the topology was unfavorable and the assumption that the network is periodic should be relaxed. Thus, the results of these preliminary simulations are not presented.

To achieve more realistic network topology, a scheme is devised that more closely mirrors the experimental synthetic procedure. Simulations were initialized with FTEG oligomers and aluminum ions dispersed in a cubic box at low pressure (p of about 0.04 g/cm$^3$ gas phase). Initially, no bonded potentials were imposed between aluminum atoms and O1 atoms on the FTEG linker (atom names in FIG. 48). The system could therefore freely explore different topological states after being compressed to a melt; because nonbonded interactions facilitated reversible linkages between FTEG and Al ions, the system could retain favorable local configurations while also rearranging to remove unfavorable ones.

Two modifications were made to the nonbonded parameters during this stage of simulation. First, Al and O1 partial charges were modified to enforce charge neutrality in the unit cell while maintaining the strength of their Coulombic interaction. Second, a modest repulsive potential was enforced between O1 atoms in the same oligomer to discourage topologies reflecting "self-linking", wherein both ends of an oligomer are bonded to the same aluminum atom.

After letting the system explore topological states for 5 ns, network topology was enforced by creating bonded potentials between Al and O1 atoms. It is found that local 'defects' (e.g., self-linking and pentavalent Al atoms) precluded topology formation in one pass. As a result, iterative generation is made with the following procedure:

1. Pause the simulation and identify bonds between Al—O1 pairs that meet all of the following three criteria:
   (a) Neither atom had a full valence;
   (b) The pairwise distance was below a cutoff of 4.0 Å;
   (c) The Al atom was not previously bonded to the oligomer of interest.

2. Add appropriate bond, angle, and dihedral interactions arising from new linkage. Remove intra-oligomer repulsive potential if both ends are bonded to Al atoms.

3. If all atoms had filled valences, or no new bonds were formed in the past two attempts, exit. Otherwise:

(a) Relax the system in NVE ensemble (Table 3, step 5);
(b) Advance the simulation for 0.1 ns in each the NVT and NPT ensemble (Table 3, steps 6-7);
(c) Repeat from first step, above.

A pairwise cutoff of 4.0 Å was chosen to capture the entire first coordination shell as determined by the Al-O1 radial distribution function (not shown). Resultant topologies containing unlinked oligomers, wherein a linker formed no bonds with aluminum atoms, were discarded. All networks used for data collection had at least 97% of the total possible Al-O1 bonds formed. Li atoms were then added to networks with acceptable topologies and partial charges on Al and O1 atoms were reset to their default values. Topologies generated this way had a greater density (1.75 g/cm$^3$ at 600 K) than that of the periodic topology, indicating the approach generates favorable topological states for the film. Data were sampled from steps 12 and 17 in Table 4 every 20 picoseconds.

TABLE 1

Artificial SEIs and their Li‖Cu cell performance.

| Artificial SEI Strategy | Electrolyte | Cycling Conditions & Stability | | |
|---|---|---|---|---|
| Self-healing, polymer (SHP) | 1M LiTFSI in DOL/DME + 1 w.t. % LiNO$_3$ | 1 mA cm$^{-2}$, 1 mAh/cm$^{-2}$, ~160 cycles, CE: ~97% | | |
| Interconnected hollow carbon nanospheres | 1M LiTFSI in DOL/DME + 2% LiNo$_3$+ 100 mN Li$_2$S$_8$ | 0.25 mA cm$^{-2}$, 1 mAh cm$^{-2}$, ~150 cycles | 0.5 mA cm$^{-2}$, 1 mAh cm$^{-2}$, ~150 cycles, CE: 98.5% | 1 mA cm$^{-2}$, 1 mAh cm$^{-2}$, ~150 cycles |
| Adaptive "solid-liquid" interfacial protective layer (Silly Putty) | 1M LiTFSI in DOL/DME + 1 w.t. % LiNO$_3$ | 0.5 mA cm$^{-2}$, 1 mAh cm$^{-2}$, ~120 cycles, CE: 97.6% | 1 mA cm$^{-2}$, 1 mAh cm$^{-2}$, ~120 cycles | 3 mA cm$^{-2}$, 1 mAh cm$^{-2}$, ~50 cycles |
| Ultrastrong double-layer nanodiamond interface | 1M LiTFSI in DOL/DME + 2 w.t. % LiNO$_3$ | 0.5 mA cm$^{-2}$, 0.5 mAh cm$^{-2}$, ~200 cycles | 0.5 mA cm$^{-2}$, 1 mAh cm$^{-2}$, ~150 cycles, CE: 98.6% | 1 mA cm$^{-2}$, 1 mAh cm$^{-2}$, ~150 cycles |
| Lithiophilic-lithophobic gradient interfacial layer | 0.6M LiTFSI in DOL/DME + 0.4M LiNO$_3$ | 2 mA cm$^{-2}$, 3 mAh/cm$^{-2}$, ~100 cycles, CE: ~99.5% | | |
| Nanochannel confinement (PIANC) | 1M LiFTSI in DOL/DME + 1 w.t. % LiNO$_3$ | 1 mA cm$^{-2}$, 0.5 mAh cm$^{-2}$, ~240 cycles, CE: 97.6% | 2 mA cm$^{-2}$, 0.5 mAh cm$^{-2}$, ~150 cycles | 3 mA cm$^{-2}$, 0.5 mAh cm$^{-2}$, ~140 cycles |
| Langmuir-Blodgett artificial solid-electrolyte interphases (LBASEI) | 0.6M LiTFSI, 0.4M LiBOB, and 0.05M LiPF$_6$ in EC/DMS + 1 wt % FEC + 2 wt % VC (E-2) | 1 mA cm$^{-2}$, 1 mAh/cm$^{-2}$, 20 cycles, CE: ~80% | | |
| Langmuir-Blodgett artifical solid-electrlyte interphases (LBASEI) | 0.6M LiTFSI, 0.4M LiBOB, 0.4M LiF, 0.1M LiNO$_3$, 0.03M LiBF$_4$, and 0.05M LiPF$_6$ in EC/DMC + 1 wt% FEC + 2 wt % VC + 3 wt % TFEC (E-3) | 1 mA cm$^{-2}$, 1 mAh/cm$^{-2}$, 20 cycles, CE: ~90% | | |
| 3D oxidized polyacrylonitrile (PAN) nanofiber layer | 1M LiTFSI in DOL/DME + 2 w.t. % LiNO$_3$ | 1 mA cm$^{-2}$, 1 mAh cm$^{-2}$, ~130 cycles, CE: 97.9% | 3 mA cm$^{-2}$, 1 mAh cm$^{-2}$, ~130 cycles | |
| Glass fiber | 1M LiTFSI in DOL/DME + 2 w.t. % LiNO$_3$ | 0.5 mA cm$^{-2}$, 0.5 mAh cm$^{-2}$, ~90 cycles, CE: 98% | 1 mA cm$^{-2}$, 0.5 mAh cm$^{-2}$, ~70 cycles | 2 mA cm$^{-2}$, 0.5 mAh cm$^{-2}$, ~60 cycles |
| Elastic and Li-ion-percolating hybrid membrane (LiPS$_4$/PDMS) | 1M LiTFSI in DOL/DME + 2 w.t. % LiNO$_3$ | 1 mA cm$^{-2}$, 1 mAh cm$^{-2}$, ~200 cycles, CE: 95.8% | 2 mA cm$^{-2}$, 2 mAh cm$^{-2}$, ~100 cycles, | |
| PDMS coating | 1M LiPF6in EC/DEC + 2 w.t. % VC | 0.25 mA cm-2, 1 mAh cm-2, ~100 cycles | 0.5 mA cm-2, 1 mAh cm-2, ~100 cycles, CE: 93.2% | 1 mA cm-2, 1 mAh cm-2, ~100 cycles |
| Cu3N/SBR coating | 1M LiPF6in EC/DEC + 10 w.t. % FEC | 0.25 mA cm-2, 0.5 mAh cm-2, ~150 cycles | 0.5 mA cm-2, 1 mAh cm-2, ~100 cycles, CE: 97% | 1 mA cm-2, 1 mAh cm-2, ~100 cycles |
| Li3PO4SEI layer | 1M LiPF6in EC/DMC/DEC | 1 mA cm-2, 1 mAh/cm-2, only showed ~10 cycles, CE: ~94% | | |
| Reactive polymer composite (RPC) | 1M LiPF6in EC/EMC + 2 w.t. % LiBOB | 0.5 mA cm-2, 1 mAh/cm-2, 300 cycles, CE: ~97.5% | | |
| This example | 1M LiPF6in EC/DEC + 10 w.t. % FEC | 0.25 mA cm-2, 0.5 mAh cm-2, ~400 cycles, CE: 97.3% | 0.5 mA cm-2, 1 mAh cm-2, ~400 cycles, CE: 96.5% | 1 mA cm-2, 1 mAh cm-2, ~250 cycles, CE: 94.9% |

Note:
Bold-highlighted artificial SEIs are mainly based on 1M LiPF$_6$ in carbonate electrolyte that showed Li‖Cu long-term cycling.

TABLE 2

Costs of reagents to procure DSN.

| Reagent | Cost (S/100 cells)[1] | Commercially Available Scale |
|---|---|---|
| FTEG | 3 | Kiligrams |
| 1M LiAlH$_4$/THF | 0.2 | Kiloliters |
| DME[2] | 0.7 | Liters |

Note:
[1] All the costs were calculated based on the prices of reagents purchased. The amounts of DSN used was based on Li|Cu cells. The solution loss durine spin-coating process is included.
[2] DME was anhydrous and over molecular sieves.

TABLE 3

Molecular Dynamics Force Field Parameters.

The simulation energy is given by the CHARMM Hamiltonian:

$$V = \sum_{nonbonded}\left[\varepsilon_{ij}\left[\left(\frac{R_{min,ij}}{r_{ij}}\right)^{12} - \left(\frac{R_{min,ij}}{r_{ij}}\right)^{6}\right] + \frac{q_i q_j}{\varepsilon r_{ij}}\right] + \sum_{bonds} k_b(R_0 - r)^2 +$$

$$\sum_{angles} k_\theta(\theta_0 - \theta)^2 + \sum_{diheadrals} k_\phi(1 + \cos(n\phi - \phi_0))$$

where the parameters take the values specified below. The combination rules $$\varepsilon_{ij} = \sqrt{\varepsilon_i \varepsilon_j} \text{ and } R_{min,ij} = \frac{R_{min,i} + R_{min,j}}{2}$$

are used. Parameters generated with FFTK are of this functional form; the use of GAFF LJ parameters and of RESP for partial charge optimization makes the parameters AMBER-compatible.

| Atoms | | | | | |
|---|---|---|---|---|---|
| Name | Type | Element | $R_{min}/2$ (Å) | ε (kcal/mol) | Charge |
| Al | Al | Al | 0.65000* | 2.00000* | 1.239808 |
| Li | Li | Li | 0.00312 | 1.26700 | 1.00000 |
| CH | CH | C | 0.10780 | 1.90690 | 0.066592 |
| O1 | O1 | O | 0.07260 | 1.77130 | −0.649977 |
| O2 | O2 | O | 0.07260 | 1.77130 | −0.226590 |
| O3 | O3 | O | 0.07260 | 1.77130 | −0.057300 |
| H | H | H | 0.02080 | 1.35930 | 0.007811 |
| CF1 | CF1 | C | 0.10780 | 1.90690 | 0.386520 |
| CF2 | CF2 | C | 0.10780 | 1.90690 | 0.176090 |
| CF3 | CF3 | C | 0.10780 | 1.90690 | 0.190670 |
| F1 | F | F | 0.08320 | 1.70290 | −0.137420 |
| F2 | F | F | 0.08320 | 1.70290 | −0.083550 |
| F3 | F | F | 0.08320 | 1.70290 | −0.074670 |

*Taken from CGenFF

| Bonds | | | |
|---|---|---|---|
| Type 1 | Type 2 | $R_0$(Å) | $k_b$ (kcal/(mol · Å$^2$)) |
| Al | O1 | 1.790 | 205.676 |
| O1 | CH | 1.402 | 385.214 |
| O1 | O1 | 6.500 | 358.509 |
| CH | H | 1.098 | 341.162 |
| CH | CF1 | 1.488 | 276.603 |
| CF1 | F | 1.355 | 392.035 |
| CF1 | O2 | 1.371 | 310.584 |
| O2 | CF2 | 1.343 | 341.845 |
| CF2 | F | 1.341 | 413.337 |

TABLE 3-continued

| | | | |
|---|---|---|---|
| CF2 | CF3 | 1.488 | 254.990 |
| CF3 | O3 | 1.350 | 336.617 |
| CF3 | F | 1.342 | 414.936 |

*Piecewise function for bond used to prevent self-linking:

$U(r) = \frac{1}{2}k_b(R_0 - r)^2$ for $r < R_0$ $U(r) = 0$ for $r \geq R_0$

| Angles | | | | |
|---|---|---|---|---|
| Type 1 | Type 2 | Type 3 | θ (deg) | $k_\theta$ (kcal/(mol · rad$^2$)) |
| CH | O1 | AL | 118.98 | 15.661 |
| O1 | AL | O1 | 95.44 | 45.720 |
| O1 | CH | H | 111.00 | 20.206 |
| O1 | CH | CF1 | 106.99 | 108.181 |
| CH | CF1 | F | 111.10 | 45.041 |
| CH | CF1 | O2 | 108.89 | 87.136 |
| H | CH | H | 109.77 | 61.797 |
| CF1 | O2 | CF2 | 111.29 | 99.281 |
| H | CH | CF1 | 108.45 | 57.743 |
| F | CF1 | F | 106.48 | 103.058 |
| F | CF1 | O2 | 108.37 | 107.617 |
| O2 | CF2 | F | 112.75 | 96.000 |
| O2 | OF2 | CF3 | 105.75 | 49.200 |
| CF2 | CF3 | F | 110.31 | 41.758 |
| CF2 | CF3 | O3 | 106.87 | 44.400 |
| CF3 | O3 | CF3 | 111.78 | 112.813 |
| CF3 | CF2 | F | 109.13 | 39.148 |
| F | CF2 | F | 109.66 | 100.688 |
| F | CF3 | F | 109.87 | 98.197 |
| O3 | CF3 | F | 111.73 | 93.456 |

| Dihedrals | | | | | | |
|---|---|---|---|---|---|---|
| Type 1 | Type 2 | Type 3 | Type 4 | Multiplicity | $\phi_0$ (deg) | $k_\phi$ (kcal/mol) |
| O1 | AL | O1 | CH | 1 | 180 | 2.363 |
| | | | | 2 | 180 | 2.995 |
| | | | | 3 | 0 | 0.170 |
| AL | O1 | CH | H | 1 | 0 | 2.996 |
| | | | | 2 | 180 | 1.245 |
| | | | | 3 | 180 | 0.202 |
| AL | O1 | CH | CF1 | 1 | 0 | 2.996 |
| | | | | 2 | 180 | 1.245 |
| | | | | 3 | 180 | 0.202 |
| F | CF2 | CF3 | F | 3 | 180 | 0.507 |
| CF1 | O2 | CF2 | F | 3 | 0 | 0.068 |
| F | CF1 | O2 | CF2 | 3 | 180 | 0.022 |
| CF2 | CF3 | O3 | CF3 | 2 | 0 | 0.599 |
| | | | | 3 | 180 | 0.330 |
| | | | | 4 | 0 | 0.151 |
| O2 | CF2 | CF3 | F | 3 | 0 | 0.060 |
| O1 | CH | CF1 | O2 | 3 | 0 | 0.006 |
| H | CH | CF1 | O2 | 3 | 0 | 0.073 |
| CF3 | O3 | CF3 | F | 3 | 0 | 0.364 |
| CH | CF1 | O2 | CF2 | 2 | 0 | 0.057 |
| | | | | 3 | 0 | 0.182 |
| | | | | 4 | 0 | 0.210 |
| O2 | CF2 | CF3 | O3 | 3 | 180 | 0.161 |
| CF1 | O2 | CF2 | CF3 | 2 | 0 | 0.554 |
| | | | | 3 | 0 | 0.142 |
| | | | | 4 | 0 | 0.079 |
| O1 | CH | CF1 | F | 3 | 180 | 0.356 |
| H | CH | CF1 | F | 3 | 0 | 0.286 |
| F | CF2 | CF3 | O3 | 3 | 0 | 0.678 |

TABLE 4

Simulation Procedure.

| Step* | Stage | Ensemble | Time | Temperature | Thermostat | Pressure | Barostat | EF Strength |
|---|---|---|---|---|---|---|---|---|
| 1 | Formation of | NVE | — | — | — | — | — | — |
| 2 | melt from | NVT | 2 ns | 600 K | NH | — | — | — |

TABLE 4-continued

Simulation Procedure.

| Step* | Stage | Ensemble | Time | Temperature | Thermostat | Pressure | Barostat | EF Strength |
|---|---|---|---|---|---|---|---|---|
| 3 | vacuum | NPT | 2 ns | 600 K | NH | 100 bar | B | — |
| 4 | | NPT | 2 ns | 600 K | NH | 1 bar | B | — |
| 5 | Network | NVE | — | — | — | — | — | — |
| 6 | generation | NVT | 50 ps** | 600 K | NH | — | — | — |
| 7 | | NPT | 50 ps** | 600 K | NH | 1 bar | B | — |
| | | | (Lithium added) | | | | | |
| 8 | Equilibration | NVE | — | — | — | — | — | — |
| 9† | with lithium | NVT | 2 ns | 600 K | NH | — | — | — |
| 10 | | NPT | 2 ns | 600 K | NH | 1 bar | B | — |
| 11 | | NPT | 2 ns | 600 K | NH | 1 bar | PR | — |
| 12 | Production without electric field | NPT | 50 ns | 600 K | NH | 1 bar | PR | — |
| 13 | Equilibration | NVE | — | — | — | — | — | 4 V/nm |
| 14 | with electric | NVT | 2 ns | 600 K | NH | — | — | 4 V/nm |
| 15 | field | NPT | 2 ns | 600 K | NH | 1 bar | B | 4 V/nm |
| 16 | | NPT | 5 ns | 600 K | NH | 1 bar | PR | 4 V/nm |
| 17 | Production with electric field | NPT | 50 ns | 600 K | NH | 1 bar | PR | 4 V/nm |

Abbreviations: NH = Nose-Hoover, B = Berendsen, PR = Parrinello-Rahman.
*Time step of 1.0 fs used unless otherwise noted.
†Time step 0.5 fs used.
**50 picoseconds per iteration of algorithm, as detailed in Section S.4.2.

TABLE 5

Combination methods for force field generation.

| Atom | Node Charge | Linker Charge | Final Charge | Combination Method |
|---|---|---|---|---|
| Al | 1.2398 | 0.3656 | 1.2398 | Node |
| O1 | −0.6500 | −0.6060 | −0.6500 | Node |
| CH | 0.0666 | 0.1057 | 0.0666 | Node |
| H | 0.0078 | 0.1127 | 0.0583 | Adjusted to achieve charge neutrality |

| Bonds | Node | | Linker | | Final | | Comb. |
|---|---|---|---|---|---|---|---|
| Atoms | $R_0$ | $k_b$ | $R_0$ | $k_b$ | $R_0$ | $k_b$ | Method |
| Al—O1* | 1.790 | 205.676 | 0.970 | 505.285 | 1.790 | 205.676 | Node |
| O1—CH | 1.402 | 385.214 | 1.390 | 377.333 | 1.402 | 385.214 | Node |
| CH—H | 1.102 | 328.528 | 1.093 | 353.796 | 1.098 | 341.162 | Average of Node and Linker |

| Angles | Node | | Linker | | Final | | Comb. |
|---|---|---|---|---|---|---|---|
| Atoms | $\theta_0$ | $k_\theta$ | $\theta_0$ | $k_\theta$ | $\theta_0$ | $k_\theta$ | Method |
| Al—O1—CH | 118.98 | 131.05 | 105.970 | 89.197 | 118.98 | 131.05 | Node |
| O1—CH—H | 113.881 | 39.715 | 108.181 | 0.697 | 111.00 | 20.206 | Average |

| Dihedrals | Node | | | Linker | | | Final | | | Comb. |
|---|---|---|---|---|---|---|---|---|---|---|
| Atoms | n | $\phi_0$ | $k_{\phi,n}$ | n | $\phi_0$ | $k_{\phi,n}$ | n | $\phi_0$ | $k_{\phi,n}$ | Method |
| Al—O1—CH—H | 1 | 0 | 2.996 | — | — | — | 1 | 0 | 2.996 | Node |
| | 2 | 180 | 1.245 | — | — | — | 2 | 180 | 1.245 | |
| | 3 | 180 | 0.202 | 3 | 0 | 0.963 | 3 | 180 | 0.202 | |

TABLE 6

Force Field Parametrization Errors.

| Parameter | Error Function | FTEG "linker" | Al(CH$_3$)$_4$ "node" | Notes |
|---|---|---|---|---|
| Partial Charges | Relative RMSE of Molecular Electrostatic Potential (RRMS) | 0.19045 | 0.02250 | |
| Bonds, Angles | $\Psi_{bonded}$* | $\Psi_{geom}$ = 16.30 $\Psi_{energy}$ = 4.15 | $\Psi_{geom}$ = 36.56 $\Psi_{energy}$ = 0.49 | $w_{geom}$ = 2.0 $w_{energy}$ = 1.0 |
| Dihedrals | $\Psi_{dihedrals}$* | 0.1670 | 0.1240 | |

TABLE 7

Partial Charge Optimization for aluminate structures.

| Para-meter | CHARMM partial charge parameterization* | | AMBER partial charge parameterization (RESP) | |
|---|---|---|---|---|
| | AlF$_4^-$ | Al(CH$_3$)$_4^-$ | AlF$_4^-$ | Al(CH$_3$)$_4^-$ |
| Error | $\Psi_{energy}$ = 0.56 $\Psi_{dist}$ = 1.00 $\Psi_{dipole}$ = 24.57 | $\Psi_{energy}$ = 18.55 $\Psi_{dist}$ = 16.00 $\Psi_{dipole}$ = 951.3 | 0.00886 | 0.02250 |
| Al charge | 1.906 | −0.733 | 1.571586 | 1.239808 |
| F charge | −0.726 | — | −0.642897 | — |
| O charge | — | −1.223 | — | −0.649977 |
| C charge | — | 0.886 | — | 0.066592 |
| H charge | — | 0.09** | — | 0.007811 |

HF/6-31 + G(d) level of theory used because structures are anions, demanding use of a diffuse basis set.
*Objective function is $\Psi_{charge} = \Psi_{energy} + \Psi_{dist} + \Psi_{dipole}$.
**Specified by CHARMM force field.
Parameterization results without this constraint are qualitatively similar to those presented in both magnitude of error and partial charge values.

Definitions

The following definitions apply to some of the aspects described with regard to some embodiments of this disclosure. These definitions may likewise be expanded upon herein.

As used herein, the singular terms "a," "an," and "the" may include plural referents unless the context clearly dictates otherwise. Thus, for example, reference to an object may include multiple objects unless the context clearly dictates otherwise.

As used herein, the term "set" refers to a collection of one or more objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, when used in connection with a numerical value, the terms can encompass a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

As used herein, the term "alkane" refers to a saturated hydrocarbon. For certain implementations, an alkane can include from 1 to 100 carbon atoms. The term "lower alkane" refers to an alkane that includes from 1 to 20 carbon atoms, such as from 1 to 10 carbon atoms, while the term "upper alkane" refers to an alkane that includes more than 20 carbon atoms, such as from 21 to 100 carbon atoms. The term "branched alkane" refers to an alkane that includes a set of branches, while the term "unbranched alkane" refers to an alkane that is linear or straight-chained. The term "cycloalkane" refers to an alkane that includes a set of ring structures, such as a single ring structure or a bicyclo or higher order cyclic structure. The term "heteroalkane" refers to an alkane that has a set of its carbon atoms replaced by a set of heteroatoms, such as N, Si, S, O, and P. The term "substituted alkane" refers to an alkane that has a set of its hydrogen atoms replaced by a set of substituents, while the term "unsubstituted alkane" refers to an alkane that lacks such replacement. Combinations of the above terms can be used to refer to an alkane having a combination of characteristics.

As used herein, the term "alkyl" refers to a monovalent form of an alkane. For example, an alkyl can be envisioned as an alkane with one of its hydrogen atoms removed to allow bonding. The term "lower alkyl" refers to a monovalent form of a lower alkane, while the term "upper alkyl" refers to a monovalent form of an upper alkane. The term "branched alkyl" refers to a monovalent form of a branched alkane, while the term "unbranched alkyl" refers to a monovalent form of an unbranched alkane. The term "cycloalkyl" refers to a monovalent form of a cycloalkane, and the term "heteroalkyl" refers to a monovalent form of a heteroalkane. The term "substituted alkyl" refers to a monovalent form of a substituted alkane, while the term "unsubstituted alkyl" refers to a monovalent form of an unsubstituted alkane.

As used herein, the term "alkylene" refers to a bivalent form of an alkane. For example, an alkylene can be envisioned as an alkane with two of its hydrogen atoms removed to allow bonding. The term "lower alkylene" refers to a bivalent form of a lower alkane, while the term "upper alkylene" refers to a bivalent form of an upper alkane. The term "branched alkylene" refers to a bivalent form of a branched alkane, while the term "unbranched alkylene" refers to a bivalent form of an unbranched alkane. The term "cycloalkylene" refers to a bivalent form of a cycloalkane, and the term "heteroalkylene" refers to a bivalent form of a heteroalkane. The term "substituted alkylene" refers to a bivalent form of a substituted alkane, while the term "unsubstituted alkylene" refers to a bivalent form of an unsubstituted alkane.

As used herein, the term "alkene" refers to an unsaturated hydrocarbon that includes a set of carbon-carbon double bonds. For certain implementations, an alkene can include from 2 to 100 carbon atoms. The term "lower alkene" refers to an alkene that includes from 2 to 20 carbon atoms, such as from 2 to 10 carbon atoms, while the term "upper alkene" refers to an alkene that includes more than 20 carbon atoms, such as from 21 to 100 carbon atoms. The term "cycloalkene" refers to an alkene that includes a set of ring structures, such as a single ring structure or a bicyclo or higher order cyclic structure. The term "heteroalkene" refers to an alkene that has a set of its carbon atoms replaced by a set of heteroatoms, such as N, Si, S, O, and P. The term "substituted alkene" refers to an alkene that has a set of its hydrogen atoms replaced by a set of substituents, while the term "unsubstituted alkene" refers to an alkene that lacks such replacement. Combinations of the above terms can be used to refer to an alkene having a combination of characteristics.

As used herein, the term "alkyne" refers to an unsaturated hydrocarbon molecule that includes a set of carbon-carbon triple bonds. In some instances, an alkyne can also include a set of carbon-carbon double bonds. For certain implementations, an alkyne can include from 2 to 100 carbon atoms. The term "lower alkyne" refers to an alkyne that includes from 2 to 20 carbon atoms, such as from 2 to 10 carbon atoms, while the term "upper alkyne" refers to an alkyne that includes more than 20 carbon atoms, such as from 21 to 100 carbon atoms. The term "cycloalkyne" refers to an alkyne that includes a set of ring structures, such as a single ring structure or a bicyclo or higher order cyclic structure. The term "heteroalkyne" refers to an alkyne that has a set of its carbon atoms replaced by a set of heteroatoms, such as N, Si, S, O, and P. The term "substituted alkyne" refers to an alkyne that has a set of its hydrogen atoms replaced by a set of substituents, while the term "unsubstituted alkyne" refers to an alkyne that lacks such replacement. Combinations of the above terms can be used to refer to an alkyne having a combination of characteristics.

As used herein, the term "arene" refers to an aromatic hydrocarbon. For certain implementations, an arene can include from 5 to 100 carbon atoms. The term "lower arene" refers to an arene that includes from 5 to 20 carbon atoms, such as from 5 to 14 carbon atoms, while the term "upper arene" refers to an arene that includes more than 20 carbon atoms, such as from 21 to 100 carbon atoms. The term "monocyclic arene" refers to an arene that includes a single aromatic ring structure, while the term "polycyclic arene" refers to an arene that includes more than one aromatic ring structure, such as two or more aromatic ring structures that are bonded via a carbon-carbon bond or that are fused together. The term "heteroarene" refers to an arene that has a set of its carbon atoms replaced by a set of heteroatoms, such as N, Si, S, O, and P. The term "substituted arene" refers to an arene that has a set of its hydrogen atoms replaced by a set of substituents, while the term "unsubstituted arene" refers to an arene that lacks such replacement. Combinations of the above terms can be used to refer to an arene having a combination of characteristics.

While this disclosure has been described with reference to the specific embodiments thereof, it should be understood by those skilled in the art that various changes may be made and equivalents may be substituted without departing from the true spirit and scope of this disclosure as defined by the appended claims. In addition, many modifications may be made to adapt a particular situation, material, composition of matter, method, operation or operations, to the objective, spirit and scope of this disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of this disclosure. Accordingly, unless specifically indicated herein, the order and grouping of the operations are not a limitation of this disclosure.

What is claimed is:

1. An anode comprising:
a current collector; and
an interfacial layer disposed over the current collector, wherein the interfacial layer includes an ion-conductive organic network including anionic coordination units, organic linkers bonded through the anionic coordination units, and counterions dispersed in the ion-conductive organic network.

2. The anode of claim 1, wherein each of the anionic coordination units includes a metal cation.

3. The anode of claim 2, wherein each of the anionic coordination units further includes a plurality of non-metal anions bonded to the metal cation.

4. The anode of claim 1, wherein the anionic coordination units include multiple sub-populations of anionic coordination units, and the multiple sub-populations of anionic coordination units include respective and different metal cations.

5. The anode of claim 1, wherein the counterions include lithium cations, sodium cations, calcium cations, or magnesium cations.

6. The anode of claim 1, wherein a concentration of the counterions is at least about 0.1% by weight relative to a total weight of the ion-conductive organic network.

7. The anode of claim 1, wherein a concentration of the counterions is at least about 1% by weight relative to a total weight of the ion-conductive organic network.

8. The anode of claim 1, further comprising an anode material disposed between the current collector and the interfacial layer.

9. The anode of claim 8, wherein the anode material is lithium metal, sodium metal, calcium metal, or magnesium metal.

10. The anode of claim 1, wherein each of the organic linkers is a linear chain.

11. The anode of claim 10, wherein the linear chain is a polyalkylene oxide chain, a fluorinated polyalkylene oxide chain, a hydrocarbon chain, a fluorinated hydrocarbon chain, a polysiloxane chain, a polybutyldiene chain, or a polyisoprene chain.

12. The anode of claim 1, wherein the interfacial layer has an ionic conductivity of at least about $10^{-6}$ S/cm.

13. The anode of claim 1, wherein the interfacial layer has a lithium transference number of at least about 0.5.

14. The anode of claim 1, wherein the interfacial layer includes multiple sub-layers, and at least one of the sub-layers includes the ion-conductive organic network.

15. A battery comprising:
the anode of claim 1;
a cathode; and
an electrolyte disposed between the anode and the cathode.

16. A battery comprising:
an anode;
a cathode; and
a solid electrolyte disposed between the anode and the cathode,
wherein the solid electrolyte includes an ion-conductive organic network including anionic coordination units and organic linkers bonded through the anionic coordination units.

17. The battery of claim 16, wherein each of the anionic coordination units includes a metal cation and a plurality of non-metal anions bonded to the metal cation.

18. The battery of claim 16, wherein the ion-conductive organic network further includes counterions dispersed in the ion-conductive organic network, wherein the counterions include lithium cations, sodium cations, calcium cations, or magnesium cations, and wherein a concentration of the counterions is at least about 0.1% by weight relative to a total weight of the ion-conductive organic network.

19. The battery of claim 16, wherein each of the organic linkers includes a cyclic hydrocarbon moiety.

20. The battery of claim 19, wherein the cyclic hydrocarbon moiety is saturated or unsaturated.

* * * * *